(12) United States Patent
Scales et al.

(10) Patent No.: US 9,618,752 B2
(45) Date of Patent: *Apr. 11, 2017

(54) SYSTEM AND METHOD FOR VIDEO IMAGE REGISTRATION AND/OR PROVIDING SUPPLEMENTAL DATA IN A HEADS UP DISPLAY

(71) Applicant: Science Applications International Corporation, McLean, VA (US)

(72) Inventors: John Richard Scales, Huntsville, AL (US); Michael Harris Rodgers, Huntsville, AL (US)

(73) Assignee: Science Applications International Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/950,643

(22) Filed: Nov. 24, 2015

(65) Prior Publication Data

US 2016/0077343 A1 Mar. 17, 2016

Related U.S. Application Data

(63) Continuation of application No. 11/680,207, filed on Feb. 28, 2007, now Pat. No. 9,229,230.

(51) Int. Cl.
*H04N 7/18* (2006.01)
*G02B 27/01* (2006.01)
(Continued)

(52) U.S. Cl.
CPC ......... *G02B 27/0172* (2013.01); *F41G 3/165* (2013.01); *G02B 27/017* (2013.01); *G02B 27/0176* (2013.01); *G06K 9/6202* (2013.01); *G06T 7/0026* (2013.01); *G06T 7/20* (2013.01); *G06T 19/006* (2013.01);
(Continued)

(58) Field of Classification Search
CPC ...... G02B 2027/014; G02B 2027/0138; G02B 2027/017; F41G 3/165
See application file for complete search history.

(56) References Cited

U.S. PATENT DOCUMENTS 6,826,295 B2 11/2004 Lichtermann et al.
6,899,539 B1 * 5/2005 Stallman ................ F41H 13/00
345/156

(Continued)

OTHER PUBLICATIONS

Kumar, et al., "Correlation Pattern Recognition", published 2005, pp. 149-150.

(Continued)

*Primary Examiner* — Nam Tran
(74) *Attorney, Agent, or Firm* — Banner & Witcoff, Ltd.

(57) ABSTRACT

Video sources and inertial sensors are attached to a weapon and to goggles. A computer receives video images from the weapon- and goggles-mounted sources and inertial data from the sensors. The computer calculates a location for an image from the weapon-mounted source within an image from the goggles-mounted source using the inertial sensor data. The sensor-based location is checked (and possibly adjusted) based on a comparison of the images. A database contains information about real-world objects in a field of view of the goggles-mounted source, and is used to generate icons or other graphics concerning such objects.

18 Claims, 37 Drawing Sheets

(51) Int. Cl.
*F41G 3/16* (2006.01)
*G06K 9/62* (2006.01)
*G06T 7/00* (2017.01)
*G06T 7/20* (2017.01)
*G06T 19/00* (2011.01)

(52) U.S. Cl.
CPC ............... *G02B 2027/014* (2013.01); *G02B 2027/0134* (2013.01); *G02B 2027/0138* (2013.01); *G02B 2027/0159* (2013.01); *G06T 2207/10016* (2013.01); *G06T 2207/10024* (2013.01)

(56) References Cited

U.S. PATENT DOCUMENTS

| | | |
|---|---|---|
| 6,963,800 B1 | 11/2005 | Milbert |
| 7,002,551 B2 | 2/2006 | Azuma et al. |
| 2004/0051680 A1* | 3/2004 | Azuma ............... G03B 13/28 345/8 |
| 2005/0207651 A1 | 9/2005 | Yang et al. |
| 2006/0116814 A1 | 6/2006 | Milbert |
| 2006/0121993 A1 | 6/2006 | Scales et al. |
| 2007/0001874 A1 | 1/2007 | Feyereisen et al. |

OTHER PUBLICATIONS

QUANTUM3D, Inc., DAGGERS: Embedded Training for Dismounted Soldiers Scients and Technology Objective (STO), <http://www.quantum3d.com/PDF/sstories/SStories_Daggers.pdf>, 2004.
Sensor Technology Systems, Inc., Model 2733 Low Profile/Night Vision Goggle: an/pvs-21: Operational Summary, 2004.
National Defense Magazine, Can the Army Make Objective Force Warrior Work?, <http://www.nationaldefenesemagazine.org/articl.cfm?id=1173>, Aug. 2003.
Intersense, Inc., Intersense InertiaCube2, <http://www.isense.com/products/prec/ic2/inertiaCube2.pdf>, 2004.
Yeh, Michelle, et al., "Effects of Frame of Reference and Viewing Condition on Attentional Issues with Helmet Mounted Displays", Technical Report, Jan. 1998, pp. 1-75.
Livingston, Mark A., et al., "Evaluating System Capabilities and User Performance in the Battlefield Augmented Reality System", published in Proc. NIST/DARPA Workshop on Performance Metrics for Intelligent Systems, Gaithersburg, MD, Aug. 24-26, 2004.
Hicks, Jeffrey, et al., "Eyekon: distributed Augmented Reality for Soldier Teams", published in 21st Century Systems, Inc., 2001-2003, pp. 1-14.
"Competitive Analysis: Ground Guidance", downloaded from <http://www.primoridal.com> on Dec. 11, 2006, 9 pages.
"Whitepaper: Ground Guidance", downloaded from <http://www.primordial.com> on Dec. 11, 2006, 15 pages.
"Primordial Soldier: Vision System for Soldiers", Product Sheet, downloaded from <http://www.primordial.com> on Dec. 11, 2006, 2 pages.
Primordial Soldier: Geographically-Enabled Augmented Reality System for Dismounted Soldiers (A05-119), Presentation, downloaded from <http://www.primordial.com> on Dec. 11, 2006, 35 pages.
"Primordial Solder User Manual", downloaded from <http://www.primordial.com> on Dec. 11, 2006, 28 pages.
"Primordial Soldier, Vision system software for soldiers", downloaded from <http://www.primordial.com> on Dec. 11, 2006, 6 pages.
"Competitive Analysis: Unit Detection, Differentiating friend from foe and assessing threats in a soldier's head-mounted display", downloaded from <http://www.primordial.com> on Dec. 11, 2006, 8 pages.
"Whitepaper: Unit Detection, Differentiating friend from foe and assess threats in a soldier's head-mounted display", downloaded from <http://www.primordial.com> on Dec. 11, 2006, 16 pages.
"Commander's Digital Assistance (CDA)", General Dynamics C4, downloaded from <http://www.defense-update.com> on Dec. 11, 2006, 3 pages.
Web pages regarding AN/PVS-21, STS Sensor Technology Systems, downloaded from <http://www.sts-eo.com> on Jan. 11, 2007, 9 pages.
Marty Whitford, "Friend or Foe?, FBCB2 Enhances Battle Planning, Reduces 'Friendly Fire'", GPS World, Feb. 1, 2005, downloaded from <http://www.gpsworld.com/gpsworld> on Dec. 11, 2006, 10 pages.
InterSense InertiaCube3 and IC3 Processor, Intersense, downloaded from <http://www.intersense.com> prior to Feb. 28, 2007,1 page.
Eric Foxlin, Chapter 7: Motion Tracking Requirements and Technologies, Handbook of Virtual Environment Technology, InterSense Inc., downloaded from <http://www.intersense.com> prior to Feb. 28, 2007, 54 pages.
Walrath, James D., "Information Technology for the Soldier: The Human Factor," Army Research Laboratory (ARL-TR-3525), May 2005, 18 pages.

* cited by examiner

| Identifier | Object type | Location | Display as |
|---|---|---|---|
| F0001 | friendly force | <x coord><y coord><z coord> | ⊘ |
| F0002 | friendly force | <x coord><y coord><z coord> | ⊘ |
| E00001 | enemy position | <x coord><y coord><z coord> | ◆ |
| RP0001 | rally point | <x coord><y coord><z coord> | ⛊ |
| RTE0001 | route portion | <x coord><y coord><z coord> | ▨ |
| RTE0002 | route portion | <x coord><y coord><z coord> | ▨ |

SYSTEM AND METHOD FOR VIDEO IMAGE REGISTRATION AND/OR PROVIDING SUPPLEMENTAL DATA IN A HEADS UP DISPLAY

CROSS-REFERENCE TO RELATED APPLICATION

This application is a continuation of U.S. patent application Ser. No. 11/680,207, titled "System and Method for Video Image Registration and/or Providing Supplemental Data in a Heads Up Display" and filed Feb. 28, 2007. U.S. patent application Ser. No. 11/680,207, in it entirety, is incorporated by reference herein.

BACKGROUND

Augmented reality systems offer a mechanism for providing a user with additional data about his or her environment. An example of such a system is a heads-up display (HUD) found in aircraft and automobiles. As is generally known, a HUD projects various navigational and/or operational data on a windshield or other transparent surface in a user's field of view. This allows a user to monitor various information without having to divert his or her gaze from the external environment.

Augmented reality systems have also been developed for use in a combat military environment. For example, commonly-owned U.S. patent application Ser. No. 11/000,934 (filed Dec. 2, 2004, titled "System and Method for Video Image Registration in a Heads Up Display," published as Pub. No. US20060121993, and incorporated by reference herein) describes a system in which an image from a rifle-mounted video source is superimposed on an image seen through a pair of goggles. Sensors coupled to the rifle and to the goggles provide data indicating movement of the goggles and rifle. An image from the rifle-mounted source shows an external region within the source's field of view (FOV). The goggles have a wider FOV and provide an image that includes a portion showing the same region as is shown in the image from the rifle-mounted video source. The sensor data is then used to determine the relative orientation of the two sources and calculate a location for the rifle image within the image seen through the goggles.

Determining the relative orientations of two video sources based on inertial measurement unit (IMU) sensor data, as is described for at least some embodiments of the aforementioned application, can pose challenges. For example, many low-cost IMU sensors experience bias drift over time. Such drift can result in relative orientation errors of several degrees per hour. In order to prevent such errors from accumulating, the IMU sensors must be periodically recalibrated. This recalibration typically requires user action and can disrupt system operation. The ability to minimize the need for manually-initiated recalibration would be highly advantageous.

Additional advantages could also be obtained by increasing the types of information provided by a HUD within goggles worn by a user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In at least some embodiments, a computer receives images from two video sources. Each of those two video sources is movable independent of the other and generates images that represent a portion of an external environment within its field of view. One of the video sources may be contained within a pair of goggles worn by a user, and the other source may be mounted to a rifle carried by the user. Sensors coupled to the two video sources provide data to the computer that indicates the spatial orientations of those sources. Using the sensor data, the computer determines a location for placing a video image (or a portion thereof) from a second of the sources (e.g., a rifle-mounted source) in the video image from a first of the sources (e.g., a goggles-mounted source). The second source video image and a corresponding portion of the first source video image represent the same part of the external environment. Data from the two images are then compared in order to evaluate the location determined from the sensor data. The sensor-based location is either confirmed, or a new location is found based on additional image comparisons. Once a location is selected (either a confirmed sensor-based location or a location found using image comparison), the two images are displayed such that the second source image (or a portion of that image) overlays a corresponding portion of the first source image. Locations obtained using image comparisons are used to calibrate (adjust) the manner in which subsequent sensor-based locations are determined.

In at least some additional embodiments, a database contains information about external objects in the environment in which a system employing the two video sources is being used. The computer receives system location information and orientation information for one of the video sources (e.g., the source contained within a user's goggles). The computer uses the location and orientation information to calculate a spatial volume within the field of view of that video source. The computer then parses the database for information about objects that may be located within the calculated spatial volume. After parsing the database, icons or other graphical indicia are displayed for objects identified as being within the calculated spatial volume, the positions of the icons being imposed upon the locations of the objects.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Figure 1:
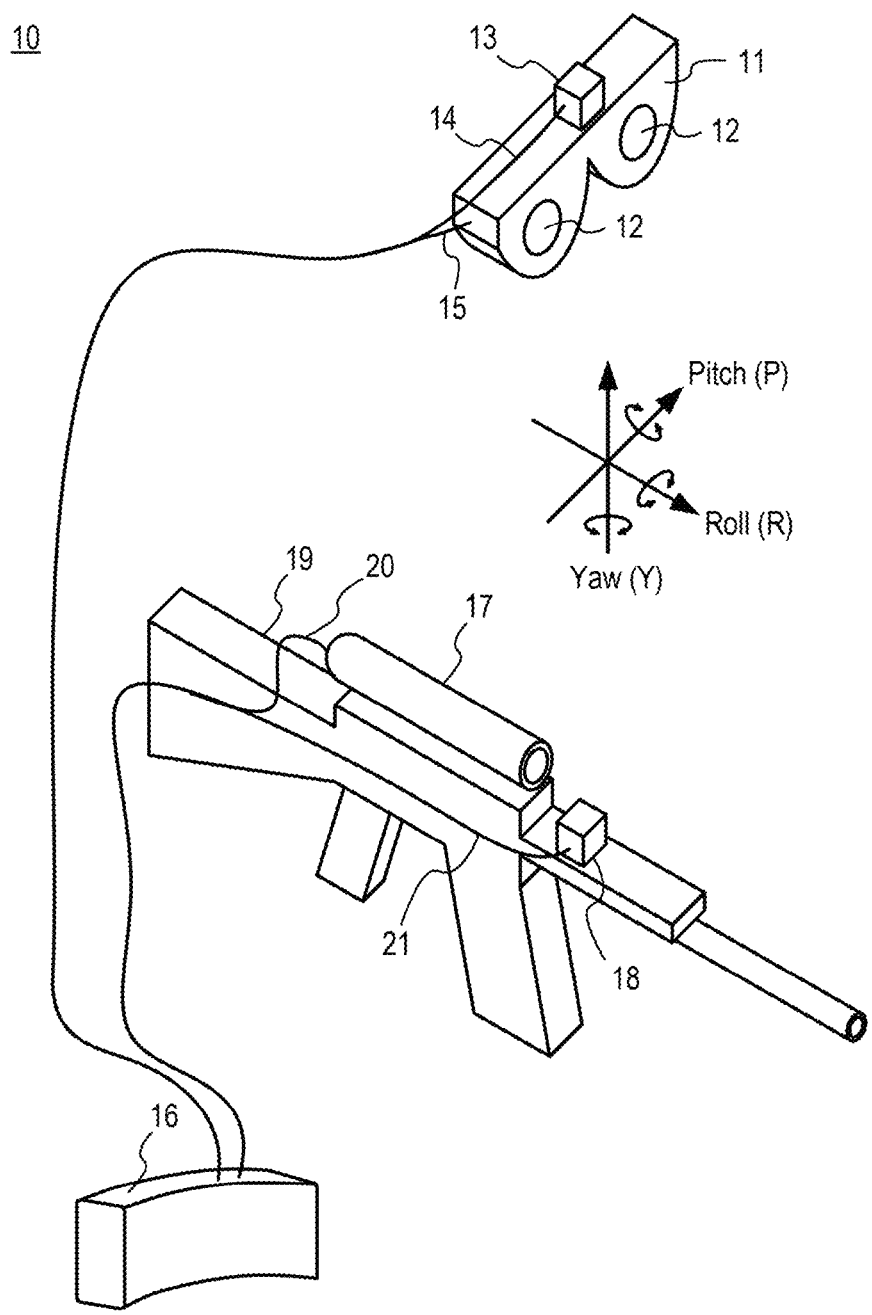
FIG. 1 illustrates a system, according to at least some embodiments, for providing an information-enhanced heads up display (HUD).

FIG. 1 illustrates a system 10, according to at least some embodiments, that provides an information-enhanced heads-up display (HUD) for an infantryman or other armed tactical operator. For simplicity, a soldier or other person using system 10 will henceforth be referred to as a "user." System 10 includes a set of goggles 11 that are configured for wear by the user. Goggles 11 may be worn directly, may be attached to a helmet or other headgear (not shown), or worn in some other manner. The front side of goggles 11 faces outward (i.e., away from the user) when worn, and includes eyepieces 12 and other apertures (not shown) for receiving light or other (e.g., IR) input from the user's field of view. The rear side of goggles 11 faces the user when worn such that the user looks outward through eyepieces 12 and sees external objects within the goggles field of view. As explained in more detail below in connection with FIG. 3, goggles 11 includes an image generator and a projector and creates a user display that combines video images and graphical indicia with what a user sees as a result of light passing from the external environment through eyepieces 12. A sensor 13 is attached to goggles 11 or otherwise physically coupled so as to move as a single unit with goggles 11. Sensor 13 includes an inertial measurement unit (IMU) and magnetometer. In at least some embodiments, sensor 13 is an IM³™ sensor (available from Archangel Systems, Inc. of Auburn, Ala.) that uses accelerometers and rate sensors to sense and report angular orientation around three axes of rotation up to 100 times per second. The image projector and generator up in goggles 11 and sensor 13 communicate (over cables 15 and 14, but by wireless means in at least some other embodiments) with a wearable control unit 16. Control unit 16 includes a computer, radio receiver and other elements, as is also described below.

System 10 further includes a video source (or "scope") 17 and a sensor 18 configured to move as a single unit with scope 17. In the embodiment shown, scope 17 is affixed to a rifle 19 and is used to target rifle 19. In particular, scope 17 is aligned with the barrel of rifle 19 such that a reticle corresponding to the optical centerline of scope 17 generally follows the path of a bullet fired from rifle 19. Scope 17 may include a visible-light video camera, a thermal imaging (i.e., IR sensitive) video camera, a night-vision video camera, or some combination thereof. In certain embodiments, scope 17 is a Light Weapon Thermal Sight (available from DRS Optronics of Melbourne, Fla.). Sensor 18 is also an IMU (such as the aforementioned IM³™ sensor) in at least some embodiments. Sensor 18 and scope 17 communicate with control unit 16 via cables 20 and 21.

Figure 3:
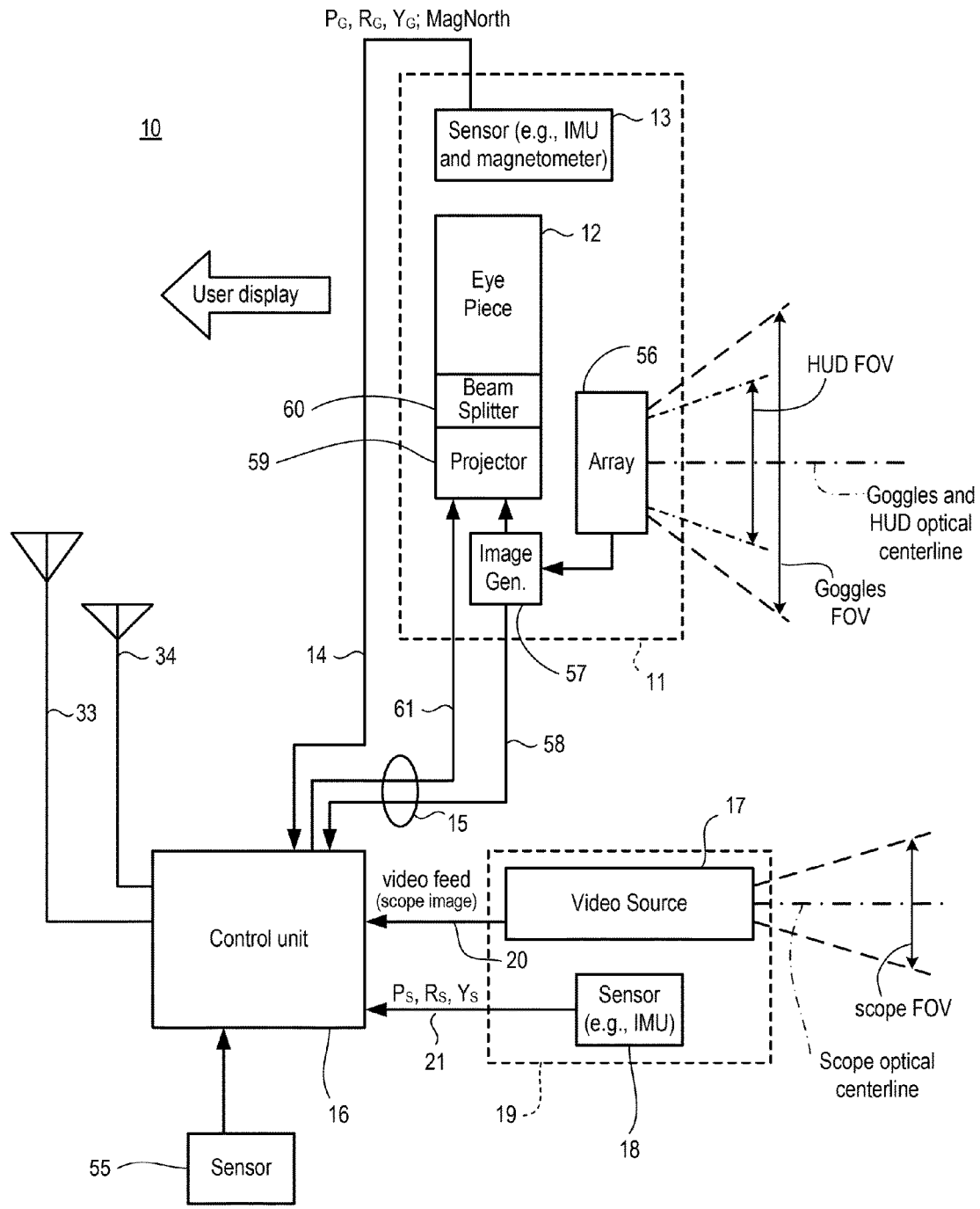
FIG. 3 is a block diagram showing data flows in the system of FIG. 1.

As is also explained in more detail in conjunction with FIG. 3, control unit 16 receives video feeds from scope 17 and goggles 11. The video feeds may be delivered using any standard video format, for example analog formats like NTSC or PAL, digital formats like MPEG, or a non-standard format. Sensors 13 and 18 communicate angular pitch, yaw, and roll information to control unit 16. Using information from sensors 13 and 18, a computer within control unit 16 determines orientation of the line of sight for goggles 11 relative to the line of sight for scope 17. As described in more detail below, this permits superimposition of an image from scope 17 onto a display corresponding to a field of view of goggles 11.

In at least some embodiments, sensors 13 and 18 communicate via Universal Asynchronous Receiver/Transmitter (UART) protocol on cables 14 and 21. These cables, along with video cables 15 and 20, may be sewn into a soldier's clothing, rifle sling, equipment harness, etc. to prevent entanglement. Although wired sensors and video cables are used here, control unit 16 communicates wirelessly with sensors 13 and 18, goggles 11 and/or scope 17 in other embodiments. For example, ultra-wideband (UWB) transceivers may transmit video and sensor data from rifle 19, as well as video and sensor data from goggles 11. Likewise, UWB may be used to transmit video from the control unit to goggles 11. Although UWB radios, such as Time Domain's PulsON® radio, are particularly desirable for their high bandwidth, low power consumption and for being virtually undetectable, any wireless standard may be used, including both Bluetooth and IEEE 802.11.

In alternative embodiments, UWB radios may be used for more than transmission of video and sensor data. Multiple radios may be placed on rifle 19 and on goggles 11 (or on a helmet, to which the goggles may be affixed), each of which can relay their precise position. In this fashion, control unit 16 is able to calculate the alignment of the rifle and goggles based on the relative location of radios rather than using separate orientation sensors.

Figure 2:
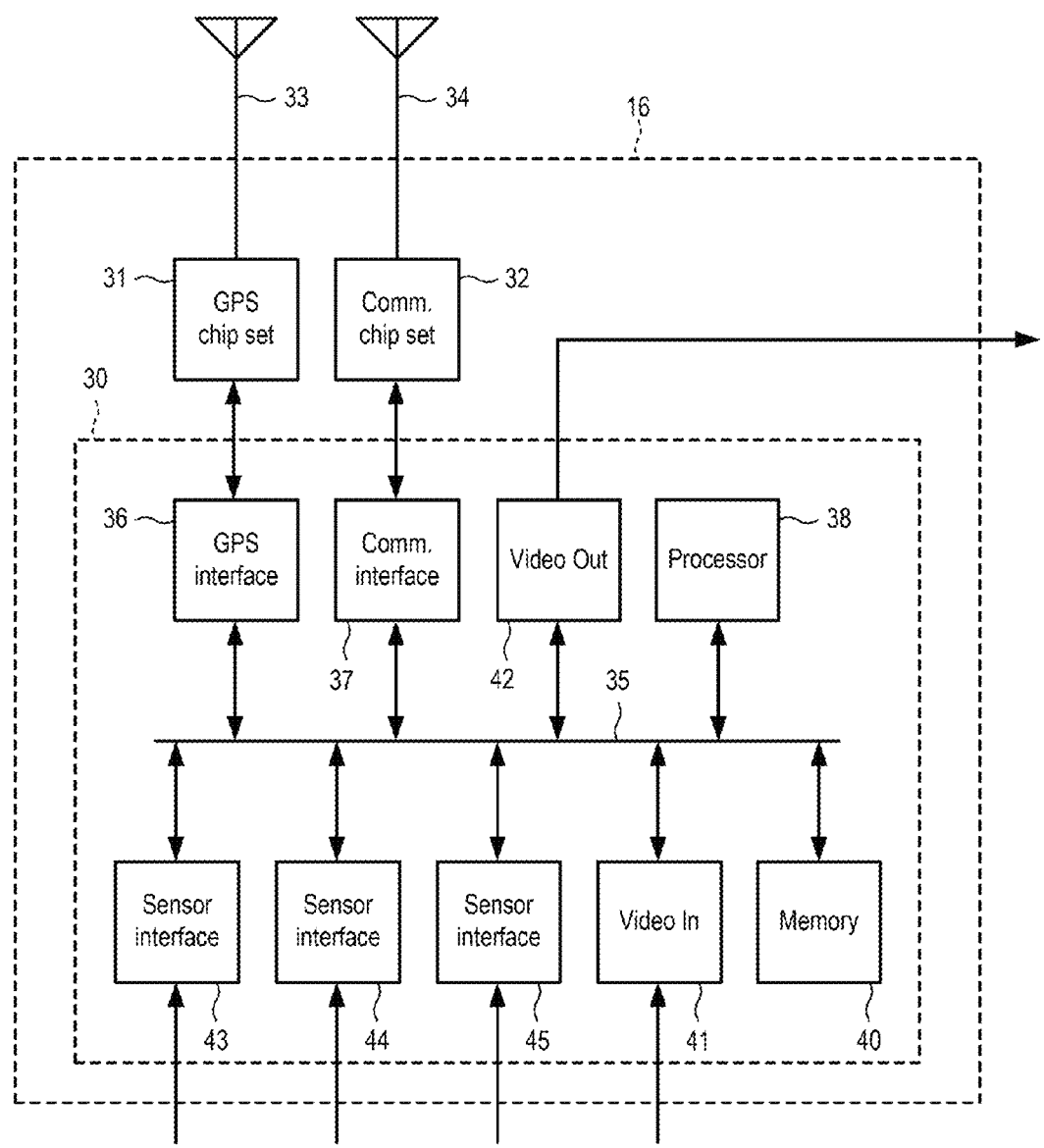
FIG. 2 is a block diagram of the control unit for the system of FIG. 1.

FIG. 2 is a block diagram of control unit 16. Control unit 16 includes a computer 30, global positioning system (GPS) chipset 31 and data communication chip set 32. GPS chip set 31 receives signals from GPS satellites via antenna 33 and outputs GPS data to computer 30. Based on that GPS data, computer 30 determines the location of system 10 (and thus of the user) to within the accuracy limits of the particular GPS chip set. For differential GPS systems intended for military use, the horizontal position information is typically accurate to less than three meters. RF data communication chip set 32 provides two-way data communication (using antenna 34) between system 10 and other elements in a tactical network. Those other elements may include additional systems 10 (e.g., worn by other soldiers in a squad), a remotely located commander, etc. The communication link(s) serviced by chip set 32 may include a Land Warrior radio local net, single channel ground and airborne radio system (SINCGARS), Force XXI Battle Command Brigade-and-Below (FBCB2) tracking system, etc.

Computer 30 includes a bus 35 connected to GPS chip set 31 and local communication chip set 32 via GPS interface 36 and communication interface 37, respectively. A processor 38 communicates with interfaces 36 and 37 and with memory 40 via bus 35. Memory 40 includes a combination of volatile (e.g., random access memory, or RAM) and non-volatile memory (e.g., removable and/or non-removable FLASH, EEPROM, hard drive, etc.). Stored in memory 40 are instructions for performing operations of system 10 as described herein and a tactical database (described below). Additional components communicating with processor 38 via bus 35 include a video input interface 41, video output interface 42 and sensor interfaces 43-45. Video input interface 41 receives video input from scope 17 and goggles 11 and makes that input available to processor 38. Similarly, sensor interfaces 43 and 44 receive input from sensors 13 and 18 and make sensor data available to processor 38. Other sensors (e.g., barometric sensors) may also provide input through interface 45. Processor 38 provides video output, via interface 42, to goggles 11 for presentation in a display generated within goggles 11.

FIG. 2 is merely one example of a control unit. In other embodiments, the components and/or functions shown may be combined and/or divided in various ways. As but one example, a single input interface could receive all sensor and video feed data. As but another example, some or all of the operations performed by processor 38 and other elements of control unit 16 could be performed by one or more application specific integrated circuits (ASICs), field-programmable gate arrays (FPGAs), etc. In some such embodiments, some or all of the operations described herein as being performed by processor 38 are hardwired into one or more ASICs as gates and other logic dedicated to the calculations and other operations described herein.

FIG. 3 is a block diagram showing data flows in system 10. Scope 17 receives electromagnetic input (e.g., visible light, infrared) from within its field of view. The field of view for scope 17 is shown schematically in FIG. 3 with dotted lines and labeled "scope FOV." In at least some embodiments, the scope FOV is 18°. Also shown in FIG. 3 is an optical centerline (or "line of sight") for scope 17 (also referred to herein as the "scope FOV centerline"). For ease of explanation, it is assumed in certain of the following examples that the scope FOV is a cone symmetrically centered on the scope optical centerline. This need not be the case, however, and the invention includes embodiments in which the scope FOV is asymmetric and/or differently shaped and/or not centered on an optical centerline. An example of an image from a scope with a non-conical FOV is described below in connection with FIG. 13B. Scope 17 outputs a video feed corresponding to an image of external objects within the scope FOV. For simplicity, a video image output from scope 17 will be referred to as a "scope image." Sensor 18 is coupled to scope 17 (because of both components being attached to rifle 19) and outputs data ($P_S$, $R_S$, $Y_S$) reflecting the rotational orientation of scope 17 about pitch (P), roll (R) and yaw (Y) axes (as shown in FIG. 1). In a similar manner, sensor 13 coupled to goggles 11 outputs data ($P_G$, $R_G$, $Y_G$) reflecting the rotational orientation of goggles 11 about pitch (P), roll (R) and yaw (Y) axes. Although one example of pitch, roll and yaw axes is shown in FIG. 1, other axes may be used. In at least some embodiments, sensors 13 and 18 output data at predetermined sampling intervals (e.g. 100 Hz). As indicated above, sensor 13 also includes a magnetometer. The magnetometer senses the earth's magnetic field and provides a signal (MagNorth) indicative of magnetic north.

In addition to sensor data and a scope 17 video signal, control unit 16 also receives periodic position data updates via antenna 33 and tactical data via antenna 34. As described above, position data via antenna 33 includes data from GPS satellites. Tactical data includes data providing positions and descriptions of various elements (e.g., friendly or hostile forces) in the environment in which system 10 is operating. Other types of data may be received from one or more additional sensors 55. In at least some embodiments, sensor 55 is a barometer providing data indicating changes in the elevation of system 10, which data can be used to confirm and/or adjust GPS-based elevation data.

Goggles 11 includes an array 56 of electromagnetic receptors (e.g., charge-coupled devices, photodiodes or other photo-sensitive elements, microbolometers) that receive electromagnetic radiation (e.g., visible light, IR) from within the receptor array field of view ("goggles FOV"). As with the scope FOV, some of the examples herein assume that the goggles FOV is a cone symmetrically centered about an optical centerline/line of sight (also referred to herein as the "goggles FOV centerline") extending from goggles 11. This configuration is not required, however. An example of an image from a goggles array with a non-conical FOV is described below in connection with FIG. 13A. Visible light from the goggles FOV also passes through eyepiece 12 and can be seen by the user. Although eyepiece 12 and array 56 are offset slightly from one another, the eyepiece FOV (not indicated in FIG. 3) is the same or larger than the array field of view (i.e., the goggles FOV in FIG. 3) and generally has the same center line. Array 56 generates image data (e.g., a night vision view of the environment within the goggles FOV). This image data is then provided to an image generator 57 that processes the image data into an image of objects in the goggles FOV. For convenience, an image corresponding to the data from array 56 will be referred to as a "goggles image." As explained in more detail below, the goggles image may be modified by computer 30 prior to being displayed to a user. Accordingly, the goggles image is also output via line 58 to computer 30. A video feed from computer 30 (which may contain the goggles image modified to include the scope image and other graphics) is received by projector 59 via line 61. Projector 59, through beam splitter 60, combines the goggles image with the visible light passing directly through eyepiece 12. The goggles image can also be provided directly to projector 59 from image generator 57 (e.g., if computer 30 or scope 17 becomes inoperative but night vision capability is still desired). A heads-up display (HUD) field of view (HUD FOV) is also shown in FIG. 3, and is further discussed below.

For simplicity, FIG. 3 only shows one array, one eyepiece, one projector and one beam splitter. In at least some embodiments, there is a separate arrangement of array, eyepiece, projector and beam splitter for each eye. Goggles 11 in some embodiments is a modified version of the AN/PVS-21 low-profile night vision goggles with M-2755 Enhanced Heads Up Display available from Sensor Technology Systems, Inc. of Beavercreek, Ohio. The modifications to a standard AN/PVS-21 (or other night vision goggles or enhanced vision system) required to implement various embodiments of the invention will be apparent to persons of skill in the art once such persons are provided with the information included herein.

Figure 4:
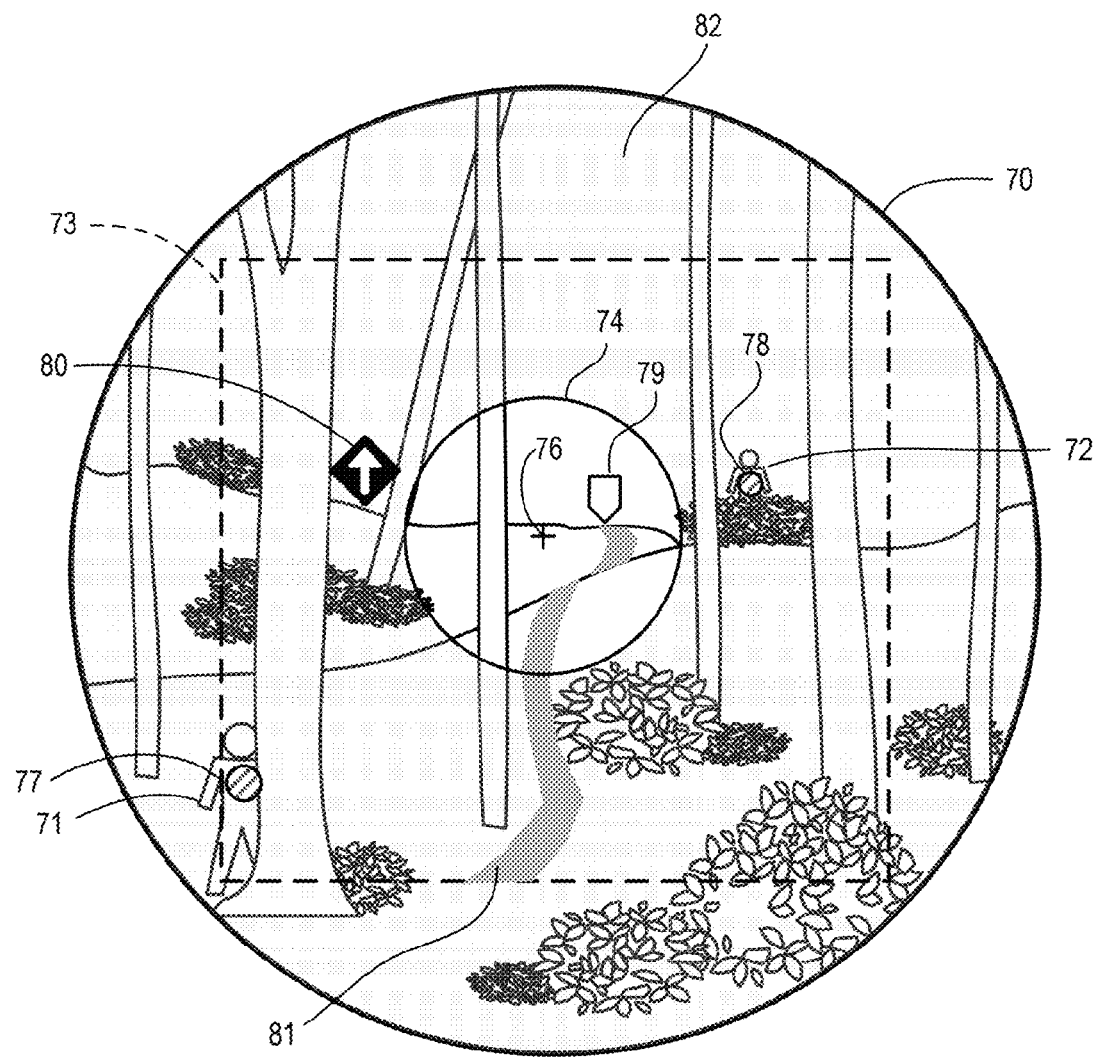
FIG. 4 is an example of a user display in the system of FIG. 1.

FIG. 4 shows an example of a user display 70 provided by goggles 11. For convenience, "user display" is used to refer to the image projected by projector 59 (FIG. 3) through beam splitter 60 into eyepiece 12, and which is visible by a wearer of goggles 11. A user display may include the goggles image (or a portion thereof), the scope image (or a portion thereof) and other graphical objects. The example of FIG. 4 assumes system 10 is being used in a forest setting, though such a setting is merely for purposes of illustration. Located within the goggles FOV (and thus in goggles image 82) are numerous trees and bushes such as might be present in a forest environment, as well as soldiers 71 (partially behind a tree in the lower left) and 72 (partially covered by foliage in the upper right). User display 70 is also slightly shaded so as to indicate that the goggles image is a night vision display. The outer circle of FIG. 4 generally corresponds to the limit of the goggles FOV. The HUD portion of user display 70 is shown as a rectangular region 73 in the center portion of the goggles FOV. As explained in further detail below, various graphical indicia are overlaid within HUD 73. Also overlaid on HUD 73 is a weapon view 74 corresponding to (and generated from) the scope image. For convenience, some of the examples herein assume that the weapon view is the same size as the scope image. This is not a requirement, however. The scope image may be cropped to provide a weapon view that is actually smaller than the scope image (or that corresponds to reduced scope FOV). Although HUD 73 is shown as a rectangle and weapon view 74 is shown as a circle in FIG. 4, other shapes could be used. In some embodiments, for example, weapon view 74 is rectangular. Portions of the scope image at the outer edges of the scope FOV may similarly be cropped so as to give a weapon view a desired shape.

As discussed below, the location and rotation of weapon view 74 within user display 70 is determined by computer 30 based on output from sensors 13 and 18 and based on comparison of the scope image with the goggles image. As rifle 19 is moved, scope images (or portions thereof) are dynamically positioned within user display 70 so as to indicate where scope 17 (and thus rifle 19) is pointing. In this manner, a user of system 10 is able to simultaneously survey a setting, acquire a target and point a weapon at the target without having to remove his or her goggles and adjust to a weapon sight.

An aiming reticle 76 is located at the center of weapon view 74, and corresponds to the rifle aim point (as zeroed to the rifle at a specified range) and lies near the scope FOV centerline. Various other graphical objects are also included in the HUD. For example, "friendly" icons 77 and 78 are positioned upon soldiers 71 and 72. In this manner, the user of system 10 is aware that soldiers 71 and 72 should not be fired upon. Also shown in display 70 is an icon 79 indicating the location of (or direction to) a rally point (i.e., a position determined in advance of a tactical operation and at which persons involved in the operation may regroup). Icon 80 shows a reported location of an enemy machine gun position. Colored path 81 indicates a preplanned route. Additional details of generating the graphical objects in display 70, as well as examples of other graphical objects that could be included in display 70, are provided below.

Figure 5A:
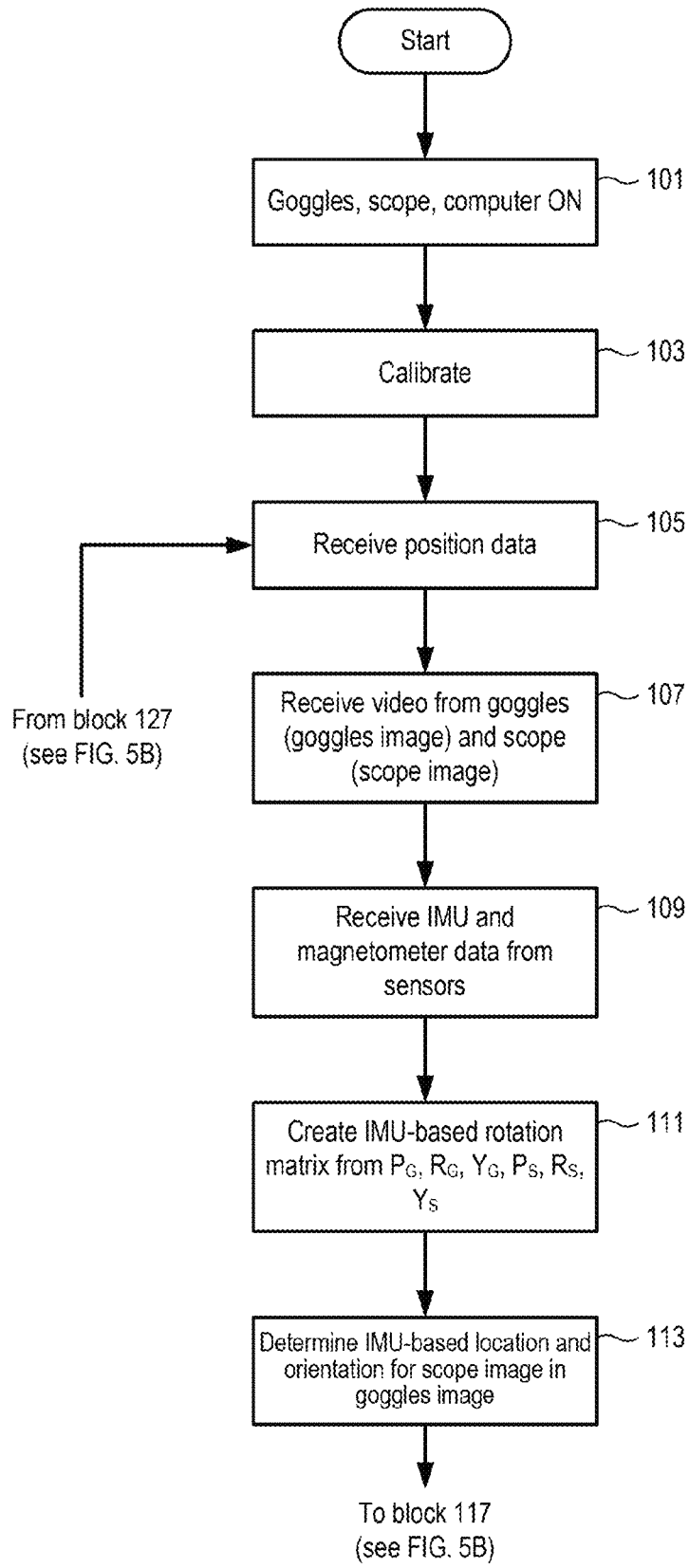
FIGS. 5A and 5B are a flow chart explaining operation of the system of FIG. 1.
Figure 5B:
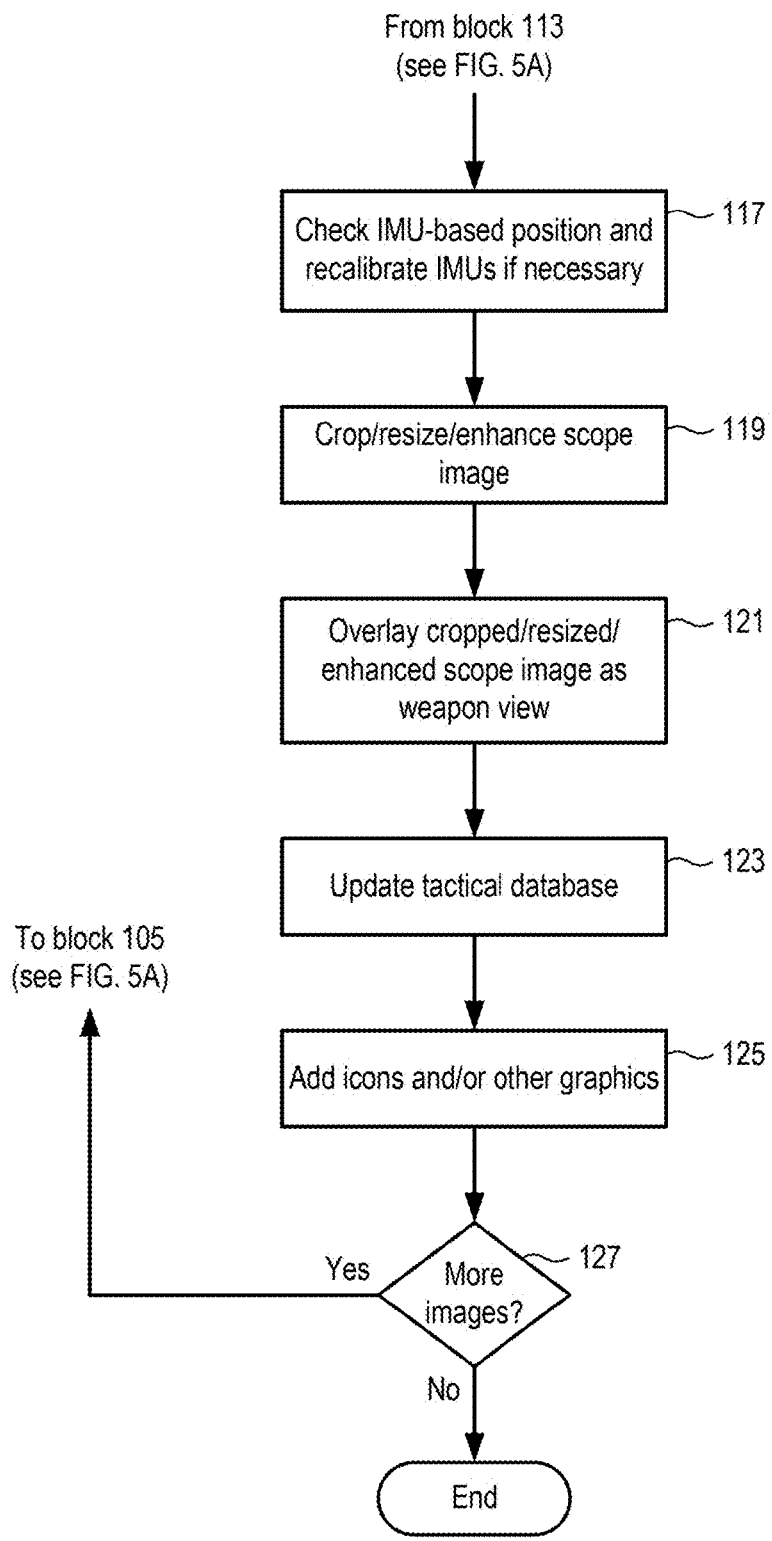

FIGS. 5A and 5B are a flow chart explaining the operation of system 10. The steps shown in FIGS. 5A and 5B (and in other flow charts described below) can be reordered, combined, split, replaced, etc. For example, FIGS. 5A and 5B are not intended to indicate a requirement that all steps be performed as part of a single algorithm. Many aspects of system 10 operation could be accommodated on multiple independently-running parallel program threads or as processes running in parallel on an ASIC, an FPGA, multiple processors, etc. Moreover, all of the operations shown in the flow charts of FIGS. 5A through 5B would not necessarily be performed the same number of times as is suggested by the flow chart. As but one example, refreshing and/or updating of icons (or of certain icons) might occur at a different rate than updating and/or repositioning of weapon view 74.

Beginning in block 101, a user activates system 10, and goggles 11, control unit 16 and scope 17 are energized. Sensors 13 and 18 are also energized. The system is then calibrated (block 103). In at least some embodiments, a user of system 10 remains motionless for a period of time so as to allow rate sensors and accelerometers in sensors 13 and 18 to stabilize, determine a down vector, etc. In at least some embodiments, IMU sensors 13 and 18 can both determine a common down vector based on the earth's gravitational field. The sensors thus require no further initial calibration as to the pitch and roll axes. However, each sensor randomly chooses a zero-yaw orientation. Accordingly, sensors 13 and 18 must be further calibrated so that a baseline difference between the zero-yaw orientation can be determined. For example, sensor 18 on rifle 19 might arbitrarily choose a zero-yaw position that corresponds to rifle 19 pointing along a 37 degree compass heading, and sensor 13 on goggles 11 might arbitrarily choose a zero-yaw position that corresponds to the optical centerline of the goggles FOV pointing along a 246 degree compass heading. In at least some embodiments, this difference in zero-yaw orientations is determined by the user looking at a distant (e.g., over 300 meters away) object through goggles. A calibration reticle corresponding to the goggles FOV centerline is shown in the goggles display. The user then moves rifle 19 so that a reticle corresponding to the centerline of scope 17 is aligned with the goggles reticle and presses a "calibration" button.

After initial calibration, computer 30 receives position data for system 10 from GPS chipset 31 (FIG. 2) and/or from data communication chipset 32 in block 105. In block 107, computer 30 receives data for a video frame (i.e., a scope image) from scope 17 and data for a goggles image from image generator 57. Operation then proceeds to block 109, where computer 30 receives angular pitch ($P_G$), roll ($R_G$) and yaw ($Y_G$) orientation data for goggles 11 from sensor 13. Computer 30 also receives pitch ($P_S$), roll ($R_S$) and yaw ($Y_S$) data from sensor 18. Data values from sensors 13 and 18 indicate the angle of vertical rise (pitch), the angle of horizontal rotation (yaw), and the angle of rotation around the line of sight (roll), for both goggles 11 and scope 17, which because of calibration share the same coordinate system.

In block 111, the pitch, roll and yaw angle values from (goggles) IMU 13 and the pitch, roll and yaw angle values from (scope) IMU 18 are used to create an IMU-based rotation matrix. The IMU-based rotation matrix is then used in block 113 to calculate a location (i.e., horizontal and vertical position) and an image rotation for the scope image within the goggles image (and thus, the correct placement of weapon view 74 in user display 70). Rotation matrices and the use of same to place and orient one image within another are known in the art and/or would be readily apparent to persons of ordinary skill in the art once such persons are provided with the information contained herein. As part of the IMU-based location and image rotation calculation, computer 30 adjusts for differences between scope 17 (and a scope image) and array 56 (and a goggles image). For example, the goggles FOV in some embodiments is 40° and the scope FOV is 18°. Moreover, array 56 and a similar sensor array in scope 17 may have different numbers of pixels and/or different pixel pitches. Adjusting for these and other differences between scope 17 and goggles 11 so as to determine a linear distance up or down on user display 70 (and an image rotation) is within the ability of persons skilled in the art once such persons are supplied with information provided herein.

Figure 6A:
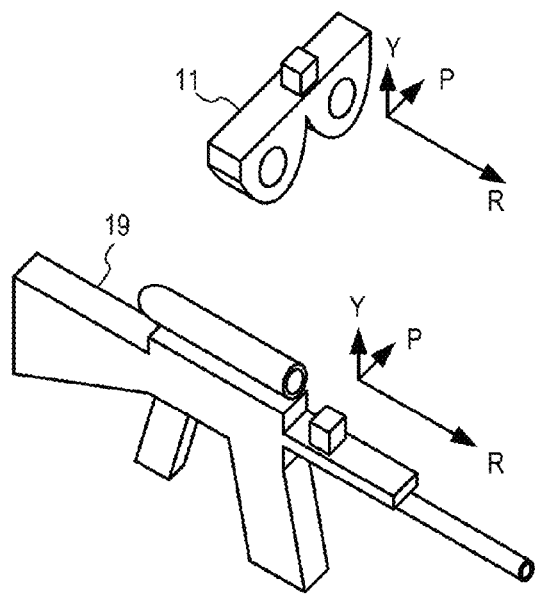
FIGS. 6A through 6F illustrate positioning of one video image within another based on data from inertial measurement units.
Figure 6B:
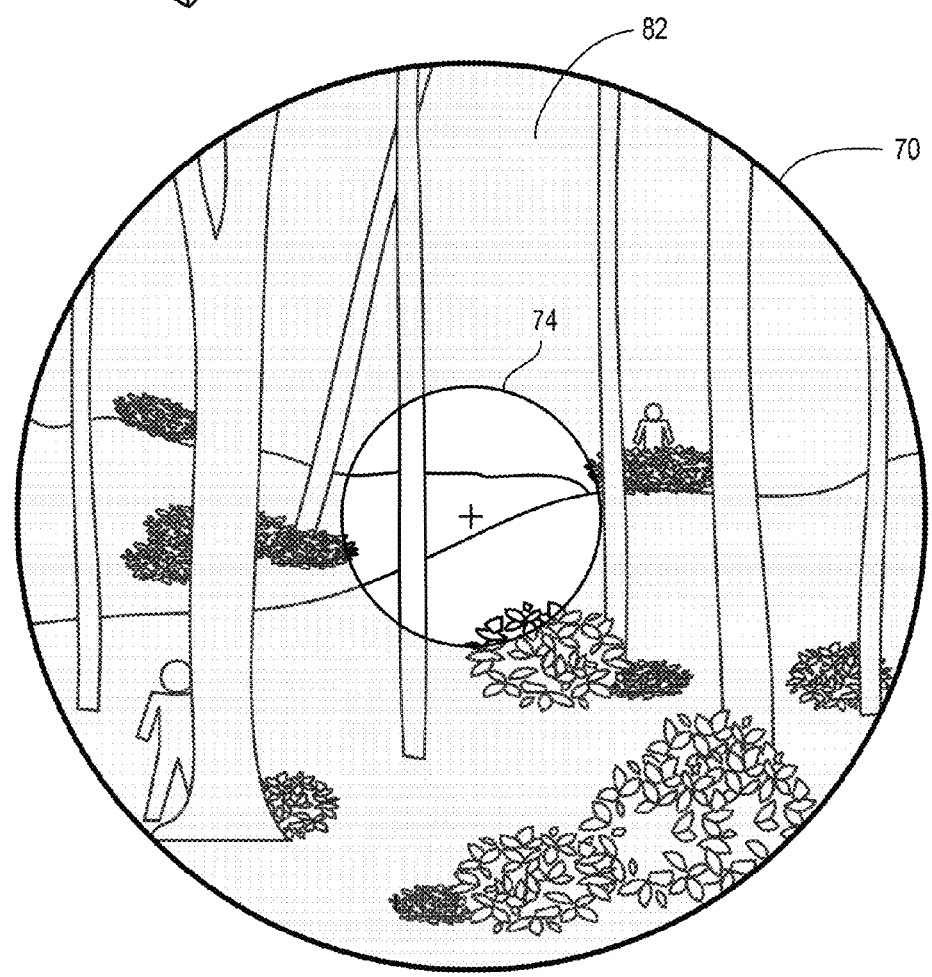

Turning briefly to FIGS. 6A through 6H, positioning and rotating a weapon view 74 within display 70 based on data from sensors 13 and 18 is generally illustrated. FIGS. 6A through 6H assume data from sensors 13 and 18 is accurate (e.g., not significantly affected by bias drift) and that weapon view 74 is generated based on the IMU sensor data only. For convenience, HUD 73 and various icons and other indicia included in FIG. 4 are omitted from FIGS. 6B, 6D, 6F and 6H. In FIG. 6A, goggles 11 are looking in exactly the same direction that rifle 19 is pointed. This results in a centered weapon view 74 (FIG. 6B), and computer 30 places an image from scope 17 directly over the center of goggles display 82.

Figure 6C:
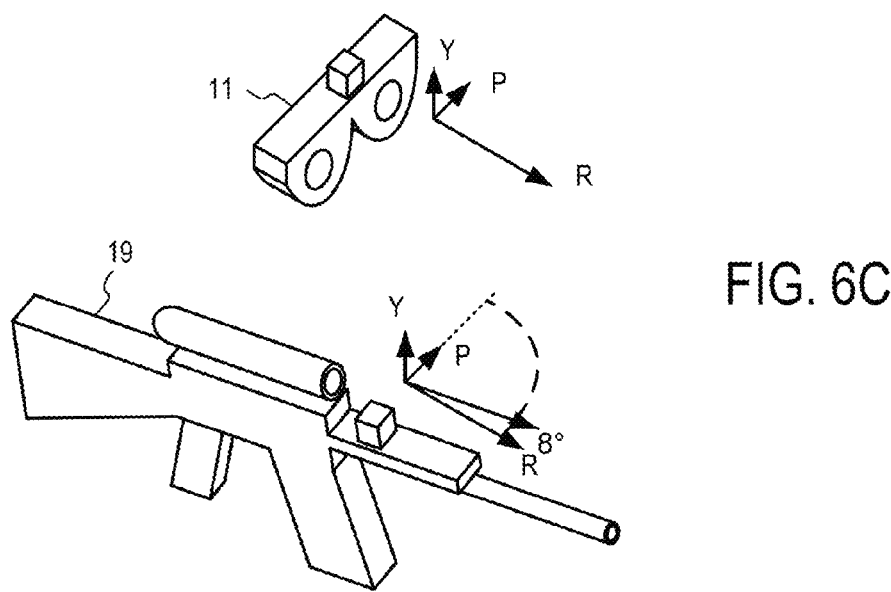
Figure 6D:
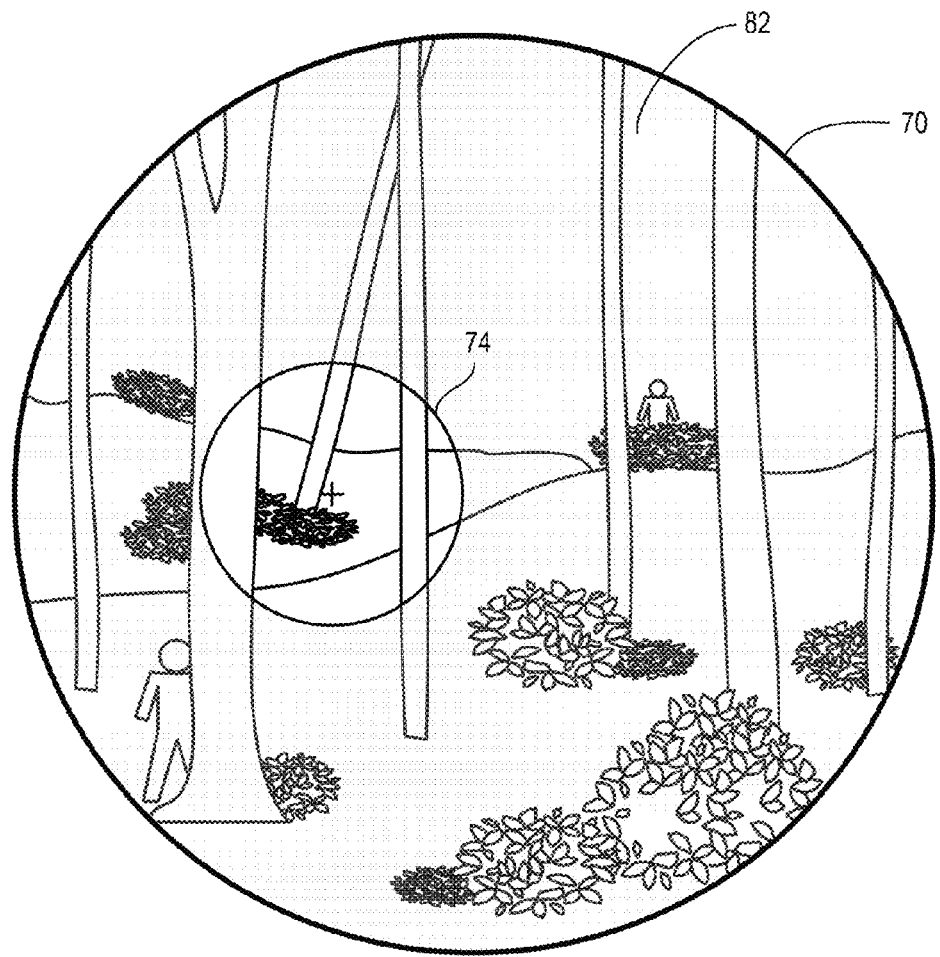

In FIG. 6C, rifle 19 has yawed eight degrees to the left. FIG. 6D depicts the subsequent change in user display 70. The pitch and roll values detected by sensors 13 and 18 remain unchanged, but the yaw value detected by sensor 18 will change by minus eight degrees (or positive eight degrees, depending on the chosen convention). When this is compared to the values detected by sensor 13 (which have not changed in the present example), the proper location for the scope image will be −8 degrees from the HUD centerline. Accordingly, the placement of weapon view 74 in the heads up display is shifted to the left as shown (the same result would have been obtained if rifle 19 was held still and goggles 11 yawed eight degrees to the right). In at least some embodiments, for scope/goggles movements that would otherwise move weapon view 74 beyond the HUD width, weapon view 74 remains at the edge of HUD 73. In such a case, however, computer 30 gives weapon view 74 a distinctive border to indicate to the user that rifle 19 is pointing outside the visual field of goggles 11. Weapon view 74 remains visible in such embodiments so as to provide the user a view of where the weapon is pointing (e.g., allowing a user to aim and shoot around a corner).

Figure 6E:
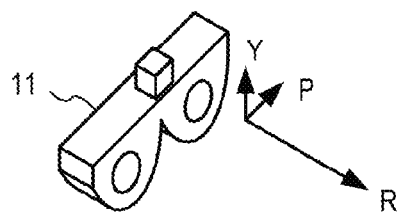
Figure 6F:
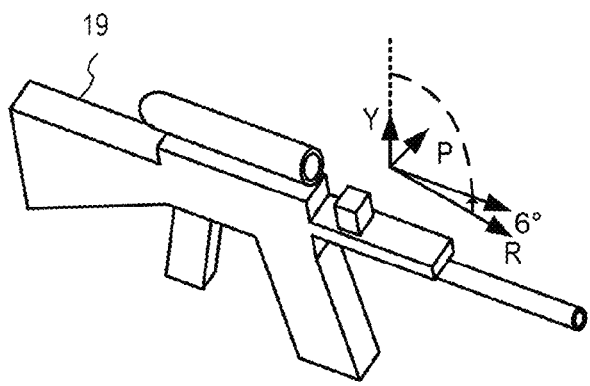
Figure 6F:
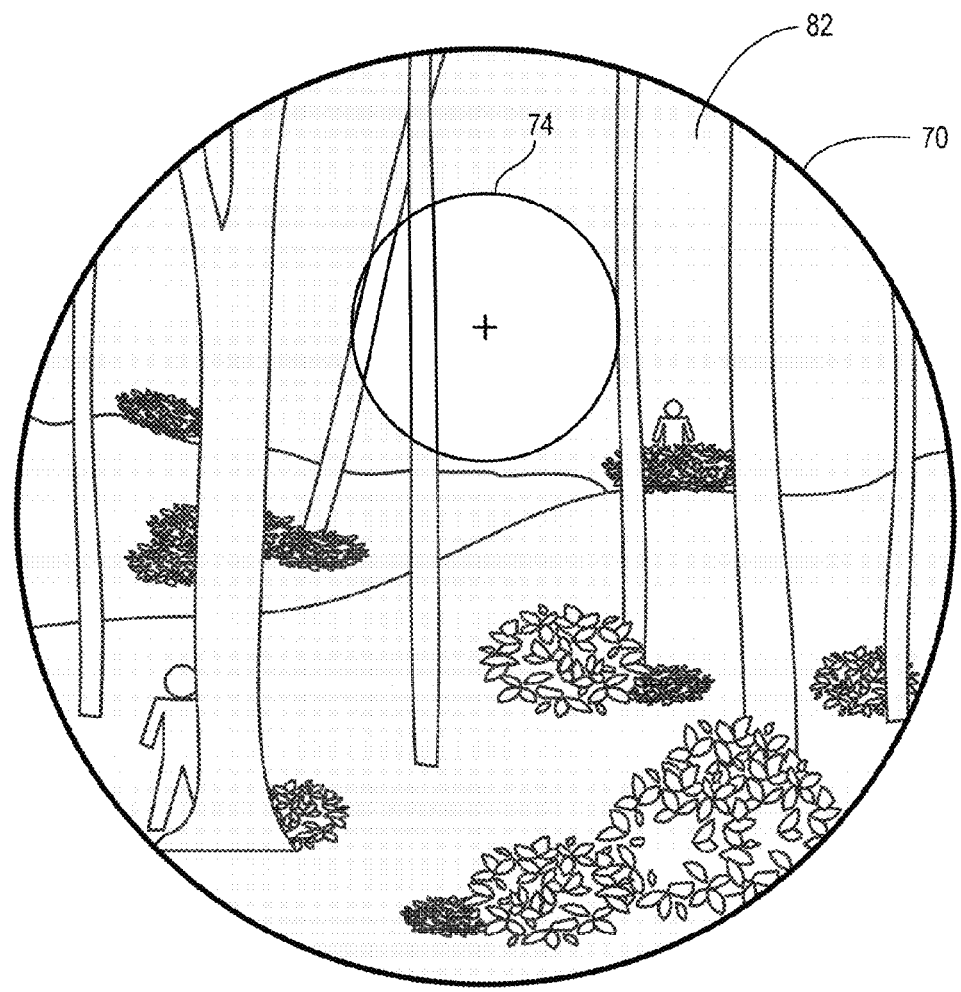

In FIG. 6E, rifle 19 has been pitched upward six degrees. The yaw and roll values detected by sensors 13 and 18 remain unchanged, but the pitch values from sensor 13 and from sensor 18 differ by six degrees. This results in weapon view 74 being shifted upward within display 70 as shown in FIG. 6F.

For ease of explanation, parallax is ignored in the explanation of FIGS. 6A through 6F. Because video sources within goggles 11 and scope 17 are separated by some distance (e.g. 0.5 meters, typically mostly vertical), the devices will in fact be looking at slightly different points even if they are in perfect alignment. As a result, in processing a video frame from scope 17, the location where the frame is placed may be slightly off, and a displayed frame of video will not be aligned as perfectly as possible. However, this problem diminishes as the distance to a target increases. For example, a target at 10 meters with 0.5 meters between scope 17 and goggles 11 produces an error of about 2.9 degrees in the placement of a weapon view. At 100 meters, with the same 0.5 meters between scope 17 and goggles 11, the error is only 0.29 degrees. For larger distances, image comparison position calculations (described below) compensate for errors caused by parallax.

At shorter distances, parallax is in many applications a non-issue. At least some implementations of system 10 are predominantly intended for use against targets at distances greater than 10 meters. Moreover, when targeting a weapon using system 10, weapon view 74 will ultimately be the source of assurance that the weapon is pointed at a proper target. Even if weapon view 74 is slightly misaligned with the surrounding portions of the goggles view, the soldier will be primarily concerned that the weapon is pointed at the correct target, and weapon view 74 will still accurately show the intended target. Additionally, if it is known a priori that targets will be at a short range (e.g., during a room-clearing operation), calibration can be performed using a target at the presumed average range of real targets to be encountered (rather than at 300+ meters), thus minimizing the effects of parallax.

Figure 6G:
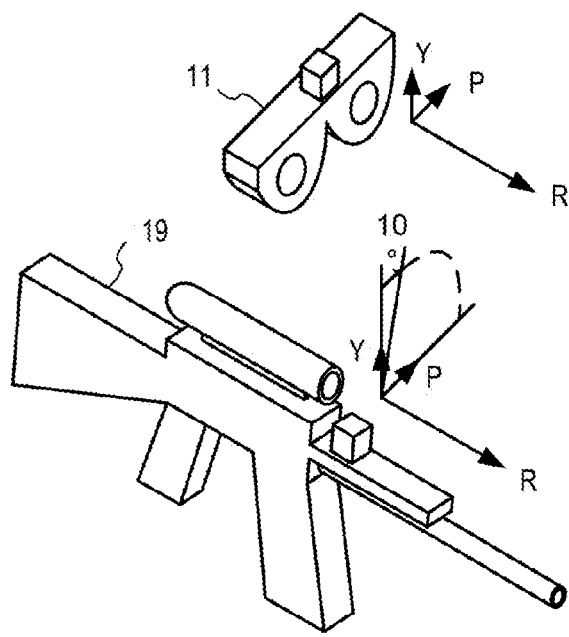
FIGS. 6G and 6H illustrate rotation of one video image within another based on data from inertial measurement units.
Figure 6H:
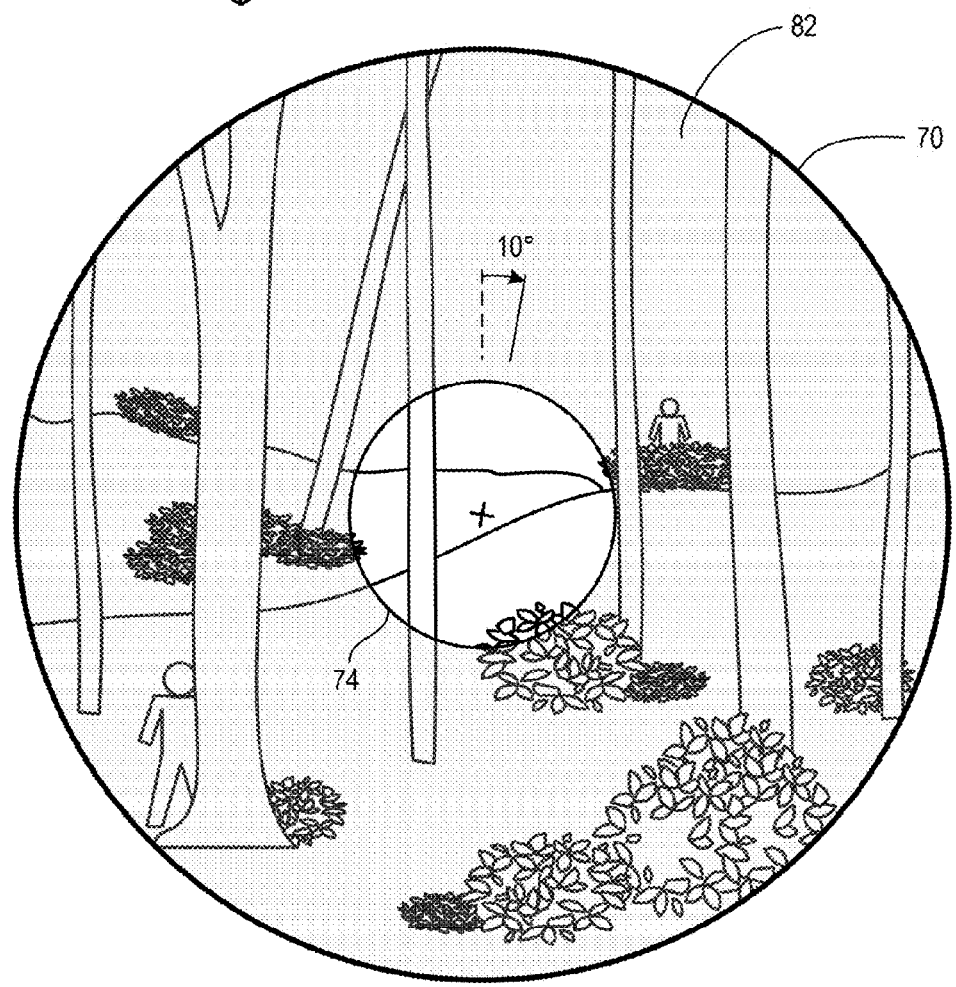

FIGS. 6G and 6H show rotation of weapon view 74 in display 70. Based on the data received from sensors 13 and 18, computer 30 calculates an amount by which weapon view 74 should be rotated within display 70 so as to be properly registered with the remainder of display 70. Various algorithms for rotating an image by a desired amount are known in the art. In the example of FIGS. 6G and 6H the image rotation of weapon view 74 is ten degrees.

Returning to FIG. 5A, flow proceeds from block 113 to block 117 of FIG. 5B. In block 117, the IMU-based calculation for position and rotation of weapon view 74 within display 70 is checked using an image-based method. This permits computer 30 to adjust the manner in which IMU-based positions and rotations are calculated, thereby correcting for bias drift and helping to maintain proper registration of the scope image within the goggles image. As used herein, "registration" refers to positioning of a scope image (or a portion of that scope image) within a goggles image so that the two images are properly aligned and positioned, and one image coincides with the other.

Although IMU-based orientation determination is relatively simple from a computational standpoint and is generally quite robust over short periods of time, IMUs can have certain disadvantages. For example, IMUs have bias drift rates and may be susceptible to significant overshoot if moved rapidly. To address these concerns, the relative orientation of goggles 11 and scope 17 can be independently deduced by processing image data from image generator 57 and scope 17 if there is sufficient image content and contrast and if similar imaging technologies (e.g., microbolometers, CCD, etc.) are used. By checking the IMU-based position and image rotation calculations using an image comparison, the manner in which data from IMU sensors is used can be periodically recalibrated and the effects of bias drift, etc. reduced.

If certain conditions are satisfied, the image from scope 17 can be considered a dilated, translated and rotated distortion of the image generated from image generator 57. The angle between the viewing vector of array 56 (i.e., the goggles FOV centerline) and the viewing vector of scope 17 (the scope FOV centerline) should not be too great (i.e., so the image from scope 17 is contained within the goggles image). If the angle is too great as determined by IMU readings (such as when an operator looks away from where the weapon is pointed), the image comparison algorithm is (in some embodiments) not invoked until the IMU data indicates that the angle is within acceptable limits for image comparison. The distance between goggles 11 and scope 17 should also be small compared to the distance from goggles 11 and scope 17 to objects being viewed. This ensures that parallax effects do not disrupt a simplifying assumption that the goggles FOV centerline and the scope FOV centerline are co-located.

In at least some embodiments, image-based position calculation relies on Brouwer's Fixed Point Theorem. This theorem holds that a continuous mapping from a planar region onto itself is guaranteed to have one point whose coordinates are left unchanged by the mapping. If the scope image is a dilated, translated and rotated distortion of the goggles image, then there will be at least one point in the goggles image that has the same position in both the goggles and scope images. For example, assume the position of the fixed point is at (u,v) in local coordinates of the goggles image and at (u',v') in local coordinates of the scope image. Brouwer's theorem holds that u=u' and v=v'. The location of the fixed point constrains the solution of the proper orientation of the scope image relative to the goggles image up to a twist rotation. The twist rotation is about an axis corresponding to a line defined by the center of projection of the scope camera and the point u',v' (i.e., the fixed point) on the scope camera focal plane. If the Brouwer fixed point for the goggles and scope images is at the center of the scope image, the twist rotation corresponds to the difference between the roll axis orientations of goggles 11 and scope 17.

The Brouwer fixed point can be found by scanning and comparing a goggles image and a scope image and determining a location where a rotationally invariant similarity metric is maximized. One such metric is the peak to sidelobe ratio (PSR) of a cross correlation of two linear signals. One of those signals is from a small annular region centered about a location in a goggles image and the other is from an annular region (of the same angular size) centered about a location in the scope image. If the PSR for those two annular regions is the maximum, the centers of those annular regions represent the Brouwer fixed point. Numerous definitions of PSR are known in the art and can be used in different embodiments. For example, PSR can be defined as (PEAK−mean)/σ, where PEAK is a peak cross correlation value for the centers of the two annular regions, and where mean and σ are the respective mean and standard deviations of cross correlation values for the annular regions.

Once the Brouwer fixed point is found, and assuming the scope image and goggles image are within a sufficiently close wavelength range (e.g., if the scope 17 and array 56 are both sensitive to IR at wavelengths between 8 and 12 microns) the twist rotation about the fixed point can be deduced from the phase shift of the two signals. The phase shift is proportional to the displacement of the cross correlation peak used in the PSR calculation between the two signals. That is, starting from the zero point of each annulus (as defined by image orientation) and taking signal values around the annulus, determine the angular displacement from zero for each peak. The difference between these two angles is the phase shift.

Figure 7:
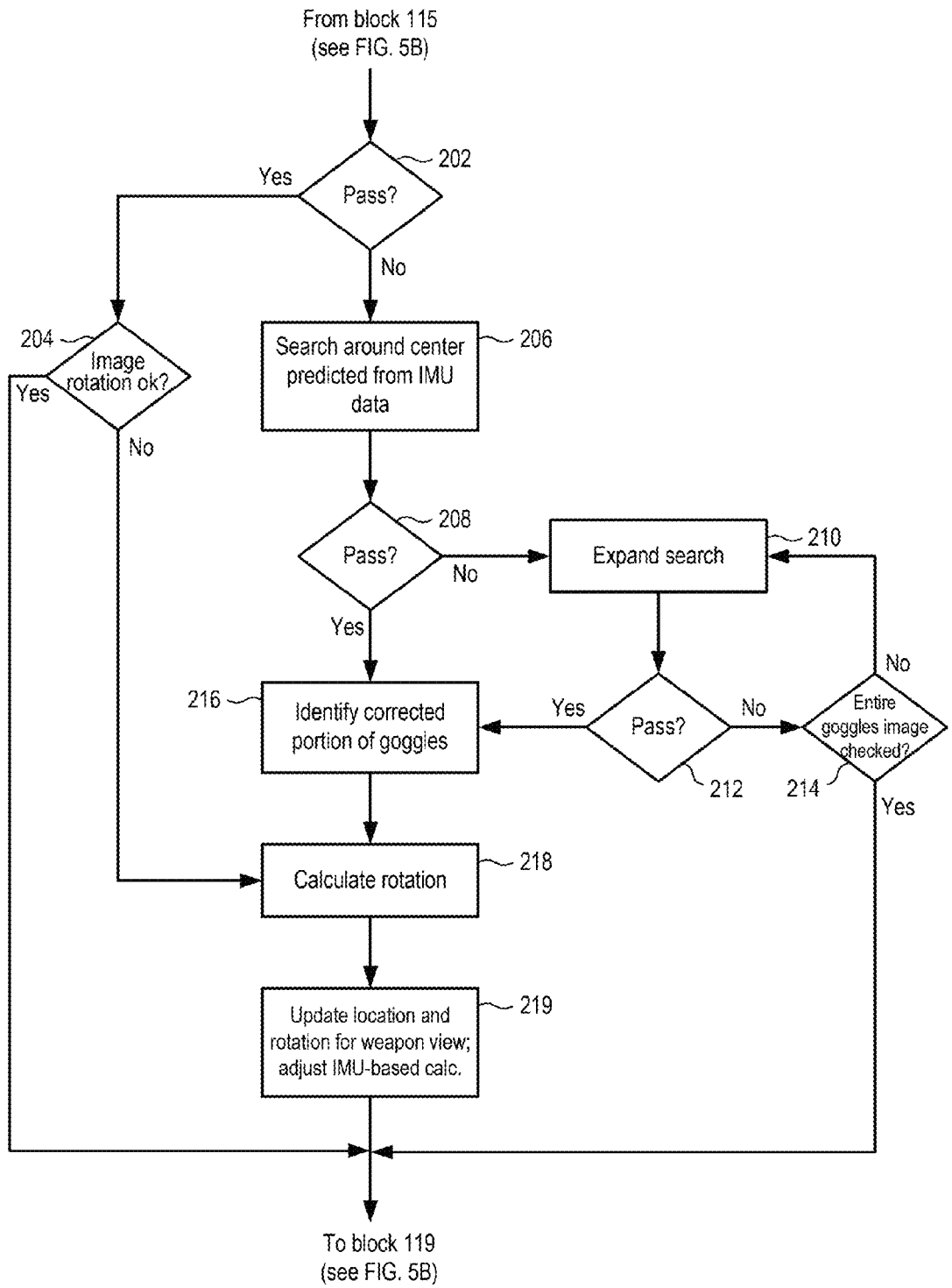
FIG. 7 is a flow chart providing additional details for a block in the flow chart of FIGS. 5A and 5B.

FIG. 7 is a flow chart providing additional details about the operations performed within block 117 of FIG. 5B in some embodiments. In block 202, computer 30 performs an image-based check on a point of interest in the portion of the goggles image identified (using IMU data from sensors 13 and 18) as corresponding to the center of the scope image. "Point of interest" refers to a point in an image (a center of a portion of the goggles image in the current example) that is being evaluated as possibly corresponding to a point on the other image (the center of the scope image in the current example). If the image-based check passes, the values for the IMU-based rotation matrix (and thus, the center for weapon view 74 predicted by that IMU-based rotation matrix) are verified, and computer 30 proceeds to block 204 on the "yes" branch. If the image-based check fails, computer 30 proceeds on the "no" branch to block 206. As described in more detail below, computer 30 will in block 206 and in subsequent blocks expand the search (primarily in the global yaw plane) to perform image-based checks on additional points of interest in the goggles image.

Figure 8A:
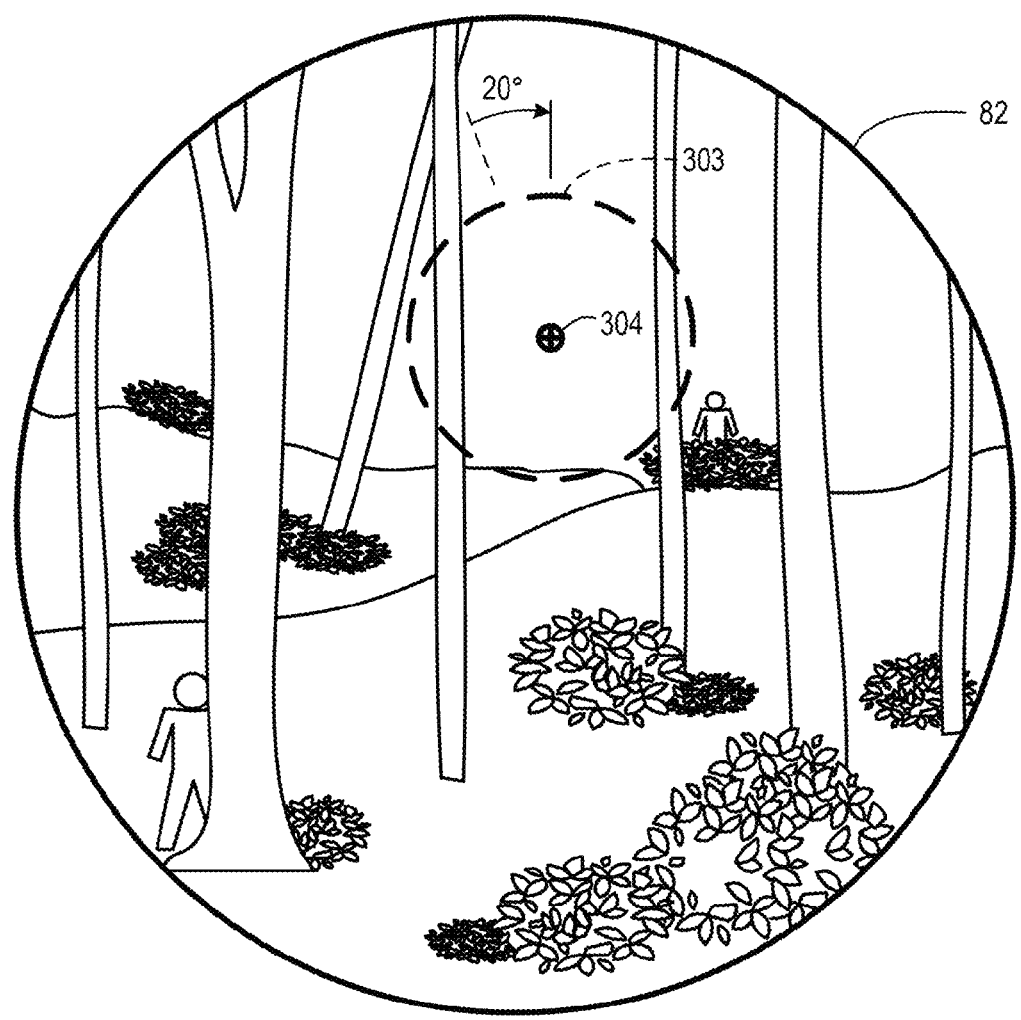
FIGS. 8A through 8K illustrate checking and/or correcting an IMU-based position for one video image within another video image.
Figure 8B:
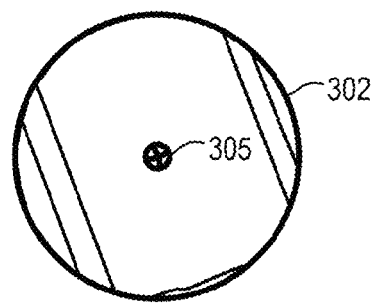

Turning briefly to FIGS. 8A through 8G, the performance of an image-based check according to at least some embodiments is explained. FIGS. 8A through 8G conceptually illustrate a case in which the image-based check verifies the position for the scope image calculated with IMU data from sensors 13 and 18. As in FIGS. 6B, 6D, 6F and 6H, HUD 73 and other elements shown in FIG. 4 have been omitted from FIGS. 8A through 8G. FIG. 8A shows a goggles image 82, and FIG. 8B shows a scope image 302. In the example of FIGS. 8A and 8B, the user is holding his head level but has tilted rifle 19 twenty degrees (20°) to the left. Shown in FIG. 8A (with broken lines) is the portion 303 of goggles image 82 where computer 30 intends (relying on the IMU-based rotation matrix) to place scope image 302. The center 304 of portion 303 is also indicated; so as to avoid confusion with the aiming reticle of the weapon view, the center is shown as a "+" inside of a circle. The broken line 303 in FIG. 8A only shows the portion of goggles image 82 over which scope image 302 of FIG. 8B would be overlaid. The intended rotation of scope image 302 within goggles image 82 (according to the IMU-based rotation matrix) is shown in FIG. 8A as the arcuate dimension "20°."

Figure 8C:
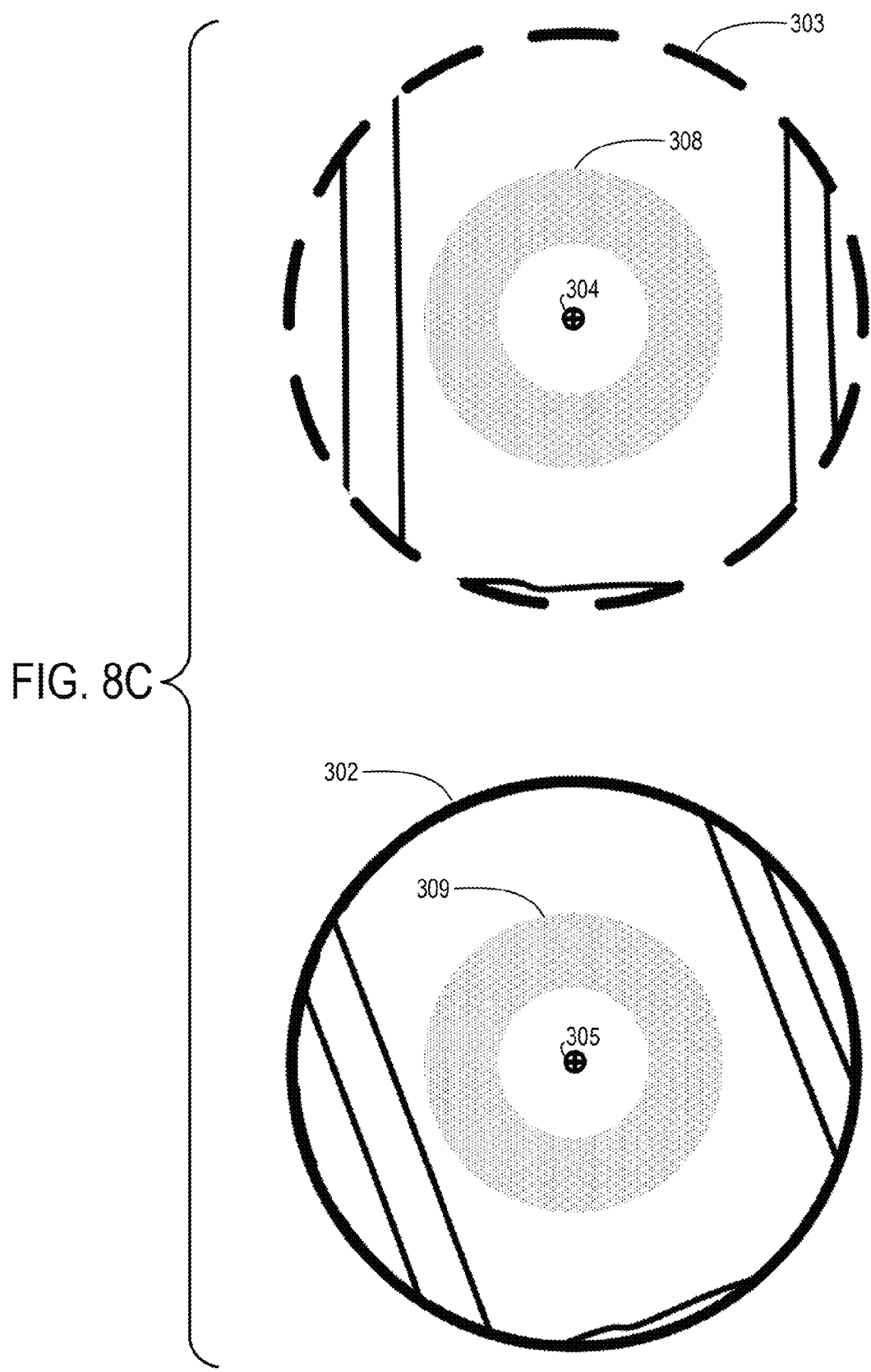
Figure 8D:
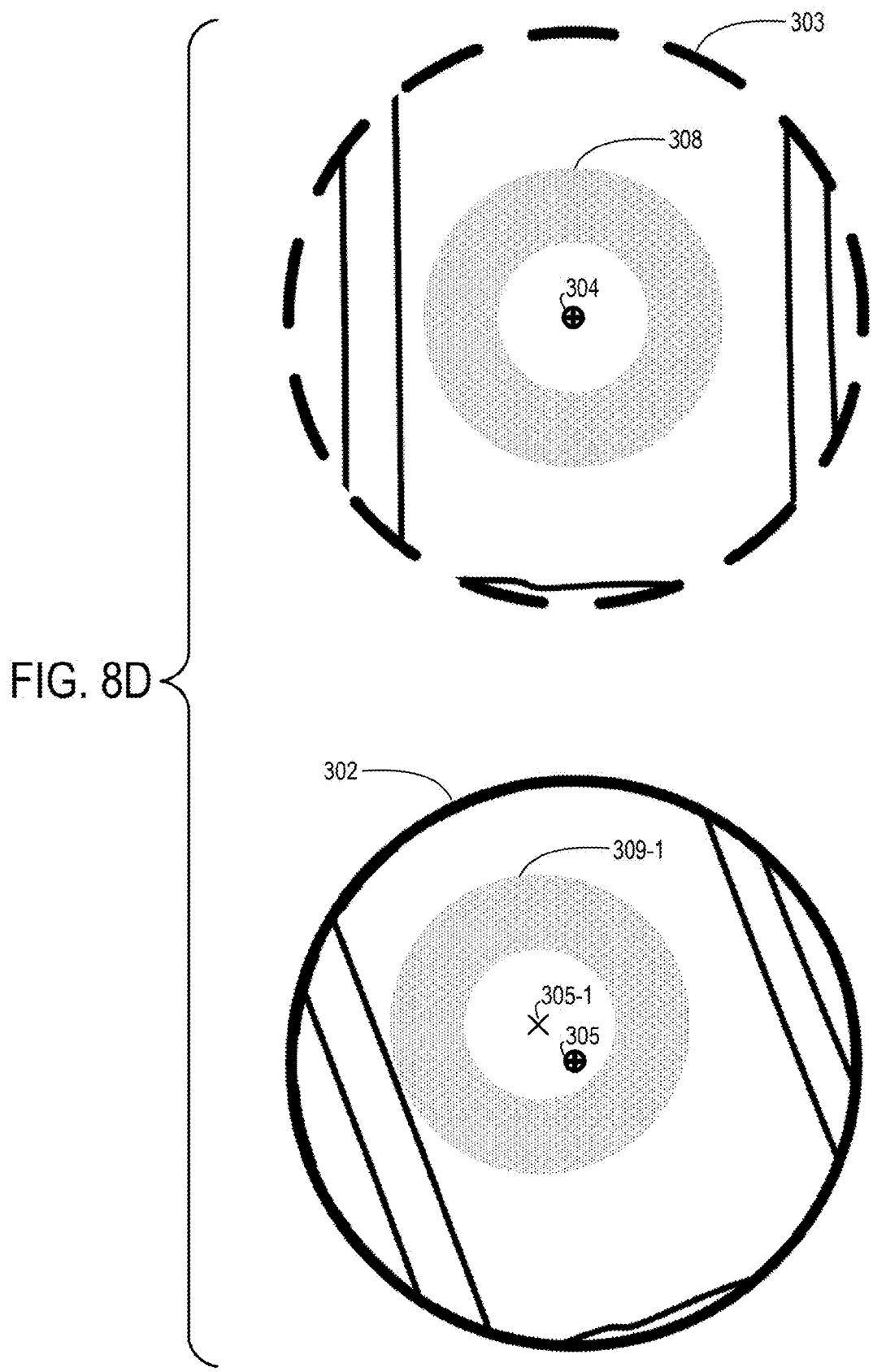
Figure 8E:
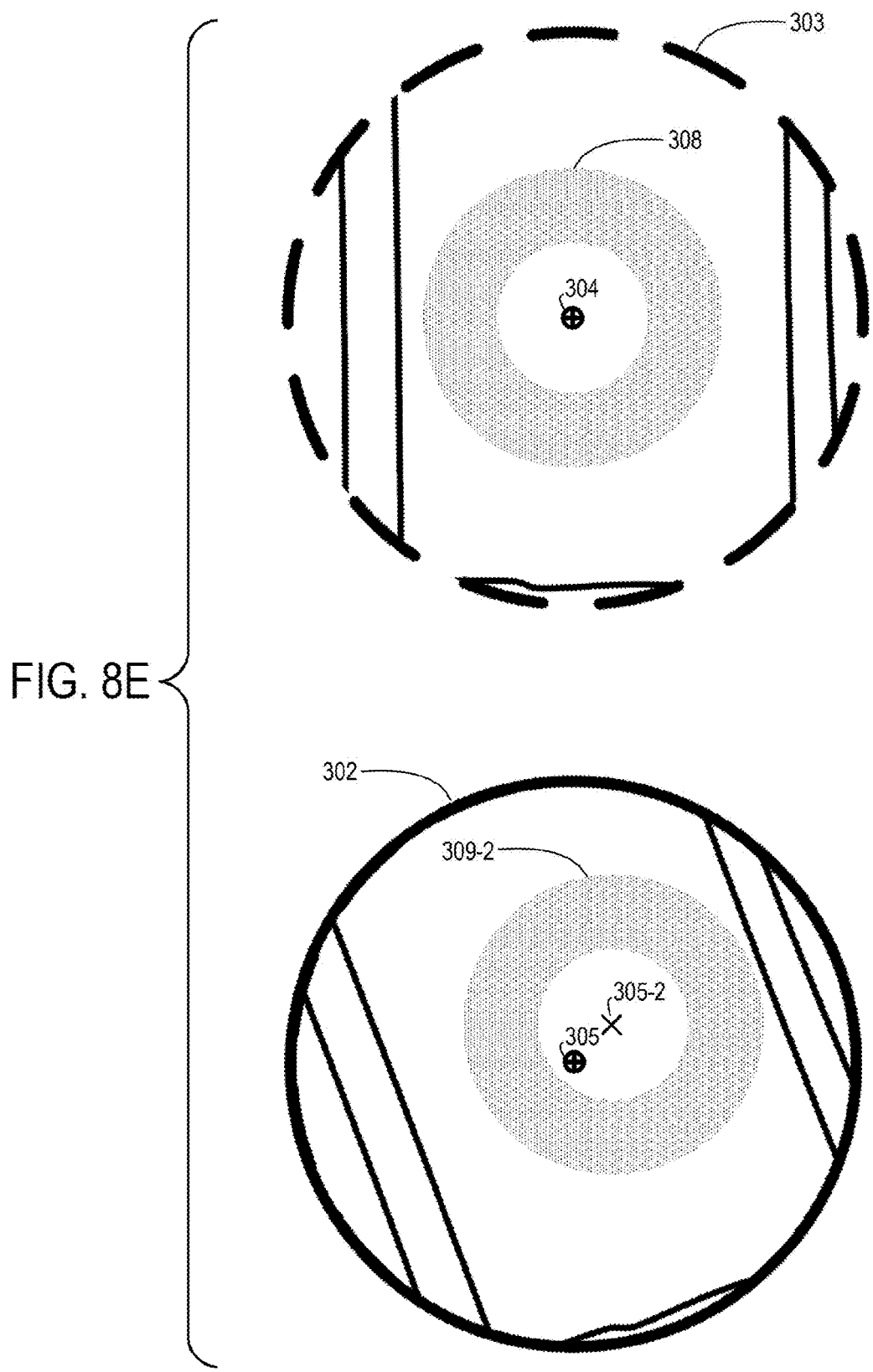
Figure 8F:
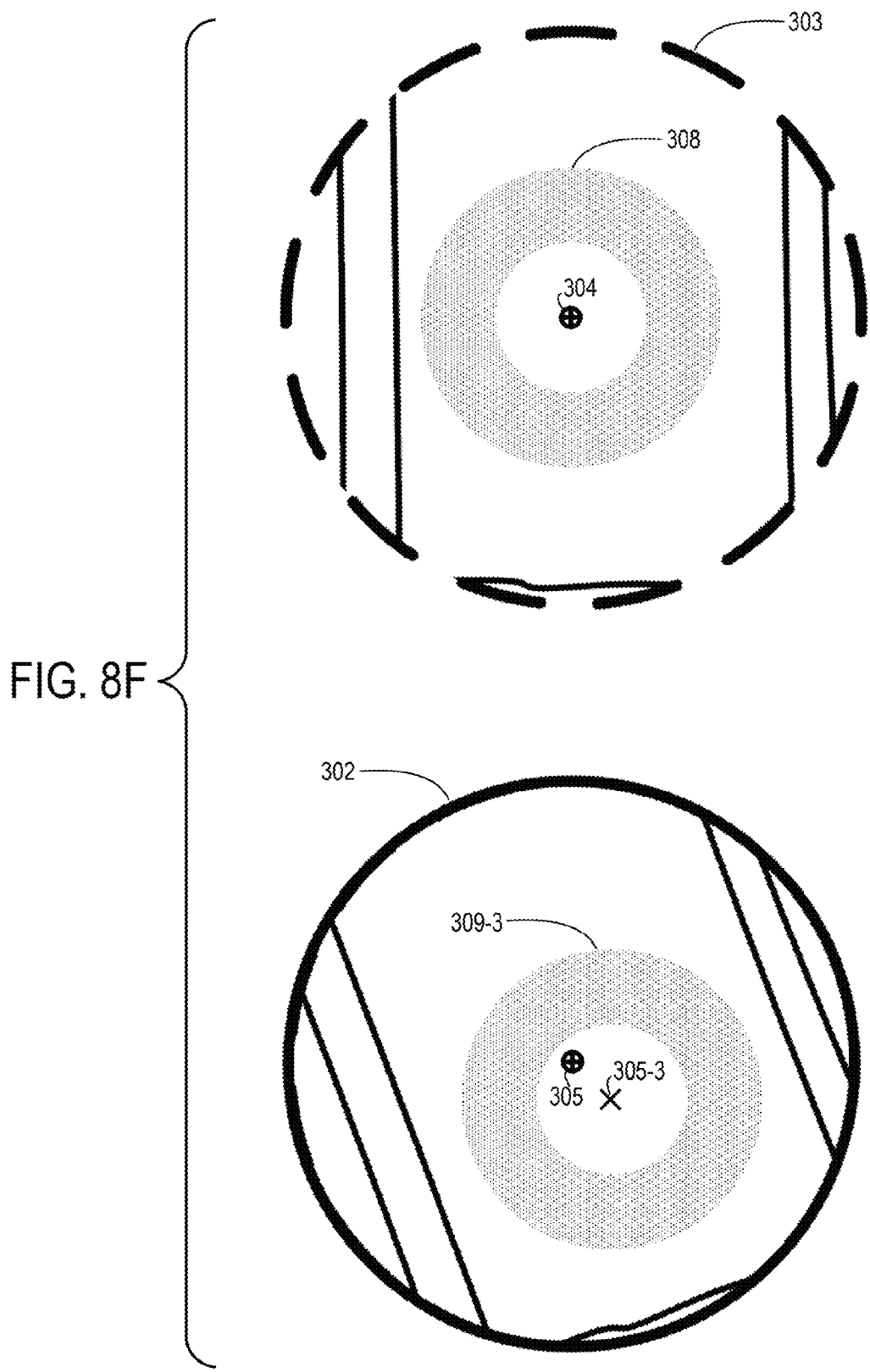
Figure 8G:
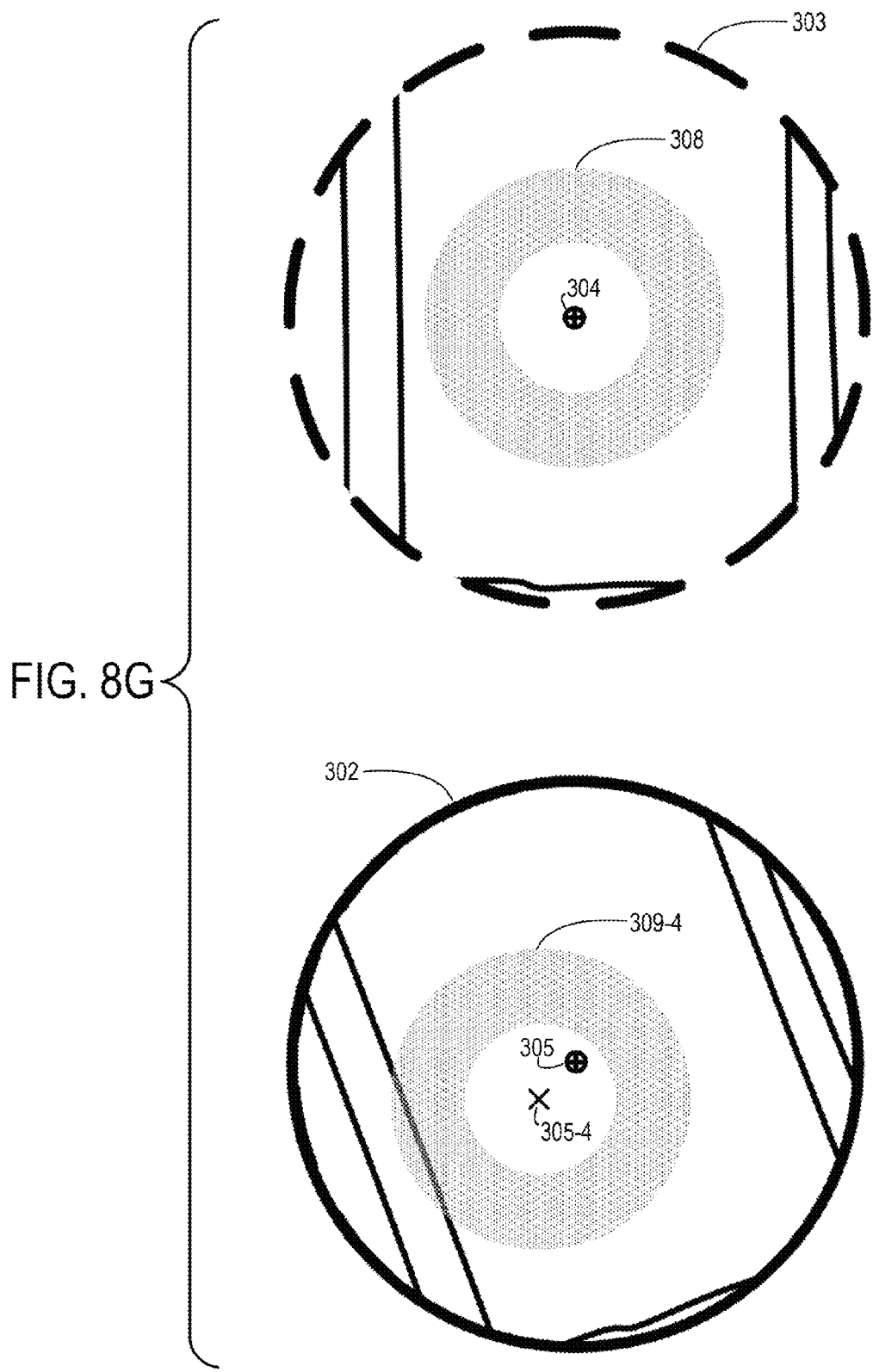

In block 202 of FIG. 7, computer 30 performs an image-based check of point 304 so as to evaluate the validity of point 304 as the center of a weapon view. Stated differently, computer 30 initially assumes that points 304 and 305 are the Brouwer fixed point. As part of the image-based check of point 304, several PSRs are calculated using a region of goggles image portion 303 and regions of scope image 302. As seen in FIG. 8C, a first PSR calculation is based on a cross correlation using the pixel intensity values of the equally-sized annular regions 308 and 309 respectively centered on the center points 304 and 305 of goggles image portion 303 and scope image 302. The PSR value from this calculation (PSR[304:305]) is then compared to PSRs calculated for annular regions centered on locations around center 305 of scope image 302. For example, and as shown in FIG. 8D, another PSR (PSR[304:305-1]) is calculated based on a cross correlation using the pixel intensity values of the equally-sized annular regions 308 and 309-1 respectively centered on points 304 and 305-1 of goggles image portion 303 and scope image 302. Similarly, PSR[304:305-2], PSR[304:305-3] and PSR[304:305-4] are calculated based on cross correlations using the pixel intensity values of equally-sized annular regions 308 and 309-2 (centered on point 305-2, as shown in FIG. 8E), equally-sized annular regions 308 and 309-3 (centered on point 305-3, as shown in FIG. 8F) and equally-sized annular regions 308 and 309-4 (centered on point 305-4, as shown in FIG. 8G).

Point 304 passes the image-based check (i.e., the assumption that points 304 and 305 are the Brouwer fixed point is validated) when computer 30 determines that PSR[304:305], PSR[304:305-1], PSR[304:305-2], PSR[304:305-3] and PSR[304:305-4] are within an acceptable range of one another. An acceptable PSR range will depend on the characteristic performance of the sensor technology (microbolometer, etc.) being used in the imaging sources (scope 17 and array 56 in the present example), as well as on peculiarities of a given manufacturer's implementation of a particular class of sensor. The acceptable PSR range for a given combination of a goggles sensor type and a scope sensor type can be determined by comparing a series of exemplar images obtained using samples of those two sensor types. Determining an acceptable range is within the routine ability of a person of ordinary skill in the art once such a person is provided with the information contained herein.

Although five PSR values were obtained in the image-based check of the preceding example, this need not be the case. In other embodiments, an image-based check of a point of interest calculates PSR values using regions centered on more or fewer points around the center 305 of scope image 302. Those points around center 305 could also have locations (relative to center 305) other than as shown for points 305-1 through 305-4. In still other embodiments, PSRs for an image-based check of a goggles image point of interest are based on annular regions centered on points around that goggles image point of interest instead of annular regions centered on points surrounding the scope image.

Returning to FIG. 7, and as mentioned above, computer 30 moves to block 204 from the "yes" branch of block 202 if the image-based check for the IMU-based center of the weapon view passes. In block 204, computer 30 determines if there is a roll difference between the two images. In particular, computer 30 calculates the phase shift of the scope image and goggles image and deduces a twist rotation from the phase shift. If the difference between the twist rotation and the IMU-based roll difference is within acceptable limits (e.g., less than five degrees), the IMU-based value (and thus, the rotation of the scope image within the goggles image predicted by IMU data) is verified, and operation proceeds to block 119 of FIG. 5B. If the difference between the twist rotation and IMU-based rotation is not within acceptable limits, computer 30 proceeds on the "no" branch from block 204 to block 218. Block 218 is discussed below.

Figure 8H:
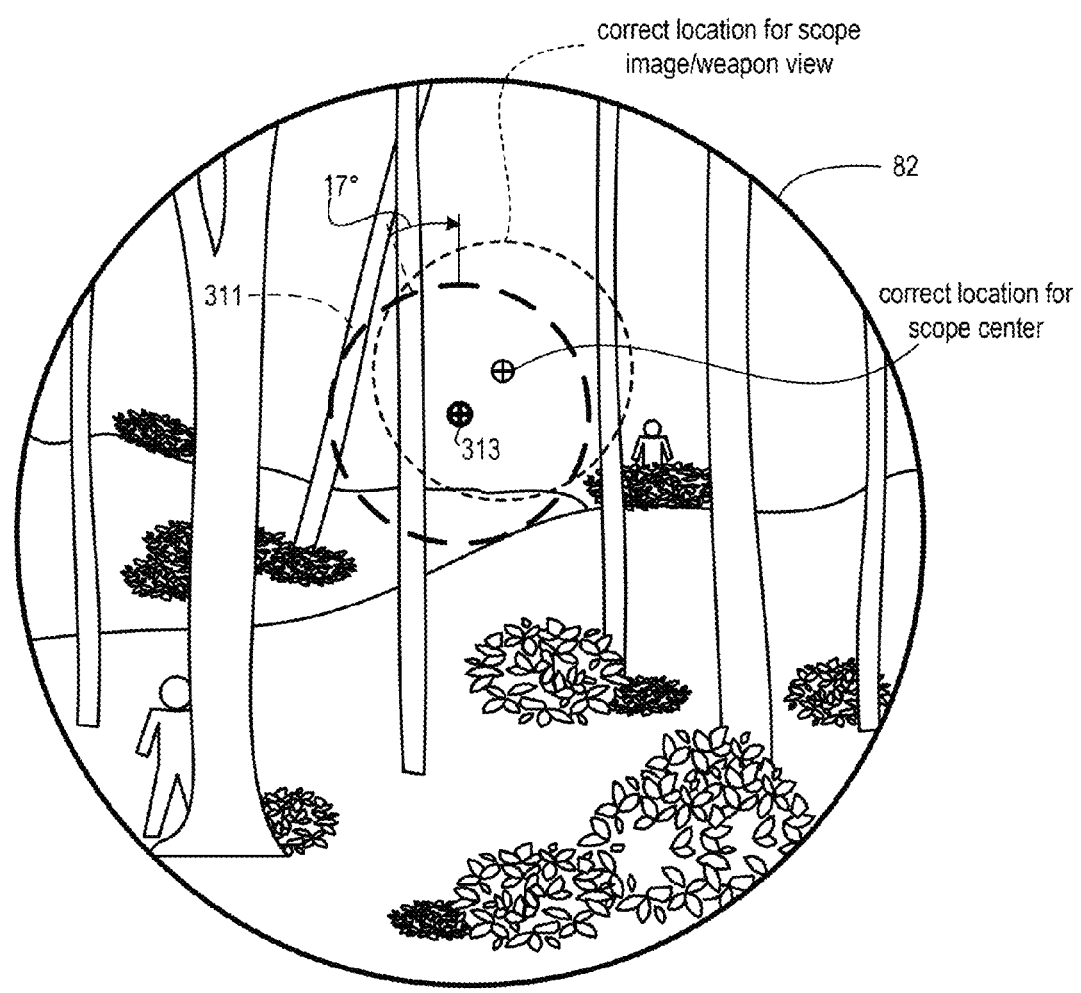

Returning to block 202 of FIG. 7, a failed image-based check in block 202 indicates that the IMU-based location for scope image 302 within goggles image 82 may be incorrect. In other words, the scope image and the part of the goggles image over which computer 30 intends (based on IMU data) to overlay the scope image do not sufficiently represent the same part of the external environment. In such a case, computer 30 proceeds on the "no" branch from block 202 to block 206. In block 206, computer 30 attempts to find the proper location for scope image center 305 within goggles image 82 by comparing scope image 302 with different parts of goggles image 82. In particular, computer 30 performs image-based checks for points of interest in goggles image 82 that are slightly offset from a center calculated from IMU data. This is illustrated conceptually in the example of FIGS. 8H through 8K, which assumes the same goggles image 82 and scope image 302 of FIGS. 8A and 8B, but in which the IMU-based position and image rotation are not correct. FIG. 8H shows goggles image 82 and a portion 311 of goggles image 82 where computer 30 now intends (relying on inaccurate IMU-based information) to place scope image 302. The center 313 of portion 311 and the IMU-based image rotation angle (17°) are also shown. For convenience, the correct position of scope image 302 within goggles image 82 is shown with a different type of broken line.

Figure 8I:
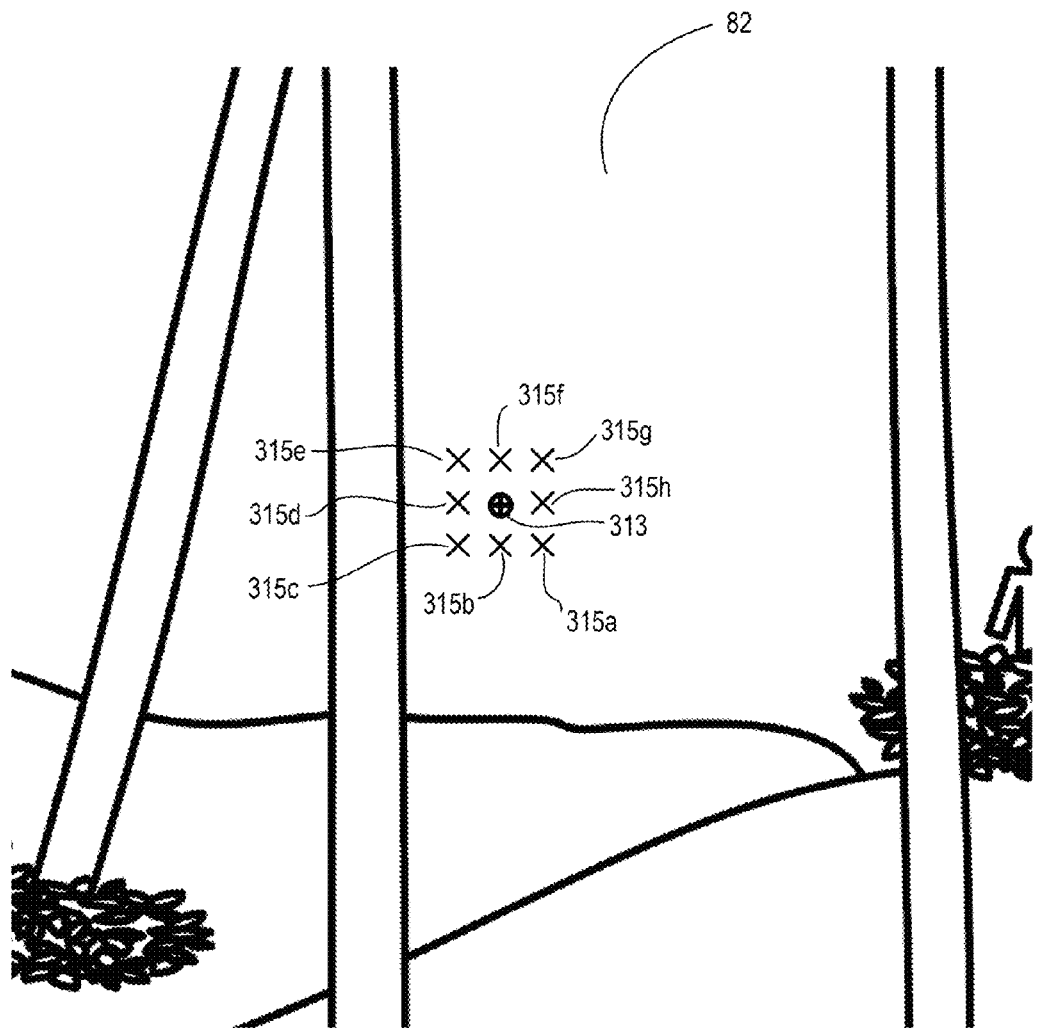
Figure 8J:
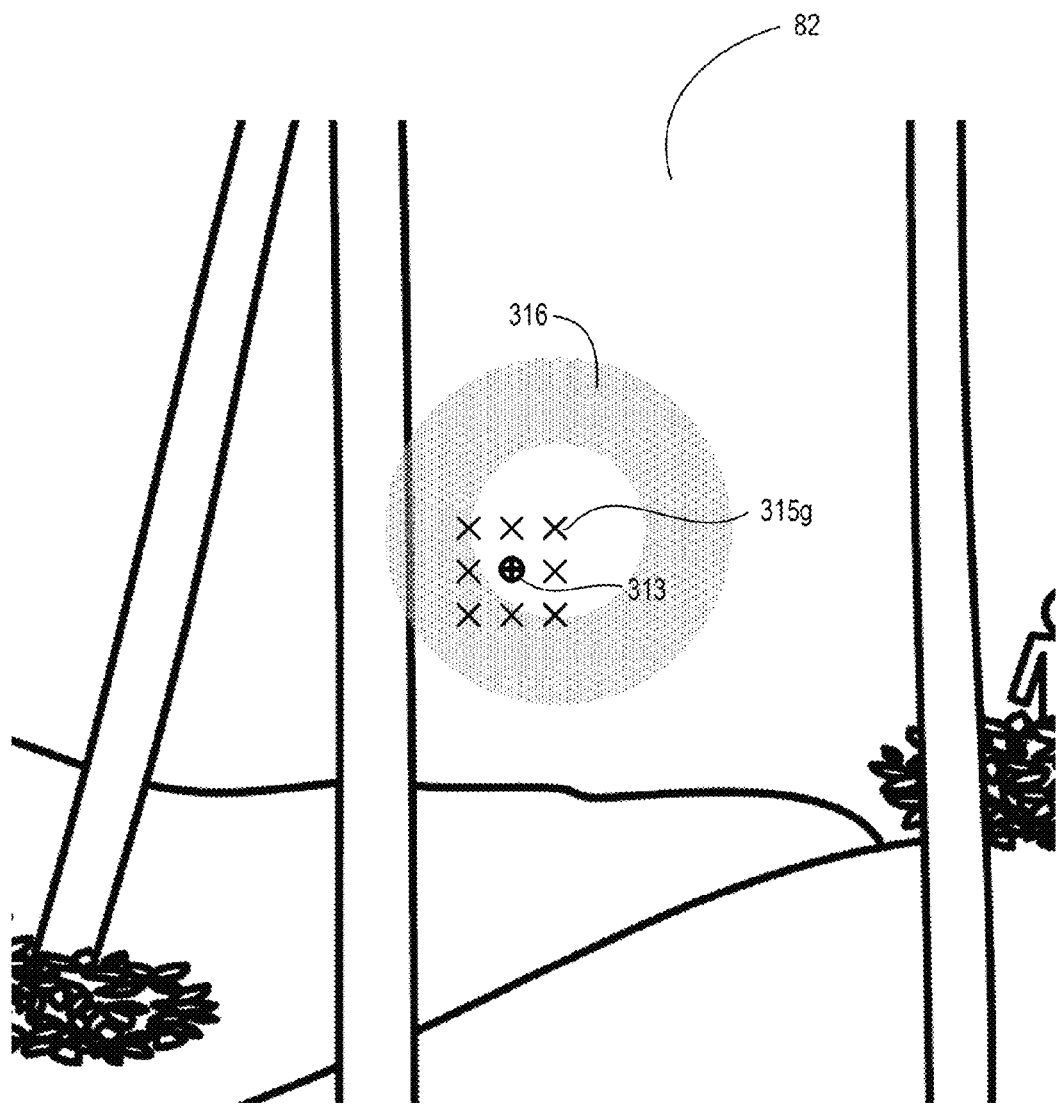

FIG. 8I shows an enlarged area of goggles image 82 around center 313. In block 206, computer 30 performs image-based checks for each of points 315a through 315h. As seen in FIG. 8I, these points are slightly offset from center 313. For example, the image-based check of point 315g is based on cross correlations of the pixel intensity values for annular region 316 (centered on point 315g, as seen in FIG. 8J) and each of equally-sized annular regions 309 through 309-4 shown in FIGS. 8C through 8G. Similar image-based checks are performed for the points 315a-315f and 315h.

Figure 8K:
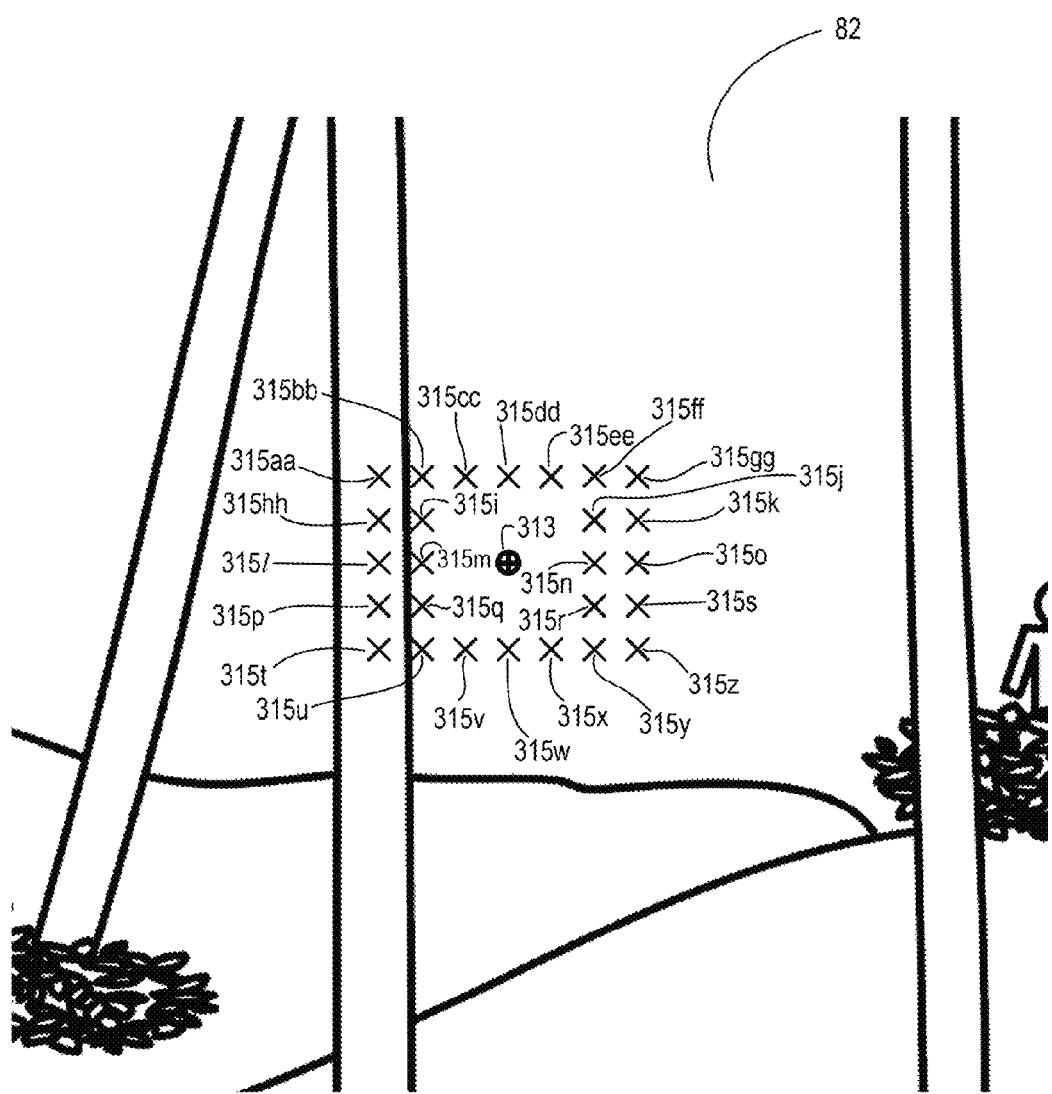

Returning to FIG. 7, computer 30 then proceeds to block 208. In block 208, computer 30 determines if any of the image-based checks of block 206 passed. If so, computer 30 proceeds to block 216, which block is explained below. If not, computer 30 proceeds on the "no" branch to block 210. In block 210, computer 30 expands its search and performs image-based checks on points in the goggles image that are even further offset from IMU-based center 313. This is shown in FIG. 8K, where further offset locations 315i through 315hh are indicated. In at least some embodiments, the expanded search is biased in the global yaw plane. As shown in FIG. 8K, this results in a greater number of expanded search points of interest in the horizontal direction than in the vertical direction. The search is biased in the global yaw plane because bias drift in the pitch and roll planes is an order of magnitude less than in the yaw plane due to the steadying influence of a constant one-g gravitational signal in the accelerometers. Although not shown, the arrangement of points of interest checked during block 206 could also be biased in the global yaw plane.

From block 210 (FIG. 7), computer 30 proceeds to block 212 and determines if any of the image-based checks of block 210 passed. If so, computer 30 selects the location (e.g., one of points 315i through 315hh) for which the highest PSR was obtained (e.g., the highest PSR for a point of interest that passed) and proceeds to block 216 along the "yes" branch. If none of the image-based checks in block 210 resulted in a pass, computer 30 proceeds on the "no" branch to block 214. In block 214, computer 30 determines if there are additional regions of goggles image 82 with which a portion of scope image 302 can be compared. If so, computer 30 returns on the "yes" branch to block 210 and further expands its search to include locations that are farther away from center 313. If computer 30 determines in block 214 that there are no more regions of goggles image 82 with which scope image 302 can be compared, computer 30 proceeds on the "no" branch to block 119 (FIG. 5B). In at least some embodiments, computer 30 treats a failure of all points of interest to pass an image-based check as evidence that there is temporarily insufficient contrast and/or content in the scope or goggles image to perform a PSR calculation, or that the scope FOV is not within the goggles FOV. Under such circumstances, any adjustment of IMU-based position calculation using image comparison results will wait until a better set of scope and goggles images are available. Alternatively, calibration can be performed manually (typically in less than ten seconds). Adjustment of IMU-based position calculation is described in more detail below.

When computer 30 does determine that a point of interest in the goggles image has passed an image-based check, computer 30 proceeds to block 216 of FIG. 7 (either from the "yes" branch of block 208 or from the "yes" branch of block 212). In block 216, computer 30 identifies a portion of the goggles image centered on the point for which the highest PSR was found. Computer 30 then proceeds to block 218 and calculates the twist rotation of scope image 302. The calculations of blocks 206 through 216 determine the amount by which the scope image is translated relative to the goggles image. The relative rotation of the two images (if any) is calculated separately in block 218. As indicated above, this calculation is in some embodiments based on the phase shift of scope image 302 and the portion of goggles image 82 identified in block 216.

Figure 9A:
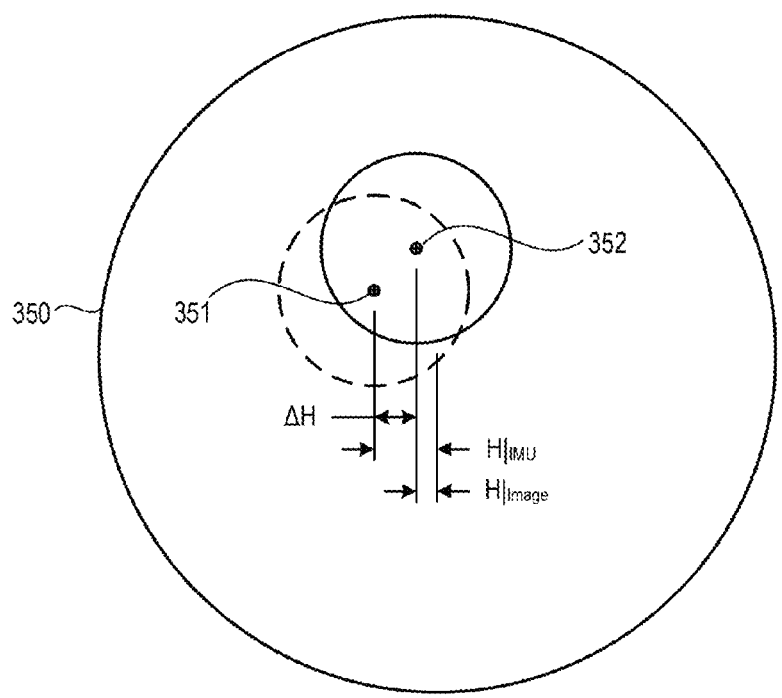
FIGS. 9A through 9C illustrate correction of an IMU-based position calculation based on image comparison results.
Figure 9B:
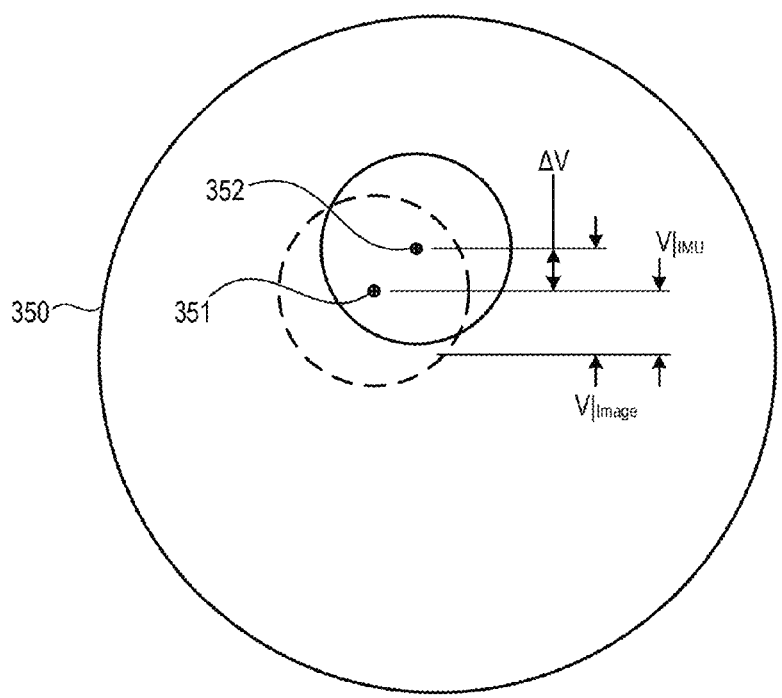

Computer 30 then proceeds to block 219, where the IMU-based goggles portion (311 in the example of FIG. 8H) and rotation matrix are replaced with the portion identified in block 216 and with the twist rotation (from block 218). If block 219 is reached from the "no" branch of block 204, only the (IMU-based) roll is replaced. Computer 30 also adjusts the manner of IMU-based position calculation. This is illustrated conceptually in FIGS. 9A through 9C. FIG. 9A shows a goggles image 350, the center point 351 for an IMU-based location for a scope image and the center point 352 for an image-comparison-based location for the scope image. The value $H|_{IMU}$ is the horizontal location of the scope image in the goggles image calculated with data from IMU sensors 13 and 18. The value $H|_{Image}$ is the horizontal location of the scope image in the goggles image calculated using the image comparison technique described above. In FIG. 9B, value $V|_{IMU}$ is the vertical location of the scope image in the goggles image calculated with data from IMU sensors 13 and 18; $V|_{Image}$ is the vertical location of the scope image in the goggles image calculated using the image comparison technique described above. Although $H|_{Image}$, $H|_{IMU}$, $V|_{Image}$ and $V|_{IMU}$ are shown as linear distances in FIGS. 9A and 9B, persons ordinarily skilled in the art will appreciate that angular differences between the orientations of goggles 11 and scope 17 directly correspond to (and can be used to readily calculate) a rotation matrix that can be used to correct a calibration matrix that has drifted.

Figures 9C, 10:
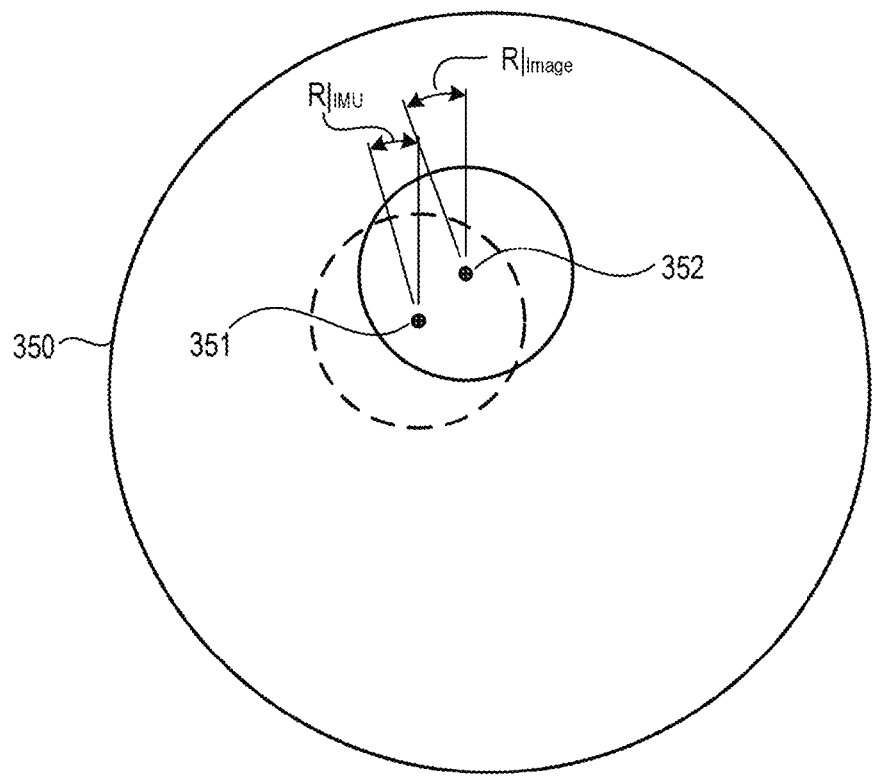
FIG. 10 is an example of a tactical database.

As shown in FIGS. 9A and 9B, the difference between $H|_{IMU}$ and $H|_{Image}$ ($\Delta H$) and the difference between $V|_{IMU}$ and $V|_{IMAGE}$ ($\Delta V$) are used to update the rotation correction matrix derived from the initial calibration and subsequent updates until a new correction is available (e.g., as a result of a subsequent pass through blocks 202-219 of FIG. 7). Finally, FIG. 9C shows values $R|_{IMU}$ (representing the difference between the roll orientations of goggles 11 and scope 17 calculated with data from IMU sensors 13 and 18) and $R|_{Image}$ (the twist rotation calculated using the image comparison technique described above). $R|_{IMU}$ and $R|_{Image}$ are used (in a manner readily appreciable by persons of ordinary skill in the art) to correct IMU-based roll calculations until a new correction is available. In general, corrections to pitch and roll are much smaller than those to yaw due to the presence of three-axis accelerometers in both IMUs that yield a consistent gravity vector, thus correcting much of the drift in these directions. In some embodiments, pitch and roll corrections from image registration will not be applied until they exceed a pre-determined threshold because this effect due to gravity usually will keep these axes in control.

From block 219 of FIG. 7, computer 30 proceeds to block 119 of FIG. 5B. In block 119, the scope image is cropped, resized and/or rotated. The resulting image is then overlaid on the goggles image as the weapon view (block 121). A reticle (which corresponds to the scope FOV centerline) may be generated, but in some embodiments an integral scope image reticle will be displayed as part of the image. As mentioned above, the weapon view may be given a desired shape (e.g., rectangular or circular) and angular dimension(s), and portions of the scope view outside of the desired shape may be cropped.

Computer 30 proceeds from block 121 to block 123, where a tactical object database is updated. As discussed in connection with FIG. 4, and as described in more detail below, user display 70 graphically indicates locations of various real-world objects of interest to the user. Data for such objects is stored in a database, accessible by computer 30, located in memory 40 (see FIG. 2), and periodically updated by messages received from other friendly units by means of the communications chip set 32. FIG. 10 shows an example of a database 401, according to at least some embodiments, storing information about real-world objects. In the present example, the real-world objects are items of tactical interest to a soldier; accordingly, such items may also be referred to herein as "tactical objects." FIG. 10 shows database 401 in tabular form for purposes of explanation. Database 401 need not be stored or organized as a table, however, and need not have other features shown in FIG. 10. A database such as database 401 could be stored in numerous other formats, could include information other than that shown in FIG. 10, and/or could be stored as multiple separate databases.

The first column in FIG. 10 contains an identifier for an object of interest. For convenience, relatively simple identifiers are shown in FIG. 10. The identifiers could take any form, however. In some cases, an identifier may be a name (e.g., of another soldier) or other characters that a human user would recognize, and that might be displayed in user display 70 under some circumstances. The second column of FIG. 10 indicates an object type. Although only four object types are shown in database 401, numerous other types of objects could be included. For example, mission objectives, friendly outposts or emplacements, obstacles, contaminated areas, magnetic headings, stadia marks and other items can be included within database 401 and shown in a user display with an icon or other indicator. The third column of database 401 gives location information for each object. The location information provides the three-dimensional location of an object within a particular tactical region. In some cases, the tactical region may be relatively small (e.g., several square miles that a military unit will patrol). In other cases, the tactical region may be much larger. For simplicity, the location data in FIG. 10 is represented generically as <x coord>, <y coord> (with a lower-case "y" in this case referring to a linear distance axis and not yaw) and <z coord>. However, actual location information may be in the form geographical coordinates, military grid reference system coordinates, or in any other desired format. The fourth column of FIG. 10 shows the type of icon or other graphical object used to mark or otherwise indicate a tactical object in user display 70. Although the icon type is shown graphically in FIG. 10 for convenience, an actual database may contain a pointer or other data object corresponding to a particular icon.

Although not shown in FIG. 10, terrain and other geographic information is also stored in database 401. This geographic information includes elevations of points in the tactical region, true north corrections for magnetic north values obtained from a magnetometer in sensor 13, magnetic dip angle to determine if there is interference to the compass, etc.

Data can be input into database 401 in various ways. Some data might be downloaded into database 401 (e.g., via an RS232 or USB port on computer 30) from a laptop computer as part of planning for a mission. Examples of such data could include planned routes, known enemy positions, etc. Other data is added to database 401, while system 10 is in use, based on periodic updates over the radio communications link. Block 123 of FIG. 5B represents such updating of database 401 via radio communications. For example, changing locations of friendly personnel can be relayed from other systems 10 used by such personnel. As another example, an enemy unit location may be reported by a soldier using system 10, and that enemy unit location is then broadcast to other soldiers (each of whom is also equipped with a system 10). Radio updates may also come from sources other than (or in addition to) soldiers equipped with systems 10. As but one example, a remotely located commander or an airborne observation unit may provide tactical information about enemy units, changed mission objectives, etc.

Figure 11:
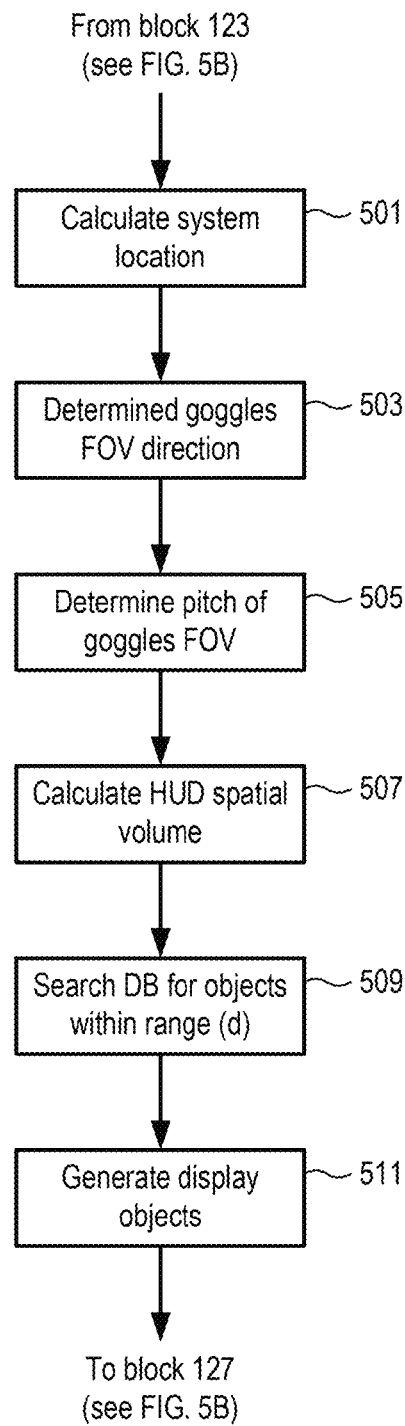
FIG. 11 is a flow chart providing additional details for another block in the flow chart of FIGS. 5A and 5B.

After updating database 401, computer 30 proceeds to block 125 of FIG. 5B. In block 125, computer 30 identifies tactical objects for which an icon or other graphical indicator is to be shown on user display 70. Computer 30 then generates a display icon (or other visual indicator) for each of the identified objects. FIG. 11 is a flow chart providing additional details about the operations performed within block 125 of FIG. 5B. FIGS. 12A through 12D are used to conceptually explain various operations of FIG. 11. Computer 30 would not necessarily generate the diagrams shown in FIGS. 12A through 12D as part of the operations described in connection with FIG. 11.

Figure 12A:
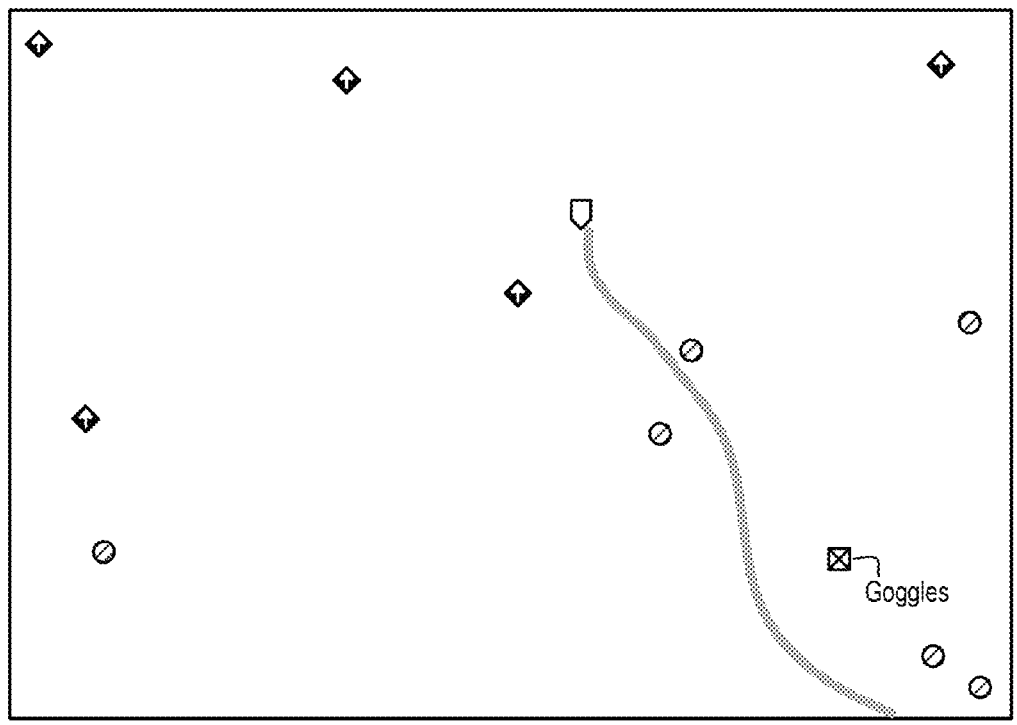
FIGS. 12A through 12D show identification of real-world objects based on a spatial volume calculated from a position and orientation.
Figure 12B:
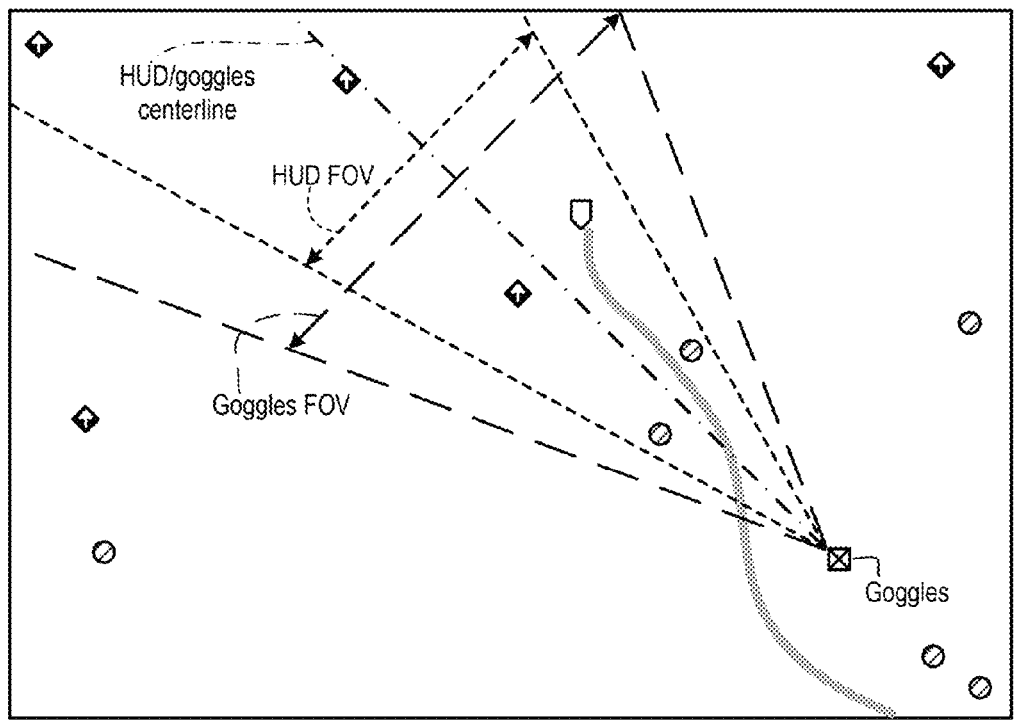
Figure 12C:
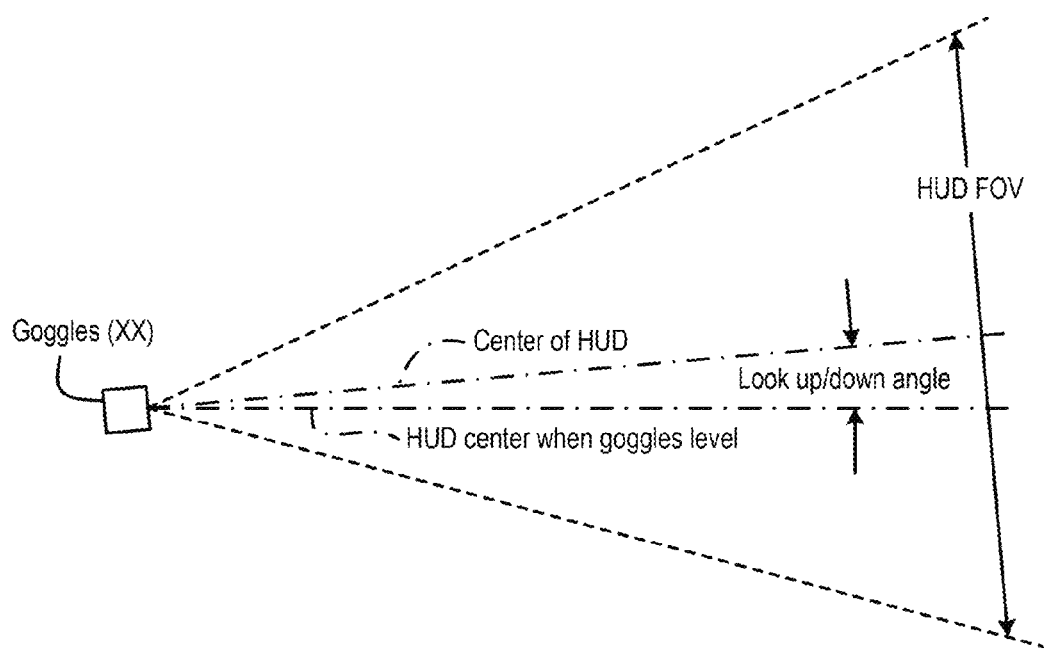

In block 501 of FIG. 11, computer 30 first determines the location of system 10 based on GPS coordinates and/or other data received in block 105 of FIG. 5A. This is shown in FIG. 12A, a plan view of a portion of the tactical region for which information is stored in database 401. Various friendly soldiers, enemy positions and other tactical objects are shown using the same types of icons shown in FIGS. 4 and 10. Each of the tactical objects has one or more entries in database 401. The position of system 10 (and thus of goggles 11) is also indicated. In block 503 (FIG. 11), computer 30 then uses magnetometer output from sensor 13, or (in case of magnetic interference) the yaw Euler angle calculated from the IMU movements subsequent to the last acceptable magnetic fix, to determine the direction of the goggles FOV (i.e., the direction in which the user is looking) In particular, the value of MagNorth (see FIG. 3) is corrected (using geographically-specific magnetic deviation and true-north correction data in database 401) so as to determine the direction in which goggles 11 are pointed. This is shown in FIG. 12B. Also shown in FIG. 12B is the goggles FOV and HUD FOV. Flow then proceeds to block 505 of FIG. 11, where pitch axis data from goggles sensor 13 is used to determine the degree to which the user is looking up or down. This is shown in FIG. 12C.

Figure 12D:
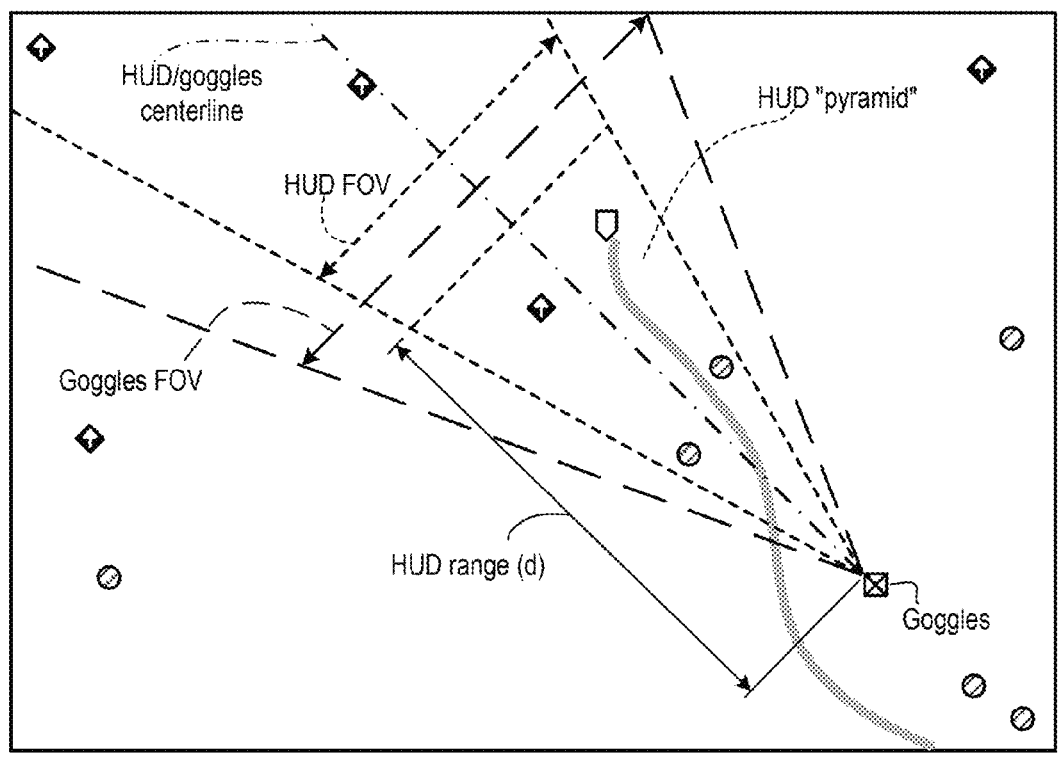

Computer 30 then proceeds to block 507. After determining the direction in which goggles 11 are pointed, computer 30 calculates a spatial volume corresponding to the boundary of HUD 73 in user display 70. This HUD volume is a pyramid centered on the goggles FOV centerline and extending outward. As seen in FIGS. 2, 4 and 12B, the HUD FOV (e.g., 32°) is narrower than and centered within the goggles FOV (e.g., 40°). The HUD pyramid is bounded by a plane located at a range (d) from goggles 11. This is shown in FIG. 12D. Computer 30 searches database 401 for all objects within the just-calculated HUD pyramid. The range (d) is in some embodiments selected by the user. For example, a user might be more concerned about objects that are relatively close (e.g., within 500 meters) than about those that are further away. Moreover, providing icons or other display indicia for distant objects may unnecessarily clutter user display 70. In certain embodiments, range (d) may be changed while system 10 is operating and the user display can be de-cluttered in other ways. As but one example, route information, control measures, etc. may be removed at the push of a button during a firefight so as to minimize potential distracters to the soldier, while friendly icons would be retained to help limit fratricide. Removed information could be restored by the operator when again needed.

In block 511 of FIG. 11, computer 30 then generates icons or other indicia in user display 70 corresponding to the objects, identified in the database search of block 509, within the HUD pyramid. In some embodiments, the size of the icons or other indicia is logarithmically scaled so that icons or other indicia for more distant objects are smaller.

Computer 30 then returns to block 127 (FIG. 5B). If more video frames from goggles 11 and scope 17 are received (i.e., goggles 11 and scope 17 remain ON), then computer 30 returns to block 105 of FIG. 5A. Otherwise, operation of system 10 terminates.

Additional Embodiments

Other embodiments include numerous variations and/or modifications of the above-described devices and operations. As but one example, the weapon view can be a magnified version of the scope view (either at all times or selectively at the request of the user). In such embodiments, the image-based comparison techniques described above can first be performed using an unmagnified scope image. Once the proper location and orientation for the scope image are deduced, the scope image can be magnified and cropped prior to overlay as the weapon view. Other types of information (e.g., a battery life indicator, navigational headings, etc.) can also be selectively shown in a user display. Indeed, a user can be provided with a great deal of flexibility in selecting the types of information to be shown on the display. Such selection can take place during set-up or while the system is in use. For example, a soldier on patrol may choose to see display indicators for routes, rally points, indirect fire targets, preplanned control measures, etc. When the soldier is attacked or is about to enter a firefight, he or she might then place the weapon in a close-combat mode (e.g., by pressing a mode control button located on a weapon). In such a close-combat mode, the user could avoid information overload by suppressing all information except icons for friendly forces. In some cases, the soldier might even choose to suppress "friendly" icons and opt for an audible warning if the weapon is pointed at friendly personnel. As yet another variation, a soldier might configure his system to display icons for friendly forces within a first range (e.g., 300 meters) and for enemy positions within a second range (e.g., 1000 meters), to display graphics for patrol routes within a third range (e.g., 500 meters), to plot control measures with routes, etc.

As discussed above, location information can be provided via GPS transmissions. Location data can also be augmented by local information such as timing and ranges from nearby soldiers also equipped with a system such as described herein. Other types of navigational data (e.g., WAAS, or wide area augmentation system) can also be used. Barometric pressure can be used to provide a relative elevation error and used as a check against a GPS-based elevation, as well as during system initialization. A terrain database (e.g., within a database such as database 401) can include values for magnetic deviation, gravitational acceleration, dip angle, elevation (e.g., DTED, or digital terrain elevation data) and/or other quantities as a function of longitude and latitude.

Data from various sources can be updated at various rates (e.g., video frames at 30 Hz, IMU data at 100 Hz, GPS or other navigational updates at 1 Hz, range data from other soldiers at 8 Hz). IMU accelerometers can have bandwidths greater than 1000 Hz, resolution of 1.25 milligrams, and 2% sensitivity. A magnetometer can provide outputs at 200 Hz and have a sensitivity of 1 mGauss (1 part in 300-600 Earth field). Rate sensors can have a 2% error and 100 Hz bandwidth, and barometric pressure data provided at 100 Hz and within 1-2 meters of resolution. Range data from other soldiers may be within 1.3 meters of error. Of course, all of these values are only examples, and the invention is not limited to systems having specific values for any of these quantities.

Other embodiments also include numerous variations on the above-described methods for using a comparison of a scope image and a goggles image to check an IMU-based location and rotation for that scope image within that goggles image. For example, the operations described in connection with FIG. 7 initially assume that the center for a scope image within a goggles image calculated from IMU data is correct. If the image comparison suggests that the IMU-based calculation is not correct, a search of other possible center locations moves outward from the IMU-based center. Assuming an IMU drift rate of approximately 1°/hour, a procedure such as that of FIG. 7 works well (and minimizes computational load on a processor) if the scope and goggles point in the same direction at least once every 10 to 15 minutes. However, the procedure could be modified for IMUs having different drift rates or if it is expected that the scope and goggles will not be looking in the same direction for an extended period. As but one example, a system could be configured so that a user can manually initiate a search (e.g., beginning at the goggles image center) across the entire goggles image for a scope image location. This could be used for initially calibrating the IMUs, or as a re-calibration if the user has not pointed his weapon forward for an extended period (e.g., if the weapon was slung over a shoulder). The search patterns shown in FIGS. 8J and 8K are only examples. Numerous other search patterns could be implemented.

Figure 13A:
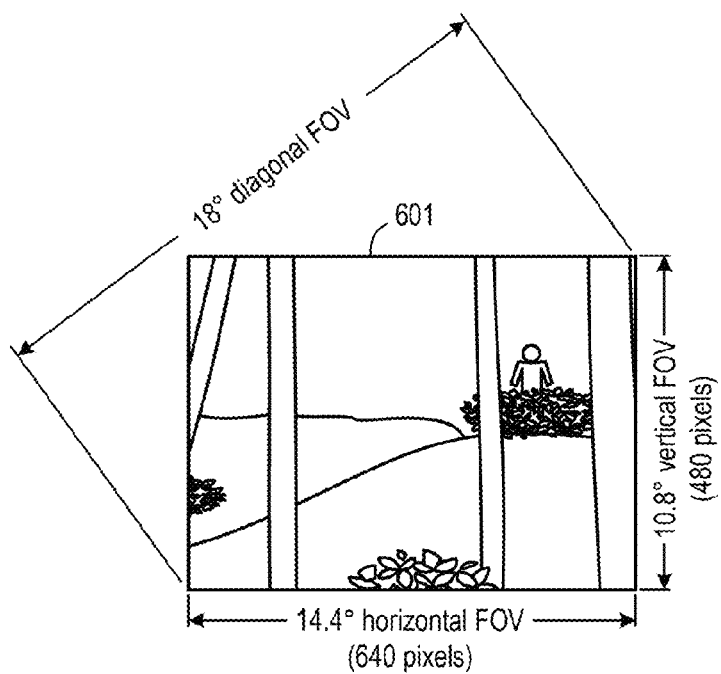
FIGS. 13A and 13B show a goggles images and scope image, respectively, used to describe an alternate image comparison algorithm.
Figure 13B:
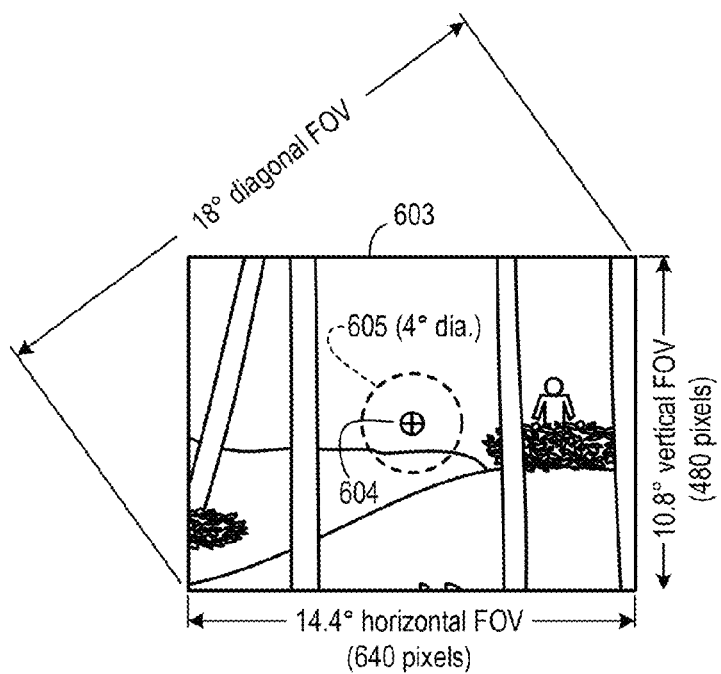

In some embodiments, an alternate image comparison algorithm is used instead of (or in addition to) the operations described in connection with FIGS. 7-8K. FIGS. 13A and 13B show a goggles images and scope image, respectively, that will be used to describe this alternate algorithm. Unlike the previous discussion, which assumed the fields of view for both goggles array 56 and scope 17 were conical, the images of FIGS. 13A and 13B instead assume that array 56 and a similar array inside of scope 17 are rectangular. In particular, FIG. 13A is a goggles image 601 generated when array 56 (FIG. 3) is a 320×240 pixel microbolometer array (8-12 micron range) having a 14.4° horizontal FOV, a 10.8° vertical FOV, and an 18° diagonal FOV. The data from array 56 is converted into a 640×480 pixel NTSC format image for transmission to control unit 16 and digitized for processing. FIG. 13B is a scope image 603 generated when an array inside scope 17 (FIG. 3) is also 320×240 pixel microbolometer array (8-12 micron range) having a 14.4° horizontal FOV, a 10.8° vertical FOV, and an 18° diagonal FOV. The data from the scope array is also converted into a 640×480 pixel NTSC format image for transmission to control unit 16 and digitized for processing. In the present example, the horizontal, vertical and diagonal goggles fields of view are the same as the horizontal, vertical and diagonal scope fields of view. However, the below-described alternative image comparison algorithm can also be used in connection with a goggles and/or scope image created from different arrays having different fields of view (including the conical fields of view described previously), as well as in circumstances when the fields of view for the goggles and the scope are different in horizontal, vertical and/or diagonal planes. Adaptation of the below described alternative algorithm to such other array configurations is within the routine ability of persons of ordinary skill in the art once such persons are provided with the information contained herein.

In both images 601 and 603, each pixel corresponds to approximately 0.0225° of the FOV in each of the horizontal, vertical and diagonal planes. As indicated above, however, each of images 601 and 603 is based on data from a 320×240 pixel array. Each array pixel would thus correspond to approximately 0.045° of the FOV in each of the horizontal, vertical and diagonal planes. Moreover, gray-scale values from the 320×240 pixel arrays are duplicated so as to create images 601 and 603. For example, a pixel in 320×240 array 56 outputting a gray-scale value of G corresponds to a 2×2 pixel block in image 601, with all four pixels in that 2×2 block also having a gray-scale value of G. The significance of this will be apparent below.

Returning to FIG. 13B, a center 604 is also indicated. Surrounding center 604 is a circle 605 having a diameter corresponding to 4° of the FOV. The region within circle 604 will be overlaid on goggles image 601 as a weapon view (similar to weapon view 74 of FIG. 4).

Figure 14:
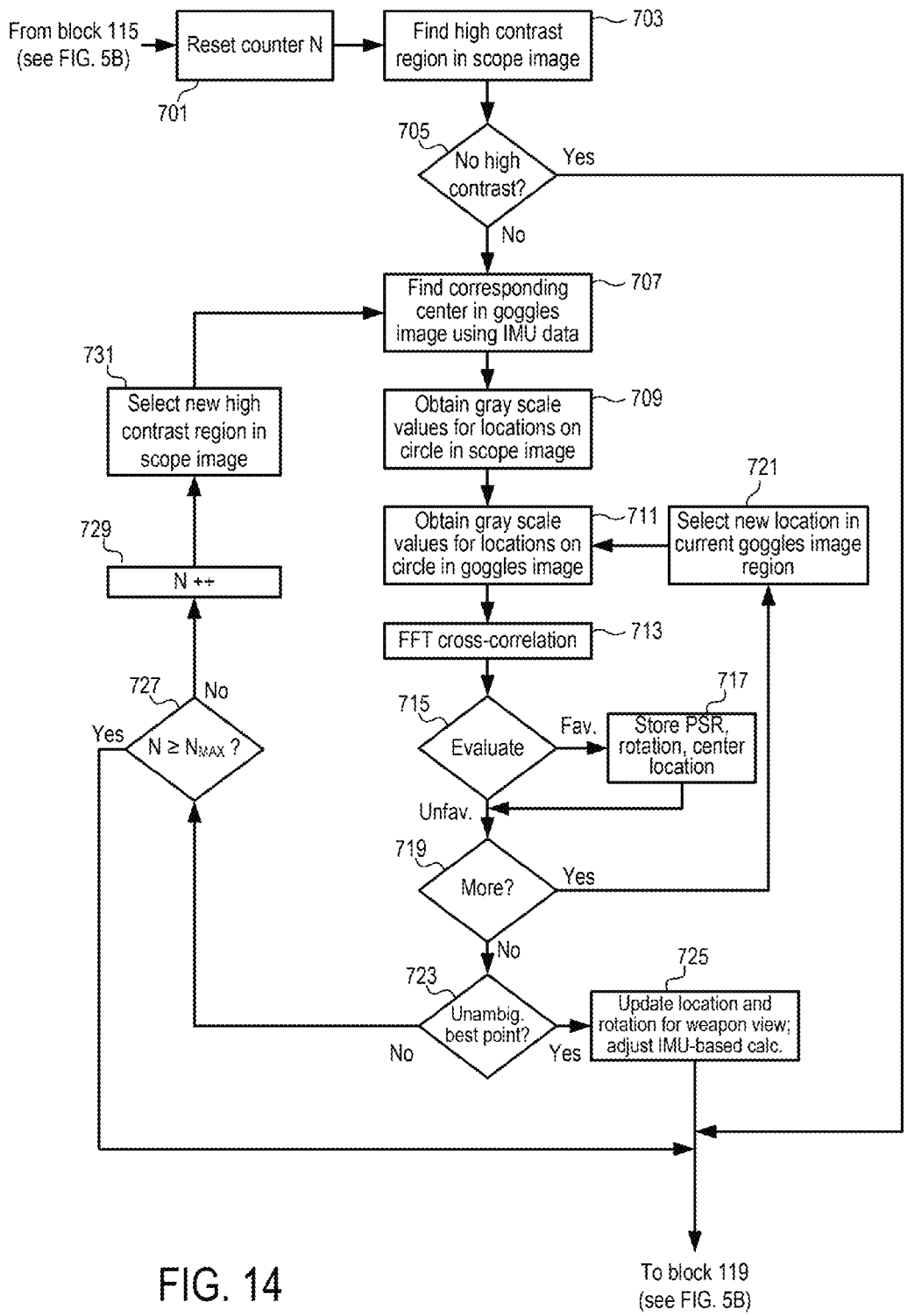
FIG. 14 is a flow chart for an alternate image comparison algorithm.

FIG. 14 is a flow chart for an alternate image comparison algorithm according to at least some embodiments. Various blocks in the FIG. 14 flow chart will be further explained using diagrams and plots in FIGS. 15-22. In some implementations, the alternative image comparison algorithm of FIG. 14 assumes that current IMU data is available from sensors 13 and 18 (FIG. 3), that IMU drift since the last calibration (or image registration) has not been significant, and that IMU data is thus usable as a starting point in the algorithm (as described below). In at least some embodiments, random noise in IMU output rarely exceeds 1 degree in yaw or ½ degree in pitch or roll. The FIG. 14 algorithm also assumes that center area 605 is wholly contained within goggles image 601 (i.e., that the portion of the external environment corresponding to center area 605 is also represented by a region wholly contained in goggles image 601) at time intervals such that the bias drift will be less than 2 degrees.

Similar to the algorithm previously described in connection with FIG. 7, the image comparison algorithm of FIG. 14 is entered from block 115 of FIG. 5B. As with the algorithm of FIG. 7, the algorithm of FIG. 14 is also performed by computer 30 (FIG. 2). In the first block of FIG. 14, computer 30 resets a counter (N). As described in more detail below, the counter N is used to prevent excessive looping through the algorithm. From block 701, computer 30 proceeds to block 703 and locates a region of high contrast, within scope image 603, that is relatively near center 604. This is shown in more detail by FIG. 15.

Figure 15:
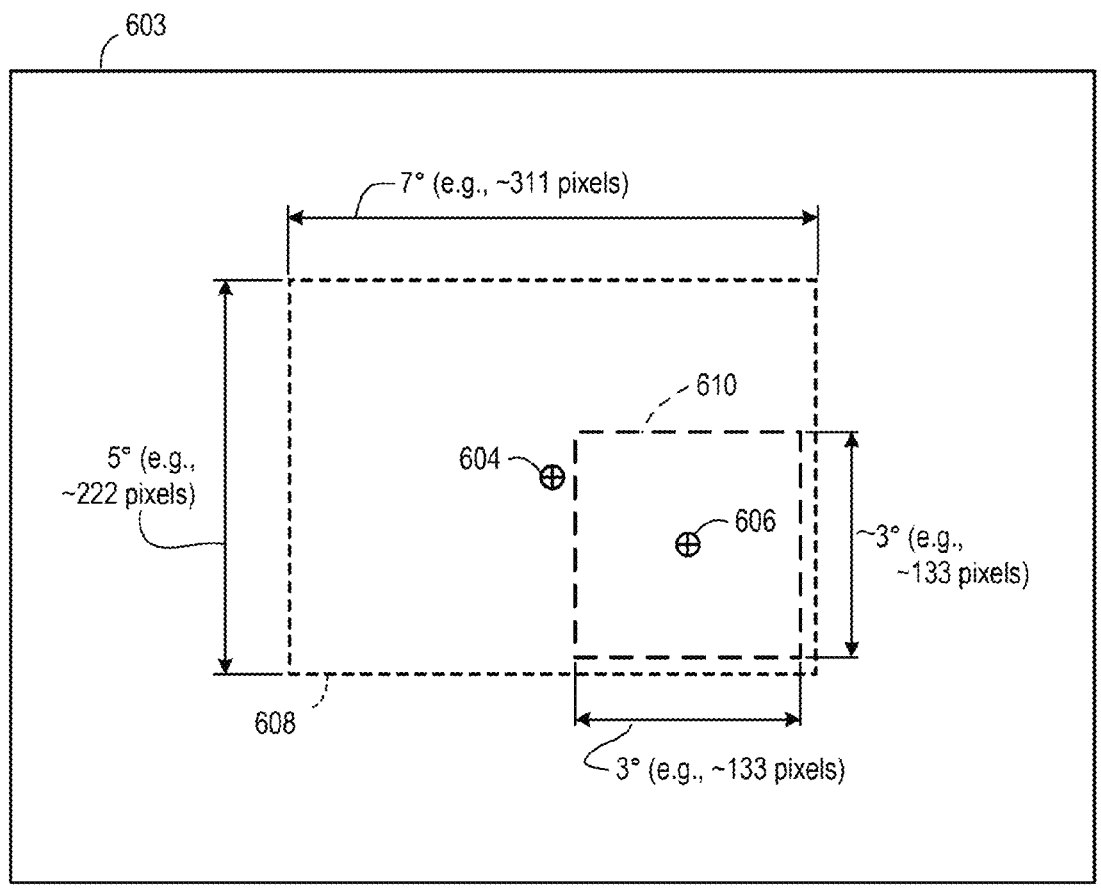
FIG. 15 is a partially schematic diagram corresponding to the scope image of FIG. 13B.

FIG. 15 is a partially schematic diagram in which the various image elements (e.g., trees, foliage, etc.) have been omitted for simplicity, but in which the boundary of scope image 603 and center 604 are shown. In block 703, computer 30 searches image 603 for a square region 610 in which the pixels inside of region 610 have a high degree of contrast. In particular, computer 30 searches for the square region 610 in which the standard deviation of pixel gray-scale values is maximized. In the present example, and as indicated above, image 603 comprises numerous 2×2 pixel blocks in which all pixels in a 2×2 block have the same gray-scale value. Accordingly, when calculating a standard deviation for a region of image 603, only every other pixel in the horizontal and vertical directions need be used. In at least some embodiments, region 610 corresponds to a 3° horizontal FOV by 3° vertical FOV portion of image 603. In the present example of example of image 603, region 610 is approximately 133 pixels by 133 pixels. In some such embodiments, the center 606 of region 610 should also be within 2° of center 604 in the horizontal plane and within 1° of center 604 in the vertical plane. In the present example, computer 30 thus searches for a 133×133 pixel region contained within a 311×222 pixel region of image 603 that is centered about center 604.

Returning to FIG. 14, computer 30 proceeds from block 703 to block 705 and determines if the region 610 identified in block 703 is of sufficiently high contrast. If, for example, the maximum standard deviation for gray-scale values within any 133×133 pixel block is not sufficiently high, there may be insufficient contrast to continue with an image comparison. A sufficiently high standard deviation value could be determined for a given combination of goggles and scope imaging array types based on a series of test images. If the standard deviation for gray scale values in the region 610 identified in block 703 is not sufficiently high, computer 30 returns to block 119 of FIG. 5B via the "yes" branch. If the standard deviation of gray-scale values for the region 610 identified in block 703 is sufficiently high, computer 30 continues with the image comparison and proceeds on the "no" branch to block 707.

Figure 16:
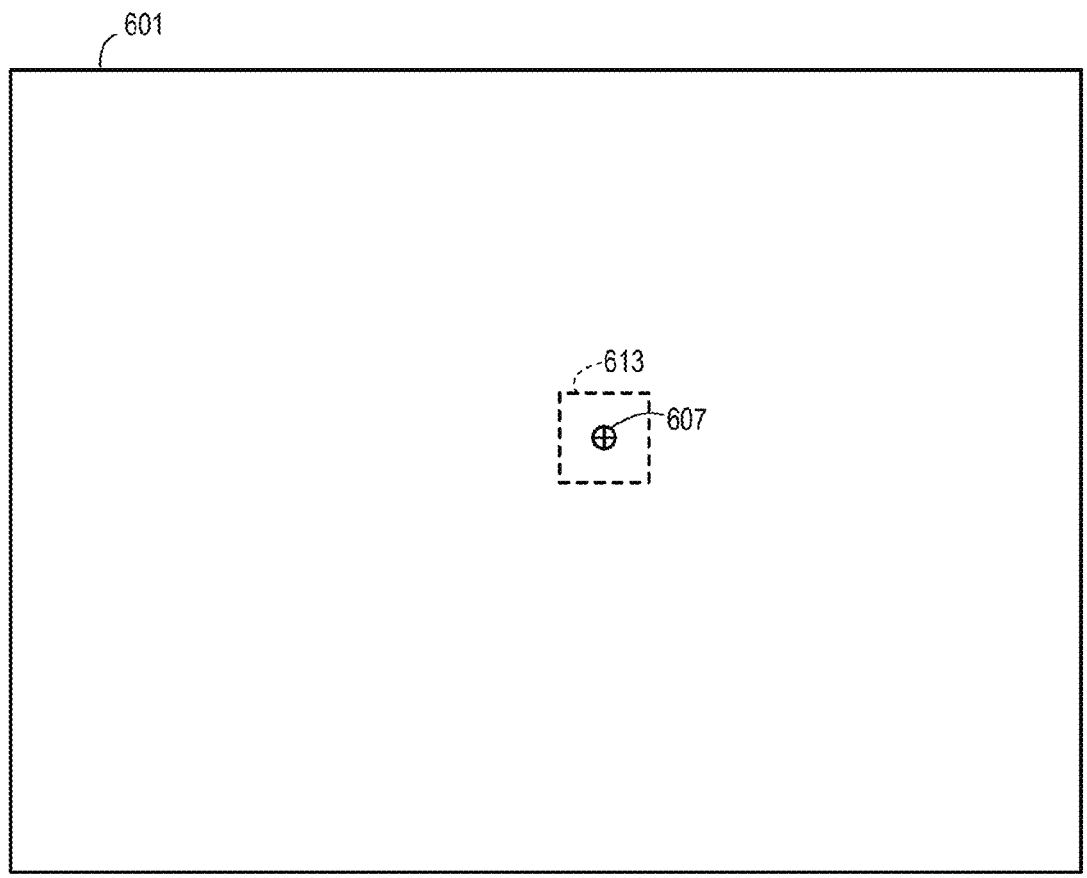
FIG. 16 is a partially schematic diagram corresponding to the goggles image of FIG. 13A.

In block 707, computer 30 locates the point in goggles image 601 that IMU data (from sensors 13 and 18) indicates is a representation of the same part of external environment represented by point 606 (FIG. 15). As indicated above, point 606 is the center of the region 610 found by computer 30 in block 703. The operation of block 707 is shown in more detail in FIG. 16. FIG. 16 is a partially schematic diagram in which the various image elements (e.g., trees, foliage, etc.) have been omitted for simplicity, but in which the boundary of goggles image 601 is shown. Point 607 is the point which IMU data indicates corresponds to point 606 in the scope image. Also shown in FIG. 601 is a 1° by 1° (e.g., 44 pixels by 44 pixels) region 613 centered on point 607. The significance of region 613 is explained below.

Figure 17A:
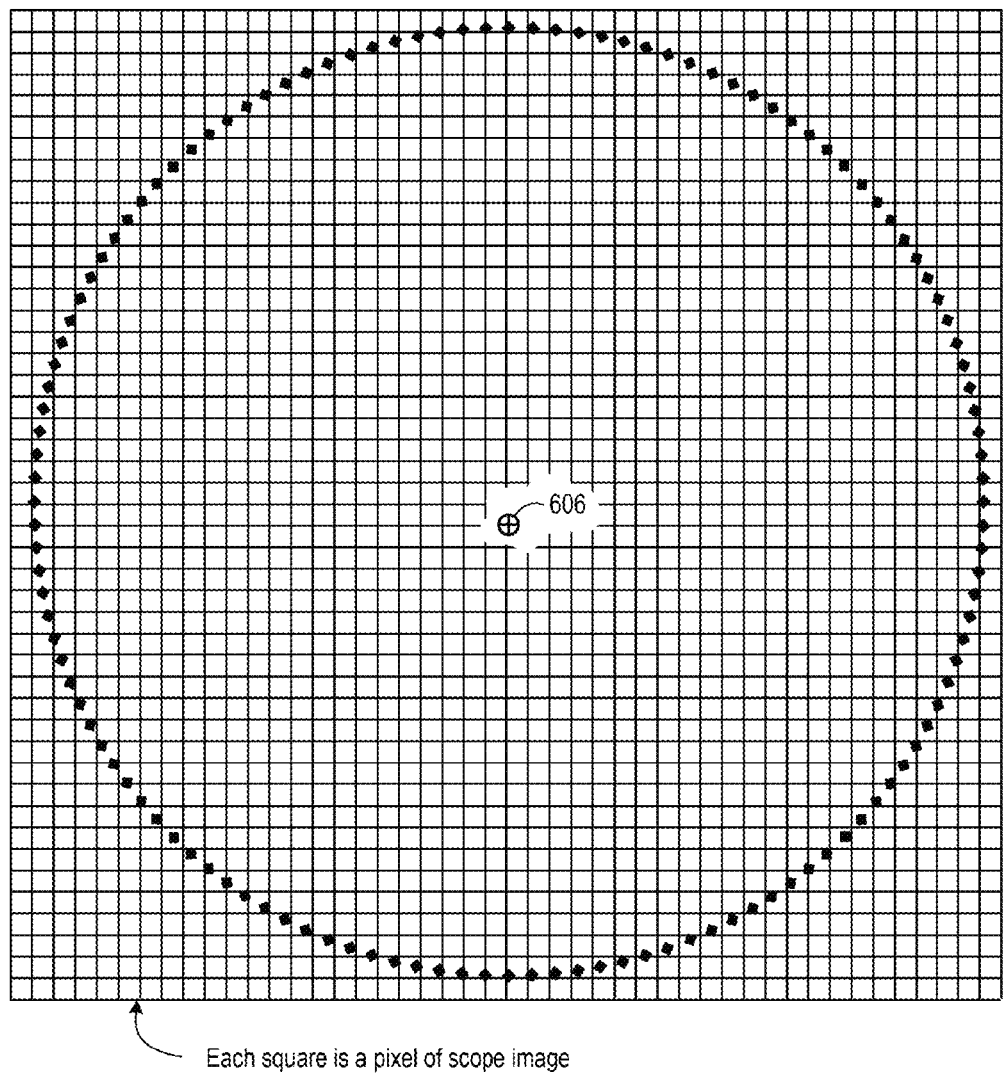
FIGS. 17A through 17C show collection of gray-scale values from scope and goggles images.
Figure 17B:
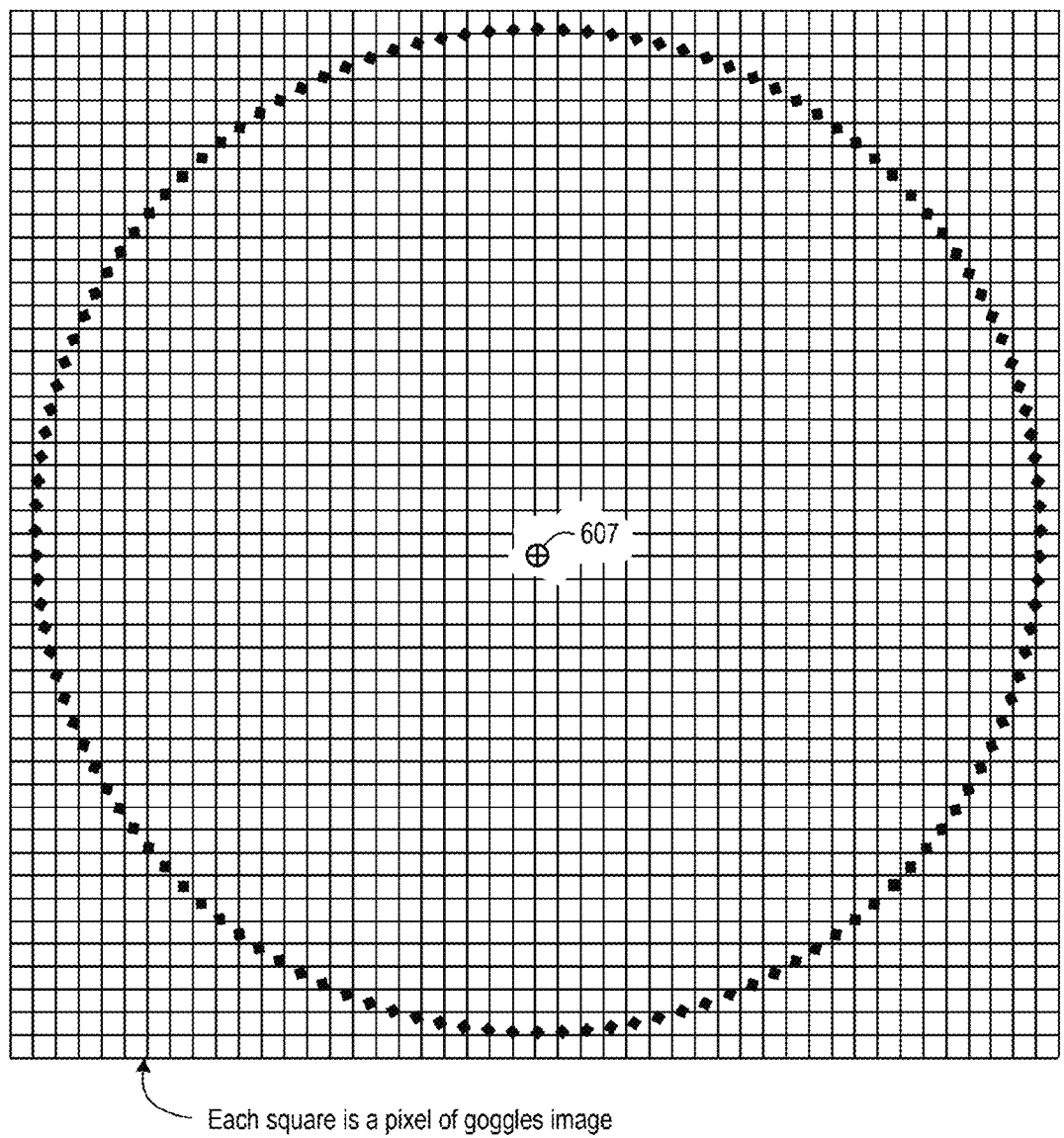

Returning to FIG. 14, computer 30 proceeds from block 707 to block 709. In block 709, computer 30 obtains pixel gray-scale values from 128 locations on a circle around center 606 of region 610 (FIG. 15). This is shown in more detail in FIG. 17A, a schematic diagram of pixels surrounding center 606 in a portion of scope image 603. Each of the squares in FIG. 17A represents one pixel of scope image 603. Surrounding center 606 are 128 locations (shown as diamonds) that are equally spaced on a circle having a diameter of approximately 1°. For each of the diamonds in FIG. 17A, computer 30 obtains the gray-scale value for the pixel in which the diamond's center is located. Unlike the calculation discussed in connection with block 703 (FIG. 14), however, values are not limited to those for every other pixel. In other words, gray-scale values may be obtained for multiple pixels within a 2×2 pixel block corresponding to a single pixel of the microbolometer array in scope 17. Indeed, there might be instances in which two of the points on the circle are located within the same pixel of image 603.

Returning to FIG. 14, computer 30 proceeds from block 709 to block 711. In block 711, computer 30 performs an operation similar to that of block 709, but instead using goggles image 601. Specifically, computer 30 obtains pixel gray-scale values from 128 locations on a circle around point 607 in goggles image 601 (FIG. 16). This is shown in more detail in FIG. 17B, a schematic diagram of pixels surrounding point 607 in a portion of goggles image 601. Similar to the calculation of block 709, gray-scale values may be obtained for multiple pixels within a 2×2 pixel block corresponding to a single pixel of the microbolometer array 56 in goggles 11.

Figure 17C:
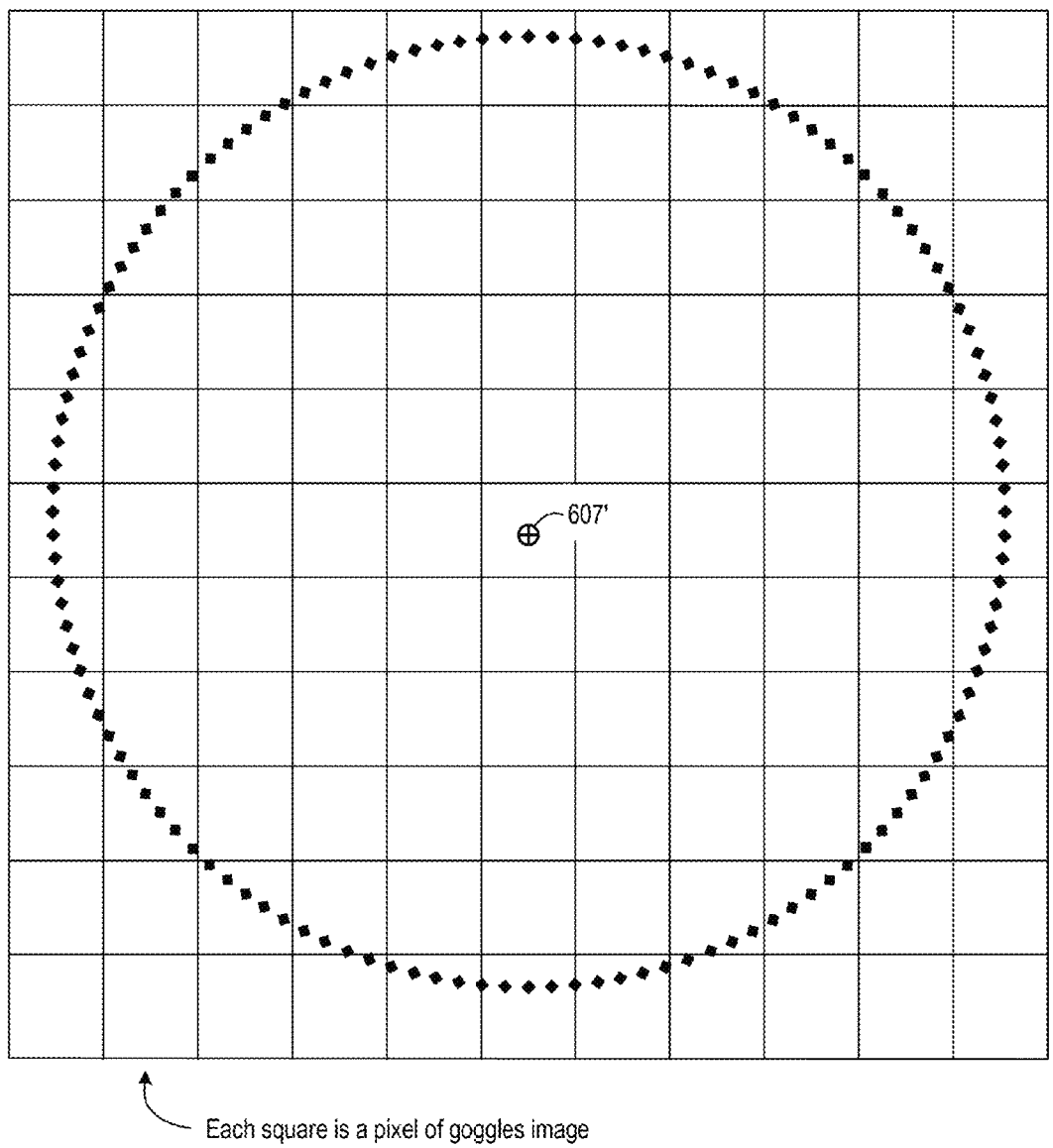

In the present example, goggles image 601 and scope image 603 have the same horizontal, vertical and diagonal fields of view and are of the same pixel dimensions. This need not be the case, however. If one of images 601 or 603 was of a different pixel dimension or had a different field of view, the procedures of blocks 709 and 711 would be similar. In particular, gray-scale values would be obtained from pixels corresponding to the same number of points distributed on similarly-dimensioned circles in each image. If, for example, a goggles image has a 32° horizontal FOV, a 24° vertical FOV and a 40° diagonal FOV, each pixel in that image represents approximately 0.1°. An even distribution of 128 points on a 1° circle would be generally as shown in FIG. 17C. In FIG. 17C, point 607' is a point (determined using IMU data) corresponding to the center of a high contrast region found in block 703 (FIG. 14). Each square in FIG. 17C represents one pixel of a goggles image having the larger FOV values.

Figure 18:
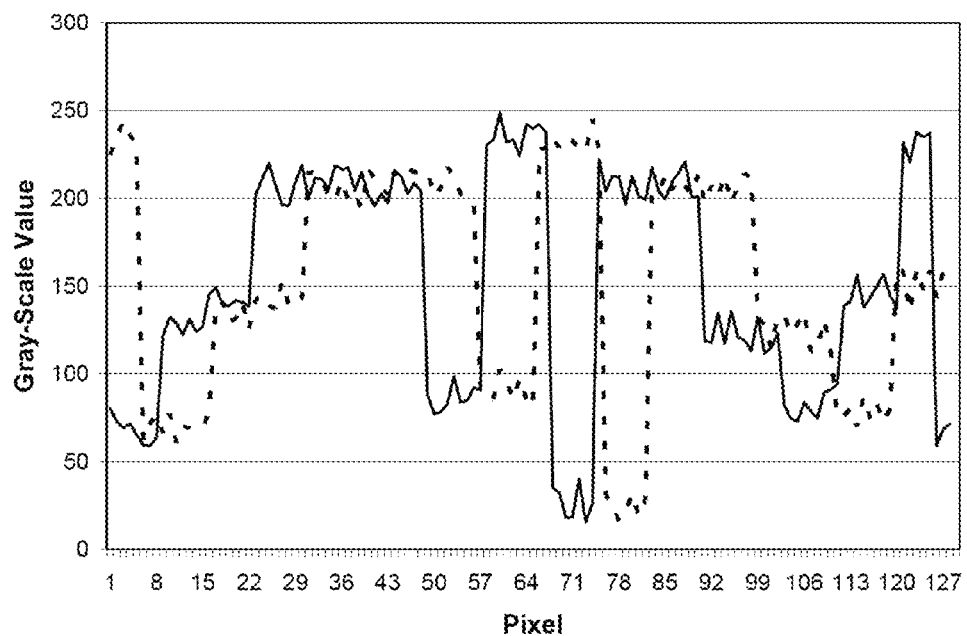
FIG. 18 is a plot showing an example of gray-scale values.
Figure 19:
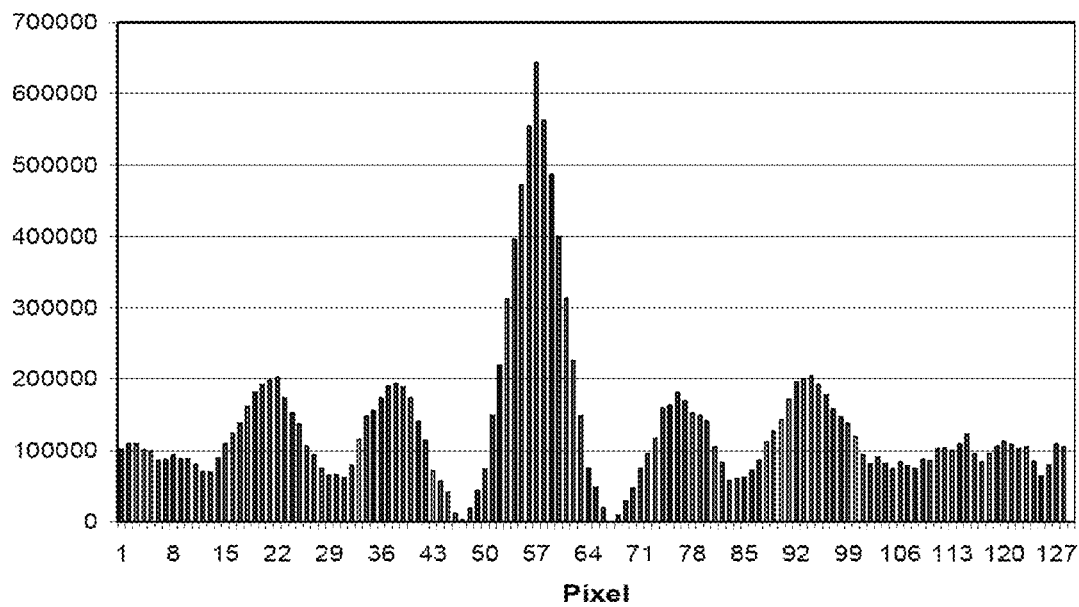
FIG. 19 is a plot of the results of calculations in which image region center points coincide.
Figure 20:
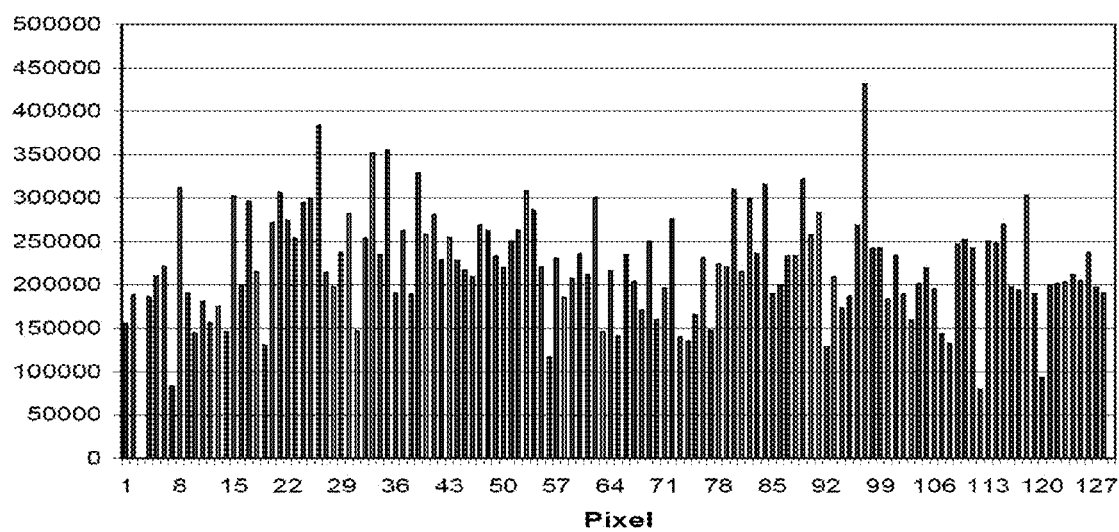
FIG. 20 is a plot of the results of calculations similar to those used to generate the plot of FIG. 19, but using random data.

Returning to FIG. 14, computer 30 then proceeds to block 713. In block 713, computer 30 performs various calculations using the gray-scale values obtained in blocks 709 and 711. FIG. 18 is a plot showing an example of raw data that might be obtained in blocks 709 and 711. The plots of FIG. 18 and of subsequent FIGS. 19 and 20 are provided for purposes of explanation, and would not necessarily be generated by computer 30. In FIG. 18, the solid line plot represents the 128 gray-scale values obtained in one of blocks 709 and 711, and the broken line plot represents the 128 values obtained in the other of blocks 709 and 711. For purposes of illustration, a 10% noise factor and a 22.5 degree phase shift (representing a rotation of one image relative to the other) have been added. As part of the calculations of block 713 (FIG. 14), computer 30 first performs a discrete Fast Fourier Transform (FFT) on each data set (i.e., a discrete FFT on the 128 scope image values and a discrete FFT on the 128 goggles image values). Computer 30 then multiplies the complex conjugate of one of those discrete FFTs by the other of the discrete FFTs. Computer 30 next obtains an inverse FFT of the product. Computer 30 then subtracts the DC component of the inverse FFT and obtains data that allows peak-to-sidelobe ratio (PSR) comparisons.

Computer 30 then evaluates the result of block 713 in block 715. If the center points of the scope image region and of the goggles image region to which it was compared (e.g., points 606 and 607 of FIGS. 15 through 17B) represent the same part of the external environment, the PSR will be relatively large (e.g., 3 or higher). FIG. 19 is a plot of the results of a calculation in block 713 (FIG. 14) when the center points do coincide. The sidelobes in FIG. 19 can be seen as three regions (on either side of the peak) that are higher than their surroundings. The location of the peak can also be used to determine the rotation of one image relative to the other. In the example of FIG. 19, the peak is displaced 8 pixel increments from the left of the center of the plot. This corresponds to a rotation of (8/128)*360°, or 22.5°. The direction of rotation is determined based on whether the displacement is to the left or to the right of the center. FIG. 20 is an example of a plot resulting from the calculations of block 713 using random data.

If the result of the evaluation in FIG. 14 block 715 is favorable (e.g., if the PSR 3), computer 30 proceeds to block 717 via the "Fay." branch and stores the PSR, rotation and the pixel coordinates of the point in the goggles image 601 that was used in block 711 (e.g., point 607) as the circle center. Computer 30 then continues to block 719. If the result in block 715 is not favorable (e.g., PSR<3), computer 30 proceeds on the "Unfav." branch to block 719 without storing a PSR, center location or rotation.

Figure 21:
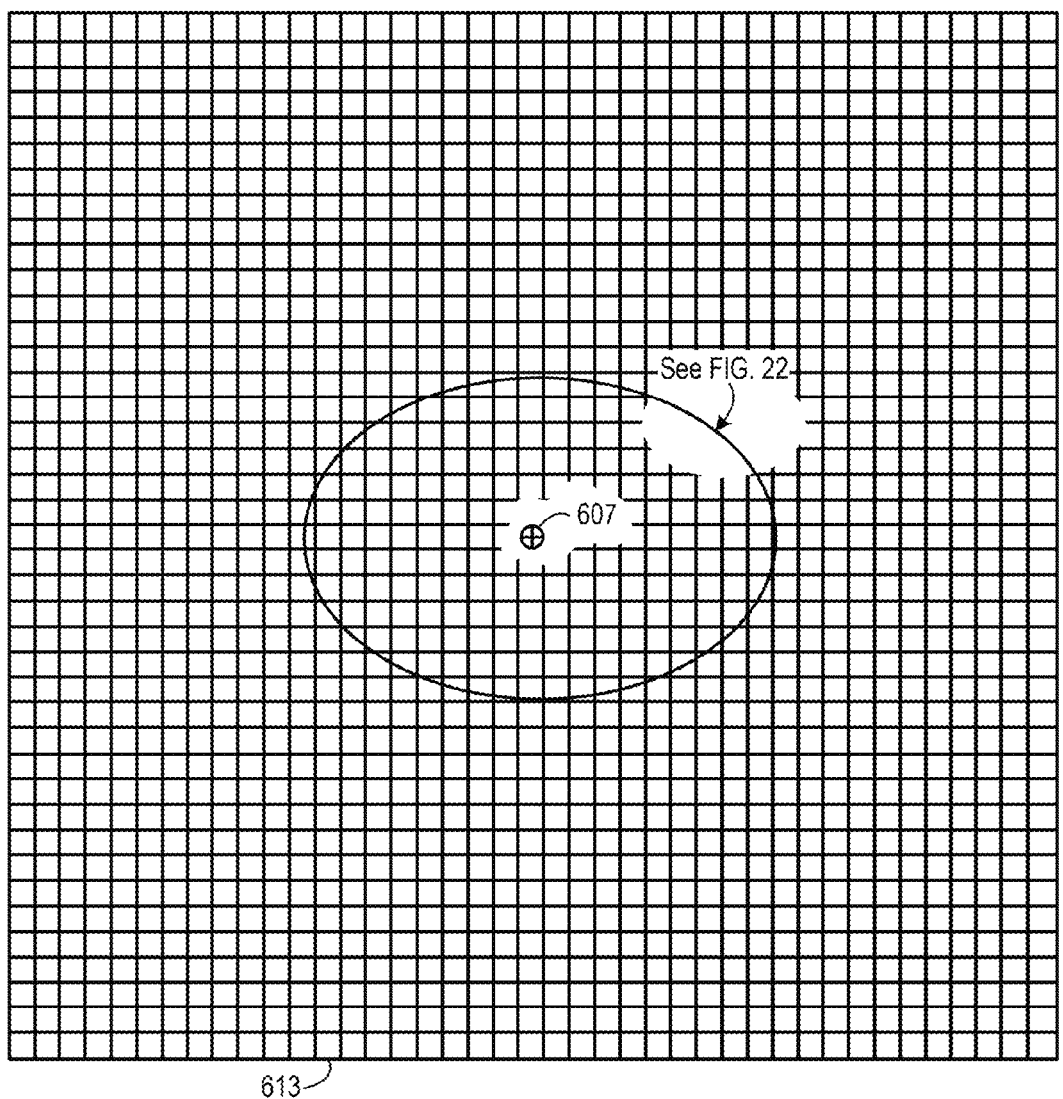
FIGS. 21 and 22 show a pattern by which additional points are selected.
Figure 22:
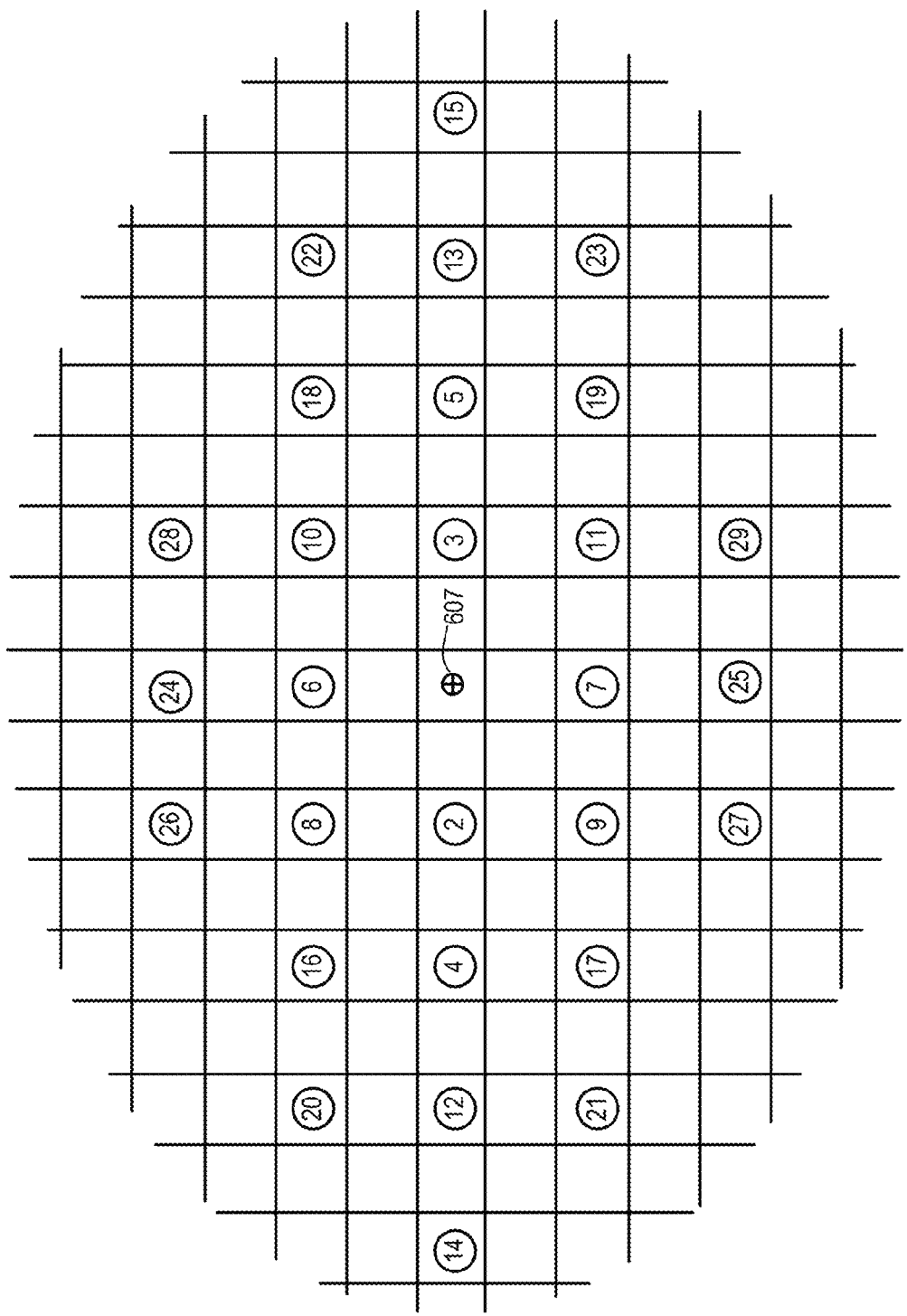

In block 719, computer 30 determines if there are additional points in region 613 of goggles image 601 (FIG. 16) that should be checked as possibly coinciding with point 606 of scope image 603. FIGS. 21 and 22 show a pattern by which additional points in region 613 are selected in at least some embodiments. FIG. 21 schematically shows region 613 and location 607 (found in FIG. 14 block 707), with each of the squares representing a single pixel. FIG. 22 is an enlargement of the portion of region 613 indicated in FIG. 21. In the first pass through block 721 after checking point 607, computer 30 selects the pixel at position ②. Computer 30 then returns to block 711 and repeats block 711 using pixel position ② instead of point 607, and then repeats blocks 713 through 719 (possibly omitting block 715). In the next pass through block 721, pixel position ③ is selected. This continues until some stop condition is reached. In some embodiments, a stop condition is reached when the pattern shown generally in FIG. 22 reaches the sides of region 613 along the horizontal plane. The pattern of FIG. 22 weights the search based on a higher probability that any random noise or bias drift will be greater along the yaw axis than along the pitch or roll axes. In other embodiments, the stop condition is reached after every other point in both the horizontal and vertical directions has been checked.

Once a stop condition is reached and there are no more points to select within region 613, computer 30 proceeds to block 723 and determines if any of the data sets (with each set containing a PSR, rotation and center point location) stored in block 717 is unambiguously the best. In at least some embodiments, the "best" data set is one in which the PSR is a predetermined percentage above the other stored PSRs. The percentage by which a "best" point should exceed others depends on the characteristics of the imaging technology involved, but one example value is an excess of 10%.

If an unambiguously best data set is identified in block 723, computer 30 proceeds to block 725. In block 725 (which is substantially similar block 219 of FIG. 7), computer 30 updates the IMU-based position for weapon view 74 based on the position and rotation of scope image region 605 within goggles image 601 resulting from the unambiguously best data set. Computer 30 also uses that data set to adjust the manner in which subsequent IMU-based position and image rotation calculations are made. This adjustment is performed as previously explained in connection with FIGS. 9A-9C. From block 725, computer 30 proceeds to block 119 of FIG. 5B.

If an unambiguously best stored data set is not found in block 723, computer 30 proceeds to block 727. If counter N has reached a maximum vale ($N_{MAX}$), computer 30 returns (via the "yes" branch) to block 119 of FIG. 5B. Appropriate values of $N_{MAX}$ would depend of various design preferences (e.g., processor speed, acceptable latency, etc.). If counter N has not reached $N_{MAX}$, computer 30 proceeds on the "no" branch to block 729 and increments counter N, and then proceeds to block 731. In block 731 a new high contrast region is selected in the scope image. In some embodiments, the selection of block 731 identifies the 3°×3° pixel block having the next highest gray-scale value standard deviation, and which does not overlap a previously selected 3°×3° pixel block in image 603 by more than a predetermined amount. Computer 30 then returns to block 707.

As with the algorithm described in connection with FIG. 7, numerous variations on the algorithm of FIG. 14 are within the scope of the invention. The search pattern of block 721, the sizes of image regions evaluated, and various other parameters can be varied. As but one example, the above-described algorithm employs center 604 as one reference point and point 607 as a corresponding reference point. In other embodiments, a point other than the center of the scope image can be used as the initial reference point. As another example, individual pixel gray-scale values are the image element data points used in the FFT analyses. Other image element data points could be used (e.g., an average of gray-scale values for several pixels clustered around a point, wavelength (color) information if sensors provide color information). As yet another example, the diamonds in FIGS. 17A through 17C have a particular dimensioned arrangement relative to the reference point (center 604) and the corresponding reference point (point 607). In other embodiments, different arrangements (e.g., oval, square, concentric rings, etc.) and/or different dimensions (e.g., closer to or farther from the reference point and corresponding reference point) can be used. In still some other embodiments, data sets are stored in block 717 for only the five highest (or some other predetermined number of highest) PSR values. In some embodiments, the scope image has a small number of possible FOVs (e.g., 9° diagonal or 18° diagonal).

In some embodiments using the algorithm of FIG. 14, and in circumstances where an image-based placement of the weapon view cannot be performed for a significant period (e.g., if there is a long period in which there are no sufficiently high contrast images), drift may become obvious to the user. In such a case, the user can manually recalibrate the system.

Although embodiments of the invention have been described by example of a system intended for use by a soldier or other combat personnel, the invention is not limited in this regard. In other embodiments, a heads up display need not be associated with a pair of goggles. For example, the heads up display could appear before a windshield in a vehicle. A weapon mounted on the vehicle includes a video gun sight producing images processed and projected onto the heads up display. In this embodiment, an orientation sensor may be placed to sense the orientation of the vehicle rather than a pair of goggles worn by the observer. This embodiment may be particularly useful for remotely controlled weapon systems, for example a robot carrying a weapon.

It should also be noted that the techniques described herein are not limited to weapon targeting or other combat uses. Other embodiments could be used in a myriad of settings, including law enforcement, medicine, astronomy, etc.

Although examples of carrying out the invention have been described, those skilled in the art will appreciate that there are numerous other variations, combinations and permutations of the above described devices and techniques that fall within the spirit and scope of the invention as set forth in the appended claims. As used in the claims, "controller" generically refers to any of one or more FPGAs, microprocessors, ASICs, other types of computational devices, or combinations thereof. It is to be understood that the subject matter defined in the appended claims is not necessarily limited to the specific features or acts described above. Rather, the specific features and acts described above are disclosed as example forms of implementing the claims. In the claims, various portions are prefaced with letter or number references for convenience. However, use of such references does not imply a temporal relationship not otherwise required by the language of the claims.

The invention claimed is:

1. A system, comprising:
a first video source configured to generate first video data of images representing portions of an external environment within a field of view of the first video source;
a second video source configured to generate second video data of images representing portions of the external environment within a field of view of the second video source;
a video display; and
a controller in communication with the first and second video sources and the display and configured to perform operations that include
receiving the first video data, the second video data, first motion data corresponding to the first video source, and second motion data corresponding to the second video source,
identifying, based on the received first motion data and the received second motion data, a region of a first image generable from the first video data for comparison with a region of a second image generable from the second video data,
comparing data corresponding to the identified region of the first image and data corresponding to the region of the second image,
selecting, based on the comparing, a part of the first image and a part of the second image that represent a same portion of the external environment,
displaying at least a portion of the first image and the selected part of the second image such that the selected part of the second image replaces the selected part of the first image and is in registration with regions of the first image surrounding the selected part of the first image.

2. The system of claim 1, wherein the controller is configured to perform operations that include
updating, based on the comparing, calibration data used to identify the region of the first image based on the received first motion data and the received second motion data,
receiving, after the updating, additional first video data, additional second video data, additional first motion data, and additional second motion data, and
identifying, based on the received additional first motion data and the received additional second motion data, a region of a third image generable from the additional first video data for comparison with a region of a fourth image generable from the additional second video data.

3. The system of claim 1, wherein the comparing comprises
determining a first point within the first image and a second point within the second image that represent a same part of the external environment, and
determining a twist rotation about the first and second points.

4. The system of claim 3, wherein
determining the first point and the second point comprises selecting a predetermined point in the second image as the second point and identifying the first point as a point in the first image for which a rotationally invariant similarity metric relative to the second point is maximized, and
determining the twist rotation comprises determining a phase shift between a signal corresponding to a portion of the first image surrounding the first point and a signal corresponding to a portion of the second image surrounding the second point.

5. The system of claim 1, wherein
the comparing comprises storing, for each of multiple pairs of a location in the first image and a location in the second image, a data set that includes a value for a peak to sidelobe ratio (PSR) and a center point location,
the comparing further comprises identifying one of the PSR values that exceeds others of the PSR values by a predetermined percentage, and
the selecting comprises selecting the part of the first image based on the center point location from the data set of the identified PSR value.

6. The system of claim 5, wherein the comparing comprises, for each of the pairs of a location in the first image and a location in the second image, generating the data set based on a comparison of gray-scale values in a portion of the first image surrounding the location in the first image and gray-scale values in a portion of the second image surrounding the location in the second image.

7. A method comprising:
receiving first video data of images representing portions of an external environment within a field of view of a first video source;
receiving second video data of images representing portions of the external environment within a field of view of a second video source;
receiving first motion data corresponding to the first video source and second motion data corresponding to the second video source;
identifying, based on the received first motion data and the received second motion data, a region of a first image generable from the first video data for comparison with a region of a second image generable from the second video data;
comparing data corresponding to the identified region of the first image and data corresponding to the region of the second image;
selecting, based on the comparing, a part of the first image and a part of the second image that represent a same portion of the external environment; and
displaying at least a portion of the first image and the selected part of the second image such that the selected part of the second image replaces the selected part of the first image and is in registration with regions of the first image surrounding the selected part of the first image.

8. The method of claim 7, further comprising
updating, based on the comparing, calibration data used to identify the region of the first image based on the received first motion data and the received second motion data;
receiving, after the updating, additional first video data, additional second video data, additional first motion data, and additional second motion data; and
identifying, based on the received additional first motion data and the received additional second motion data, a region of a third image generable from the additional first video data for comparison with a region of a fourth image generable from the additional second video data.

9. The method of claim 7, wherein the comparing comprises
determining a first point within the first image and a second point within the second image that represent a same part of the external environment, and
determining a twist rotation about the first and second points.

10. The method of claim 9, wherein
   determining the first point and the second point comprises selecting a predetermined point in the second image as the second point and identifying the first point as a point in the first image for which a rotationally invariant similarity metric relative to the second point is maximized, and
   determining the twist rotation comprises determining a phase shift between a signal corresponding to a portion of the first image surrounding the first point and a signal corresponding to a portion of the second image surrounding the second point.

11. The method of claim 7, wherein
   the comparing comprises storing, for each of multiple pairs of a location in the first image and a location in the second image, a data set that includes a value for a peak to sidelobe ratio (PSR) and a center point location,
   the comparing further comprises identifying one of the PSR values that exceeds others of the PSR values by a predetermined percentage, and
   the selecting comprises selecting the part of the first image based on the center point location from the data set of the identified PSR value.

12. The method of claim 11, wherein the comparing comprises, for each of the pairs of a location in the first image and a location in the second image, generating the data set based on a comparison of gray-scale values in a portion of the first image surrounding the location in the first image and gray-scale values in a portion of the second image surrounding the location in the second image.

13. A non-transitory machine-readable medium having machine executable instructions for performing a method comprising:
   receiving first video data of images representing portions of an external environment within a field of view of a first video source;
   receiving second video data of images representing portions of the external environment within a field of view of a second video source;
   receiving first motion data corresponding to the first video source and second motion data corresponding to the second video source;
   identifying, based on the received first motion data and the received second motion data, a region of a first image generable from the first video data for comparison with a region of a second image generable from the second video data;
   comparing data corresponding to the identified region of the first image and data corresponding to the region of the second image;
   selecting, based on the comparing, a part of the first image and a part of the second image that represent a same portion of the external environment; and
   displaying at least a portion of the first image and the selected part of the second image such that the selected part of the second image replaces the selected part of the first image and is in registration with regions of the first image surrounding the selected part of the first image.

14. The non-transitory machine-readable medium of claim 13, further comprising machine executable instructions for performing:
   updating, based on the comparing, calibration data used to identify the region of the first image based on the received first motion data and the received second motion data;
   receiving, after the updating, additional first video data, additional second video data, additional first motion data, and additional second motion data; and
   identifying, based on the received additional first motion data and the received additional second motion data, a region of a third image generable from the additional first video data for comparison with a region of a fourth image generable from the additional second video data.

15. The non-transitory machine-readable medium of claim 13, wherein the comparing comprises
   determining a first point within the first image and a second point within the second image that represent a same part of the external environment, and
   determining a twist rotation about the first and second points.

16. The non-transitory machine-readable medium of claim 15, wherein
   determining the first point and the second point comprises selecting a predetermined point in the second image as the second point and identifying the first point as a point in the first image for which a rotationally invariant similarity metric relative to the second point is maximized, and
   determining the twist rotation comprises determining a phase shift between a signal corresponding to a portion of the first image surrounding the first point and a signal corresponding to a portion of the second image surrounding the second point.

17. The non-transitory machine-readable medium of claim 13, wherein
   the comparing comprises storing, for each of multiple pairs of a location in the first image and a location in the second image, a data set that includes a value for a peak to sidelobe ratio (PSR) and a center point location,
   the comparing further comprises identifying one of the PSR values that exceeds others of the PSR values by a predetermined percentage, and
   the selecting comprises selecting the part of the first image based on the center point location from the data set of the identified PSR value.

18. The non-transitory machine-readable medium of claim 17, wherein the comparing comprises, for each of the pairs of a location in the first image and a location in the second image, generating the data set based on a comparison of gray-scale values in a portion of the first image surrounding the location in the first image and gray-scale values in a portion of the second image surrounding the location in the second image.

* * * * *